US011462334B2

(12) United States Patent
Wong et al.

(10) Patent No.: US 11,462,334 B2
(45) Date of Patent: Oct. 4, 2022

(54) DIRECT ENERGY CONVERSION ASSEMBLY FOR NUCLEAR FUSION SYSTEMS

(71) Applicant: NONLINEAR ION DYNAMICS, LLC, Monterey, CA (US)

(72) Inventors: Alfred Y. Wong, Los Angeles, CA (US); Charles Rinzler, Boston, MA (US); David A. Woodbury, Los Angeles, CA (US)

(73) Assignee: ALPHA RING INTERNATIONAL LIMITED, Grand Cayman (KY)

( * ) Notice: Subject to any disclaimer, the term of this patent is extended or adjusted under 35 U.S.C. 154(b) by 856 days.

(21) Appl. No.: 15/721,933

(22) Filed: Oct. 1, 2017

(65) Prior Publication Data

US 2018/0033499 A1 Feb. 1, 2018

Related U.S. Application Data

(62) Division of application No. 14/318,246, filed on Jun. 27, 2014, now abandoned.

(60) Provisional application No. 61/925,142, filed on Jan. 8, 2014, provisional application No. 61/925,131, filed on Jan. 8, 2014, provisional application No. 61/925,114, filed on Jan. 8, 2014, provisional
(Continued)

(51) Int. Cl.
*G21B 1/05* (2006.01)
*G21B 3/00* (2006.01)
*G21B 1/13* (2006.01)
*G21B 1/23* (2006.01)

(52) U.S. Cl.
CPC ............... *G21B 1/05* (2013.01); *G21B 1/13* (2013.01); *G21B 3/006* (2013.01); *G21B 1/23* (2013.01); *Y02E 30/10* (2013.01)

(58) Field of Classification Search
CPC ... G21B 1/00; G21B 1/05; G21B 1/11; G21B 1/15; G21B 3/00; G21B 3/006; G21B 1/13; G21B 1/21; G21B 1/23; Y02E 30/10
USPC ....... 376/102, 103, 107, 122, 123, 126–130, 376/144, 150, 152
See application file for complete search history.

(56) References Cited

U.S. PATENT DOCUMENTS 2,910,414 A * 10/1959 Spitzer, Jr. ............. G21B 1/055
376/132
3,791,949 A 2/1974 Hirayama et al.
(Continued)

FOREIGN PATENT DOCUMENTS

TW 201332401 A 8/2013
WO 9710605 A1 3/1997
(Continued)

OTHER PUBLICATIONS

David Braaten, 'Ridiculously' easy test yields claim of energy triumph, The Washington Times, p. A5.*
(Continued)

*Primary Examiner* — Darlene M Ritchie
(74) *Attorney, Agent, or Firm* — Potomac Law Group, PLLC; Vincent M DeLuca

(57) ABSTRACT

Methods, apparatuses, devices, and systems for creating, controlling, conducting, and optimizing fusion activities of nuclei. The controlled fusion activities cover a spectrum of reactions from aneutronic, fusion reactions that produce essentially no neutrons, to neutronic, fusion reactions that produce substantial numbers of neutrons.

9 Claims, 49 Drawing Sheets

Related U.S. Application Data application No. 61/925,122, filed on Jan. 8, 2014, provisional application No. 61/925,148, filed on Jan. 8, 2014, provisional application No. 61/843,015, filed on Jul. 4, 2013, provisional application No. 61/841,834, filed on Jul. 1, 2013, provisional application No. 61/840,248, filed on Jun. 27, 2013.

(56) References Cited

U.S. PATENT DOCUMENTS

| | | | |
|---|---|---|---|
| 5,321,327 A * | 6/1994 | Jensen | G21D 7/02 310/11 |
| 7,719,199 B2 * | 5/2010 | Monkhorst | G21D 7/00 315/111.21 |
| 2009/0205254 A1 | 8/2009 | Zhu et al. | |
| 2012/0014491 A1 * | 1/2012 | Deeth | G21B 3/008 376/103 |
| 2012/0097532 A1 * | 4/2012 | DeLuze | G21B 3/006 204/278 |
| 2012/0183111 A1 * | 7/2012 | Yea | G01N 23/222 376/159 |
| 2012/0307951 A1 * | 12/2012 | Weaver | G21B 1/13 376/150 |
| 2014/0126679 A1 | 5/2014 | Egely | |
| 2015/0132874 A1 * | 5/2015 | Vadhavkar | H01L 31/18 438/27 |
| 2015/0380113 A1 | 12/2015 | Wong et al. | |
| 2021/0210246 A1 * | 7/2021 | Fenner | G21H 1/02 |

FOREIGN PATENT DOCUMENTS

| | | | |
|---|---|---|---|
| WO | 2006096772 A2 | 9/2006 | |
| WO | 2008054463 A2 | 5/2008 | |
| WO | 2008100174 A1 | 8/2008 | |
| WO | WO-2010008625 A2 * | 1/2010 | G21B 3/006 |
| WO | 2015012807 A1 | 1/2015 | |

OTHER PUBLICATIONS

Malcolm W. Browne, 'Fusion' Claim is Greeted With Scorn by Physicists, The New York Times, p. A1 and A22.*
Kreysa et al. , A critical analysis of electrochemical nuclear fusion experiments, Journal of Electroanalytical Chemistry, vol. 266, p. 437-450.*
Ohashi et al. , Decoding of Thermal Data in Fleischmann & Pons Paper, Journal of Nuclear Science and Technology, vol. 26, No. 7, p. 729-732.*
Miskelly et al. , Analysis of the Published Calorimetric Evidence for Electrochemical Fusion of Deuterium in Palladium, Science, vol. 246, No. 4931, p. 793-796.*
Lewis et al. , Searches for low-temperature nuclear fusion of deuterium in palladium, Nature, vol. 340, p. 525-530.*
George Chapline, Cold Confusion, UCRL-101583, p. 1-9.*
David Stipp, Georgis Group Outlines Errors That Led to Withdraw!! of 'Cold Fusion' Claims, The Wall Street Journal, p. B4.*
Philip J. Hilts, Significant Errors Reported in Utah Fusion Experiments, The Washington Post, p. A1 and A7.*
Associated Press, Panel Opposes Cold Fusion Efforts, The Washington Post, p. A14.*
Alber et al. , Search for Neutrons from 'Cold Nuclear Fusion', Zetischrift fur Physik A Atomic Nuclei.*
J. F. Cooke, REport of Foreign Travel of J.F. Cooke, Head, Solid State Theory Section, Solid State Division, ORNL/FTR-3341, p. 2-15.*
G. Horanyi, Some Basic Electrochemistry and the Cold Nuclear Fusion of Deuterium, Journal of Radioanalytical Nuclear Chemistry, Letters, vol. 137, No. 1, p. 23-28.*
Faller et al. , Investigation of Cold Fusion in Heavy Water, Journal of Radioanalytical Nuclear Chemistry, Letters, vol. 137, No. 1, p. 9-16.*
Hajdas et al. , Search for Cold FuSion Events, Solid State Communications, vol. 72, No. 4, p. 309-313.*
Ziegler et al. , Electrochemical Experiments in Cold Nuclear Fusion, Physical Review Letters, vol. 62, No. 25, p. 2929-2932.*
Scrieder et al. , Search for ocold nuclear fusion in paladium-deuteride, Zeitschrift fur Physik B-Condensed Matter, vol. 76, No. 2, p. 141-142.*
Price et al. , Search for Energetic Charged Particle Emission from Deuterated Ti and Pd Foils, Physical Review Letters, vol. 63, No. 18, p. 1926-1929.*
Cribier et al., Conventional Sources of Fast Neutrons in "Cold Fusion" Experiments, Physics Letters B, vol. 228, No. 1, p. 163-166.*
Shani et al. , Evidence for a Background Neutron Enhanced Fusion in Deuterium Absorbed Palladium, Solid State Communications, vol. 72, No. 1 , p. 53-57.*
Associated Press, Physicist:Utah Cold-Fusion Gear Doesn't Work, The Washington Post, p. A3.*
Salamon et al. , Limits on the emission of neutrons, gamma rays, electrons and protons from ONPs/Fleischmann electrolytic cells, Nature, Vo. 344, p. 401-405.*
Canadian Office Action dated Aug. 27, 2019 in Canadian Application No. 2,916,875.

* cited by examiner

DIRECT ENERGY CONVERSION ASSEMBLY FOR NUCLEAR FUSION SYSTEMS

The present application: (i) claims, under 35 U.S.C. § 119(e)(1), the benefit of the filing date of Jun. 27, 2013 of U.S. provisional application Ser. No. 61/840,428; (ii) claims, under 35 U.S.C. § 119(e)(1), the benefit of the filing date of Jan. 8, 2014 of U.S. provisional application Ser. No. 61/925,114; (iii) claims, under 35 U.S.C. § 119(e)(1), the benefit of the filing date of Jan. 8, 2014 of U.S. provisional application Ser. No. 61/925,131; (iv) claims, under 35 U.S.C. § 119(e)(1), the benefit of the filing date of Jan. 8, 2014 of U.S. provisional application Ser. No. 61/925,122; (v) claims, under 35 U.S.C. § 119(e)(1), the benefit of the filing date of Jan. 8, 2014 of U.S. provisional application Ser. No. 61/925,148; (vi) claims, under 35 U.S.C. § 119(e)(1), the benefit of the filing date of Jan. 8, 2014 of U.S. provisional application Ser. No. 61/925,142; (vii) claims, under 35 U.S.C. § 119(e)(1), the benefit of the filing date of Jul. 1, 2013 of U.S. provisional application Ser. No. 61/841,834; (viii) claims, under 35 U.S.C. § 119(e)(1), the benefit of the filing date of Jul. 4, 2013 of U.S. provisional application Ser. No. 61/843,015; (ix) is a continuation-in-part of U.S. patent application Ser. No. 14/205,339 filed Mar. 11, 2014, which claims, under 35 U.S.C. § 119(e)(1), the benefit of the filing date of Mar. 11, 2013 of U.S. provisional application Ser. No. 61/776,592, which is a continuation-in-part of U.S. application Ser. No. 12/850,633, filed Aug. 5, 2010, which is a continuation-in-part of U.S. application Ser. No. 12/783,550, filed May 19, 2010, which claims, under 35 U.S.C. § 119(e)(1), the benefit of the filing date of May 19, 2009 of U.S. provisional application Ser. No. 61/179,625, the entire disclosure of each of which are incorporated herein by reference.

BACKGROUND OF THE INVENTION

Field of the Invention

The present inventions relate to methods, apparatuses, devices, and systems for creating, controlling, conducting, and optimizing fusion activities of nuclei. In particular, the present inventions relate to, among other things, fusion activities for energy production, propulsion, formation of material, and generation of directed energetic beams and particles. The present inventions further relate to such activities that cover a spectrum of reactions from aneutronic, fusion reactions that produce essentially no neutrons, to neutronic, fusion reactions that produce substantial numbers of neutrons.

As used herein, unless expressly stated otherwise, the term fusion should be given its broadest possible meaning, and would include interactions and reactions between two or more nuclei whereby one or more new or different nuclei are formed, as well as subsequently induced or derivative reactions and energy generation associated therewith.

As used herein, unless expressly stated otherwise, the terms formation, formation of material, and similar terms should be given their broadest possible meaning, and would include transmutation, and the modification or creation of a nucleus or nuclei, such as, for example, nuclides, and isotopes having value in medical, imaging, testing, and other useful applications.

As used herein, unless expressly stated otherwise, the term light element means an element or ion with atomic mass of 62 or less.

As used herein, unless expressly stated otherwise, the term physical confinement, physical containment, and similar such terms mean the use of a physical structure that passively confines the fusion reaction as opposed to the use of directed energy, including shockwaves or electromagnetic fields to confine the fusion reaction, or interaction, should include confinement by directed energy such as EM fields, such as coming from lasers as an example.

As used herein, unless expressly stated otherwise, the term strongly ionized plasma means a plasma whereby the ratio of ions to neutrals is at least about 1:1. As used herein, unless expressly stated otherwise, the term weakly ionized plasma means a plasma whereby the ratio of ions to neutrals is less than about 1:100. The terms plasma, ionized material, and similar such terms includes all degrees and ratios of ionization.

As used herein, unless expressly stated otherwise, the term neutrals means atoms, molecules or clusters with no net charge.

Discussion of the State of the Art

For 60 years the science and technology communities have been striving to achieve controlled and economically viable fusion. The commonly held belief in the art is that another 25-50 years of research remain before fusion is a viable option for power generation—"As the old joke has it, fusion is the power of the future—and always will be" ("Next ITERation?", Sep. 3, 2011, *The Economist*). Further, until the present inventions, it was believed that a paradigm existed in that achieving fusion of reactants was unobtainable without incredibly high temperatures for even the most likely reactants and even higher temperatures for other reactants. As a consequence, it was further believed that there was no reason to construct, or investigate the composition of, a nuclear fusion reactor with lower temperature reactant confinement.

Prior to the present inventions it was believed that the art in controlled fusion reactions taught that temperatures in excess of 150,000,000 degrees Centigrade were required to achieve favorable gross energy balance in a controlled fusion reactor. Gross energy balance, Q, is defined as:

$$Q = \frac{E_{fusion}}{E_{in}},$$

where $E_{fusion}$ is the total energy released by fusion reactions and $E_{in}$ is the energy used to create the reactions. The Joint European Torus, JET, claims to have achieved Q≈0.7 and the US National Ignition Facility recently claims to have achieved a Q>1 (ignoring the very substantial energy losses of its lasers). The condition of Q=1, referred to as "breakeven," indicates that the amount of energy released by fusion reactions is equal to the amount of energy input. In practice, a reactor used to produce electricity should exhibit a Q value significantly greater than 1 to be commercially viable, since only a portion of the fusion energy can be converted to a useful form. Conventional thinking holds that only strongly ionized plasmas, are necessary to achieve Q>1. These conditions limit the particle densities and energy confinement times that can be achieved in a fusion reactor. Thus, the art has looked to the Lawson criterion as the benchmark for controlled fusion reactions—a benchmark, it is believed, that no one has yet achieved when accounting for all energy inputs. The art's pursuit of the Lawson criterion, or substantially similar paradigms, has led to fusion devices and systems that are large, complex, difficult to manage, expensive, and economically unviable.

A common formulation of the Lawson criterion is as follows:

$$N\tau_{E^*} > \frac{3(1-\eta_{in}\eta_{out})H}{\eta_{in}\eta_{out}\frac{\langle\sigma v\rangle_{ab}(H)Q_{ab}}{4(1+\delta_{ab})} - (1-\eta_{in}\eta_{out})A_{br}\sqrt{H}}$$

All of the parameters that go into the Lawson criterion will not be discussed here. But in essence, the criterion requires that the product of the particle density (N) and the energy confinement time ($\tau T_{E^*}$) be greater than a number dependent on, among other parameters, reaction temperature (H) and the reactivity ($\sigma v)_{ab}$, which is the average of the product of the reaction cross section and relative velocity of the reactants. In practice, this industry-standard paradigm suggests that temperatures in excess of 150,000,000 degrees Centigrade are required to achieve positive energy balance using a D-T fusion reaction. For proton-boron fusion, as one example, the criterion suggests that the product of density and confinement time must be yet substantially higher.

An aspect of the Lawson criterion is based on the premise that thermal energy must be continually added to the plasma to replace lost energy to maintain the plasma temperature and to keep it fully or highly ionized. In particular, a major source of energy loss in conventional fusion systems is radiation due to electron bremsstrahlung and cyclotron motion as mobile electrons interact with ions in the hot plasma. The Lawson criterion was not formulated for fusion methods that essentially eliminate electron radiation loss considerations by avoiding the use of hot, heavily ionized plasmas with highly mobile electrons.

Because the conventional thinking holds that high temperatures and strongly ionized plasma are required, it was further believed in the art that inexpensive physical containment of the reaction was impossible. Accordingly, methods being pursued in the art are directed to complex and expensive schemes to contain the reaction, such as those used in magnetic confinement systems (e.g., the ITER tokamak) and in inertial confinement systems (e.g., NIF laser).

In fact, at least one source in the prior art expressly acknowledges the believed impossibility of containing a fusion reaction with a physical structure: "The simplest and most obvious method with which to provide confinement of a plasma is by a direct-contact with material walls, but is impossible for two fundamental reasons: the wall would cool the plasma and most wall materials would melt. We recall that the fusion plasma here requires a temperature of ~$10^8$ K while metals generally melt at a temperature below 5000 K." ("Principles of Fusion Energy," A. A. Harms et. al.)

It should be pointed out that current fusion schemes using D-T fuels which produce radioactive materials. Robots are required to operate such systems.

The present inventions break the prior art paradigms by, among other things, increasing the reactant density, essentially eliminating electron radiation losses, and combinations of these, by avoiding the use of a strongly ionized plasma, modifying the Coulomb barrier and thus increasing the reaction cross section, extending the interaction region of fusion reactants from a point to a large surface area, and using physical confinement to contain the fusion reaction. Such approaches make Lawson's criterion inapposite.

The importance and value of achieving economically viable controlled fusion has long been recognized and sought after in the art. Controlled fusion may have applications in energy production, propulsion, material creation, material formation, the production of useful isotopes, generation of directed energetic beams and particles, and many other key fields and applications. In the energy production area, controlled fusion has been envisioned to provide a solution to global energy and environmental challenges, including supply, distribution, cost, and adverse effects from using hydrocarbon or other alternative fuel sources. Accordingly, there has been a long-standing and unfulfilled need for a controlled fusion reaction, and the clean energy and other benefits and beneficial uses that are associated with such a reaction. The present methods, devices and systems for conducting fusion reactions solve these and other problems, deficiencies, and inadequacies associated with prior attempts to create a viable controlled fusion system. Further, the present inventions avoid the risks associated with conventional fission power generation. Moreover, available aneutronic embodiments of controlled fusion avoid the potential issues associated with managing neutrons produced in other fusion reactions. Thus, the present inventions, among other things, solve these needs by providing the articles of manufacture, devices and processes taught, disclosed and claimed herein.

SUMMARY

In an embodiment of the present inventions there is provided a device that uses high-speed rotation of material to produce conditions for performing fusion reactions and utilizing the energy and materials created by those reactions. These devices rotate materials at hundreds of thousands or millions of revolutions per second (RPS), creating forces, effects and conditions that facilitate the fusion reaction. The fusion reaction takes place near the outer region of this rotating material, generally further away from the center of rotation and more toward where the material is fastest moving in km/sec. The recovery or utilization of the fusion products, which includes created materials, modified materials and energy can then be more readily utilized, because these products are similarly near the outer side of this rotating material.

In an embodiment of the present inventions there is provided a device that uses high-speed rotation of material to produce conditions for performing fusion reactions and utilizing the energy and materials created by those reactions. These devices rotate materials at hundreds of thousands or millions of revolutions per second (RPS), creating forces, effects and conditions that facilitate the fusion reaction. The fusion reaction takes place in a region removed from the axial center of the rotating mass, preferably where the material is fastest-moving. The recovery or utilization of the fusion products, which includes created materials, modified materials and energy can then be more readily utilized, because these products are similarly near the outer side of this rotating material.

Additionally, in an embodiment of the present inventions there is provided a method that uses high-speed rotation of material to produce conditions for performing fusion reactions and utilizing the energy and materials created by those reactions. These methods rotate materials at hundreds of thousands or millions of revolutions per second (RPS), creating forces, effects and conditions that facilitate the fusion reaction. The fusion reaction takes place in a region removed from the axial center of the rotating mass, preferably where the material is fastest-moving. The recovery or utilization of the fusion products, which includes created materials, modified materials and energy can then be more readily utilized, because these products are similarly near the outer side of this rotating material.

In a further embodiment of the present inventions there is provided a method that uses high-speed rotation of material to produce conditions for performing fusion reactions and utilizing the energy and materials created by those reactions. This method rotates materials at hundreds of thousands or millions of revolutions per second (RPS), creating forces, effects and conditions that facilitate the fusion reaction. The fusion reaction takes place near the outer side of this rotating material, generally further away from the center of rotation and more toward where the material is fastest moving in km/sec. The recovery or utilization of the fusion products, which includes created materials, modified materials and energy can then be more readily utilized, because these products are similarly near the outer side of this rotating material.

In yet another embodiment of the present inventions there is provided a fusion device that utilizes an ionized material spinning at very high rates of speed. This device establishes conditions where the rotating material is forced into a second material, which is stationary, or for all practical purposes moving so slowly or in an opposite direction that it is effectively stationary with respect to the rotating material, wherein these two materials are brought together in a fusion reaction, whereby one or more of high energy particles, radiation, or new elements (or materials) are produced.

Yet still further, in an embodiment of the present inventions there is provided a fusion method using ionized material spinning at very high rates of speed. This method forces the rotating material into a second material, which is stationary, or for all practical purposes moving so slowly or that is moving in the opposite direction that it is effectively stationary with respect to the rotating material, and brings these two material together in a fusion reaction, whereby one or more of high energy particles, radiation, or new elements (or materials) are produced. Further, the ionized material may be introduced to the device as pre-ionized.

Additionally, in an embodiment of the present inventions there is provided a device requiring no internal mechanical rotation devices that creates and uses high-speed rotation of material to produce conditions for performing fusion reactions and utilizing the energy and materials created by those reactions. These devices rotate materials at hundreds of thousands or millions of revolutions per second (RPS), without the use of any mechanical device or rotating device components, creating forces, effects and conditions that facilitate the fusion reaction. The fusion reaction takes place near a region generally further away from the center of rotation and more toward where the material is fastest moving in km/sec. The fusion products, which include created materials, modified materials, and energy, can then be more readily recovered or utilized because these products are similarly near the outer region of this rotating material.

Moreover, in an embodiment of the present inventions there is provided a device requiring no internal mechanical rotation devices that creates and uses high-speed rotation of material to produce conditions for performing fusion reactions and utilizing the energy and materials created by those reactions. These devices rotate materials at many thousands and potentially millions of revolutions per second (RPS), without the use of any mechanical device or rotating device components, creating forces, effects and conditions that facilitate the fusion reaction, by using reactors with small dimensions. The fusion reaction takes place near a region generally further away from the center of rotation and more toward where the material is fastest moving in km/sec. The fusion products, which include created materials, modified materials, and energy, can then be more readily recovered or utilized because these products are similarly near the outer region of this rotating material.

In a further embodiment of the present inventions there is provided a method that uses non-mechanical high-speed rotation of a material to produce conditions for performing fusion reactions and utilizing the energy and materials created by those reactions. This method rotates by non-mechanical means, materials at hundreds of thousands or millions of revolutions per second (RPS), creating forces, effects and conditions that facilitate the fusion reaction. The fusion reaction takes place near the outer side of this rotating material, general further away from the center of rotation and more toward where the material is fastest moving in km/sec. The recovery or utilization of the fusion products, which includes created materials, modified materials and energy can then be more readily utilized, because these products are similarly near the outer side of this rotating material.

Moreover, in an embodiment of the present inventions there is provided a method requiring no internal mechanical rotation devices that creates and uses high-speed rotation of material to produce conditions for performing fusion reactions and utilizing the energy and materials created by those reactions. These methods rotate materials at hundreds of thousands or millions of revolutions per second (RPS), without the use of any mechanical device or rotating device components, creating forces, effects and conditions that facilitate the fusion reaction, by using reactors with small dimensions. The fusion reaction takes place near a region generally further away from the center of rotation and more toward where the material is fastest moving in km/sec. The fusion products, which include created materials, modified materials, and energy, can then be more readily recovered or utilized because these products are similarly near the outer region of this rotating material.

In yet another embodiment of the present inventions there is provided a fusion device that utilizes an ionized material spinning at very high rates of speed. This device does not require mechanical rotating components. This device establishes conditions where the rotating material is forced into a second material, which is stationary, or for all practical purposes moving so slowly or in an opposite direction that it is effectively stationary with respect to the rotating material, wherein these two materials are brought together in a fusion reaction, whereby high energy particles are produced.

Moreover, in an embodiment of the present inventions there is provided a fusion method using ionized material spinning at very high rates of speed without the need for mechanically rotating components. This method forces the rotating material into a second material, which is stationary, or for all practical purposes moving so slowly or that is moving in the opposite direction that it is effectively stationary with respect to the rotating material, and brings these two material together in a fusion reaction, whereby high energy particles are produced.

In further embodiments of the above inventions, one or more of the following may also be present: the high energy particles may be alpha particles; energy may also be produced; at least about 1 nW (nanowatts) to about 1 mW (milliwatts) of energy may also be produced; at least about 10 W of energy may also be produced; about 10 kW (kilowatts) of energy may also be produced; about 1 MW (megawatt) of energy may also be produced; about 100 MW of energy may also be produced; about 1 GW (gigawatt) may also be produced; the high energy particles may be used to create electricity; at least about 1 mW of electricity may be produced; at least about 10 W of electricity may be produced; at least about 1 MW of electricity may be produced; at least about 100 MW of electricity may be produced; at least about 1 GW of electricity may be produced; energy may be produced which is then used to create electricity; the high energy particles are alpha particles and energy is produced; and, the high energy particles have an energy of at least about 2 MeV; and the high energy particles have an energy of at least about 1 MeV.

In still further embodiments of the present inventions there are provided a fusion reaction device and method having, one or more of the following: the device or method may be configured and operated to achieve a predetermined energy balance of the fusion reaction; configured and operated to achieve a predetermined rate of the fusion reaction; configured and operated to achieve a predetermined reactant density; configured and operated to achieve a predetermined fusion reaction cross section; configured and operated to facilitate expansive confinement of the fusion reaction, whereby the fusion reaction is forced to the outer areas of the fusion chamber rather than the inner areas of that chamber; and configured and operated to achieve increased probability of reaction through a longer confinement time.

Additionally, in embodiments of the present inventions there are provided a fusion reaction device and method having one or more of the following: the device or method may be configured and operated to provide for expansive confinement to create sustained functioning fusion reactions and fusion reaction devices from a microscale, e.g., less than a few millimeters in size, to a few meters, to commercial power generation scale; the scaling of fusion reactor size geometrically to determine reaction rate; and the scaling of fusion reactor size geometrically to determine energy balance.

Still further in embodiments of the present inventions there is provided a fusion reactor configuration for enabling nuclear fusion reactions for use in an application; the reactor incorporating a first reactant and a second reactant; the first reactant having a first density; the second reactant having a second density; a means for expansive confinement; and a means to modify the cross section of reaction, the reactor is capable of producing predetermined products.

Yet further, in embodiments of the present inventions there is provided a fusion reactor configuration for enabling nuclear fusion reactions for use in an application, the reactor incorporating a first reactant and a second reactant; the first reactant having a first density on the order of about $10^{13}$ particles/cm$^3$ to on the order of about $10^{23}$ particles/cm$^3$, greater than about $10^{24}$ particles/cm$^3$, greater than about $10^{25}$ particles/cm$^3$; the second reactant having a second density of about $10^{13}$ particles/cm$^3$ to on the order of about $10^{23}$ particles/cm$^3$, greater than about $10^{24}$ particles/cm$^3$, greater than about $10^{25}$ particles/cm$^3$; a predetermined source of potential in addition and beyond the Coulomb potential; wherein these potentials interact with and/or combine with the Coulomb potential barrier.

Furthermore, in embodiments of the present inventions there is provided a system configuration incorporating a reactor with a first reactant and a second reactant; the first reactant having a first density of about $10^{13}$ particles/cm$^3$ to on the order of about $10^{23}$ particles/cm$^3$, greater than about $10^{24}$ particles/cm$^3$, greater than about $10^{25}$ particles/cm$^3$; the second reactant having a second density of about $10^{13}$ particles/cm$^3$ to on the order of about $10^{23}$ particles/cm$^3$, greater than about $10^{24}$ particles/cm$^3$, greater than about $10^{25}$ particles/cm$^3$; a means for expansive confinement; and a means to modify the cross section of reaction, the reactor is capable of producing predetermined products. The system having an energy conversion system; a component to provide power to the reactor; a component to control the reactor.

Further, in embodiments of the present inventions there is provided a system configuration incorporating a material rotating at high rates, wherein this rotation results in a pressure change in the system. This pressure change may induce a vacuum or flow of material.

Still further, embodiments of the present inventions are provided in the claims, drawings and specification of this application.

DESCRIPTION OF THE PREFERRED EMBODIMENTS

In general, the present inventions relate to methods, apparatuses, devices, and systems for creating, measuring, controlling, conducting, and optimizing fusion activities of nuclei. In particular, the present inventions relate to, among other things, fusion activities for energy production, propulsion, formation of material, and generation of directed energetic beams and particles. The present inventions further relate to such activities that cover a spectrum of reactions, from aneutronic fusion reactions that produce essentially no neutrons, to neutronic fusion reactions that produce substantial amounts of neutrons.

Generally, the present methods, apparatuses, and systems utilize the high speed rotation of particles to provide for controlled fusion reactions in controlled environments, and preferably without the need for magnetic or high-energy containment fields. Further, embodiments of the present invention create or modify quantum and other effects to provide for or enhance the fusion reaction.

In general, the controlled fusion devices utilize rotating particles at a high rate of speed. This may be done in a variety of ways. For example, an axial magnetic field can be created in a cylindrical chamber, and a radial plasma current can be induced by applying a voltage across a central discharge rod and a concentric electrode. The perpendicular electric field and magnetic field create a Lorentz force along the axis perpendicular to both the electric and magnetic fields, in this case in the azimuthal direction. The electric field and magnetic field may further be at an angle that differs from the perpendicular, such that perpendicular components, to a lesser or greater extent, are present in sufficient strength to create a sufficiently strong azimuthal Lorentz force. This azimuthal force acts on ions, which in turn couple with neutrals such that particles in the annular space between the central discharge rod and outer electrode are made to move at high rotational velocity. The lack of any moving mechanical parts means that there is little limitation to the speed at which rotation can occur, thus providing rotation rates in excess of 100,000 RPS.

Figure 1:
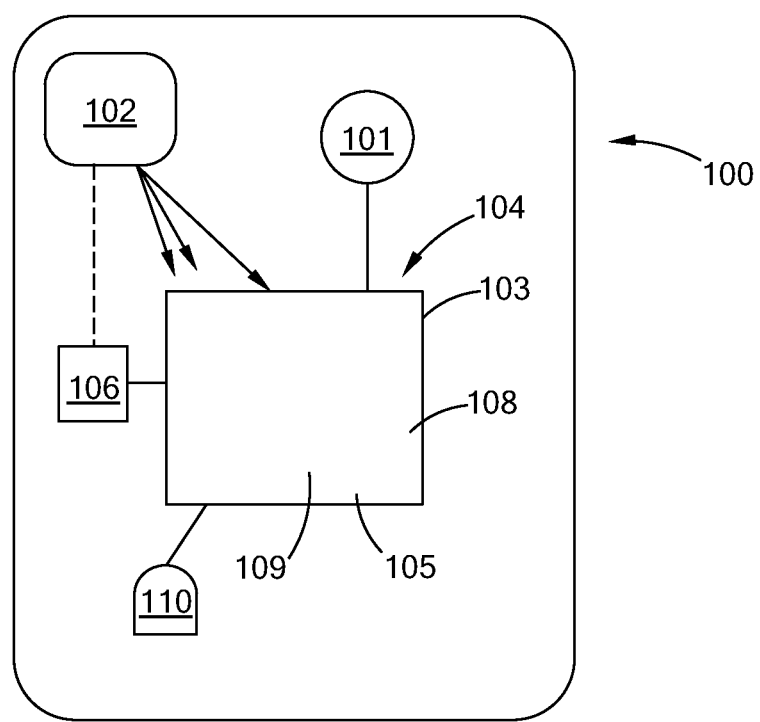
FIG. 1 shows schematic diagram of an embodiment of a controlled fusion device in accordance with the present inventions.

Turning to FIG. 1, there is provided schematic diagram of an embodiment of a fusion device of the present inventions. The controlled fusion device 100 has a first working material 101 and a second working material 110 associated with it. The controlled fusion device 100 has a rotation chamber 103 having rotation chamber wall 105 and a cavity 108, and a controlled pressure area 104. Operationally associated with the rotation chamber 103 is a rotation source 102 and a plasma creation device 106. The devices 102 and 106 may be the same, may be different, and may be operationally associated in combinations and variations of these. Within the cavity 108 there is a fusion surface 109.

The first working material 101 is any material or combination of substances that is capable of being formed into a plasma, and more preferably a weakly ionized plasma. For example, the first working material can be hydrogen, deuterium, tritium, helium, argon, neon, xenon, nitrogen, oxygen, in general gaseous materials, vaporized solids or other solids, or liquids. It may be a combination of an ionizable background material and a material which is intended to be directly involved in the fusion reaction. The ionizable background material may also be involved in the fusion reaction. For example, argon gas (as a background material) may be combined with vaporized boron. In one embodiment, the first material could be hydrogen.

The second working material 110 can be the same as the first working material 101, it may be combined with the first working material, or it may be different. In general, the second working material and the first working material should be selected to provide for a predetermined and optimized fusion reaction. Thus, for example, the combination of these materials may seek to, among other things, create an aneutronic fusion reaction, provide for high particle density, result in a high energy output, provide for good electron emission, provide for use of materials which both have positive or both have negative magnetic moments, and combinations and variations of these and other factors. Preferably, the material should be selected to provide for an aneutronic fusion reaction. Preferably, the second working material is a solid. In one embodiment, the second material could be boron or a boron compound such as boron nitride or lanthanum hexaboride.

Preferably, the first and second materials for some embodiments of the controlled fusion device may be: hydrogen-1 and boron-11, hydrogen-1 and lithium-6, hydrogen-1 and lithium-7, deuterium and helium-3, deuterium and lithium-6, helium-3 and lithium-6, helium-3 and helium-3, hydrogen-1 and nitrogen-15, deuterium and deuterium, deuterium and tritium, or tritium and tritium. It may be advantageous to use molecular compounds that are good electron emitters, for example boron nitride or lanthanum hexaboride. The first or second working material may also be a matrix or composite of different materials, each of which may provide an advantage for the fusion reaction, e.g., one is a good electron emitter and one is the compound containing the fusion reactant. A further consideration in determining the first and second working materials is the avoidance of potentially added cost and difficulties in handling materials that may be potentially dangerous, self-pyrolizing, or have other heightened health, safety or cost concerns.

The rotational source 102 or device for providing rotation to the plasma, and preferably weakly ionized plasma, may include superconducting magnets, permanent magnets, electromagnets, radio frequency sources, microwave sources, electric field sources, electrodes, lasers, ion guns, and combinations and variations of these and other types of devices.

The plasma creation device 106 may include radio frequency sources, microwave sources, lasers, electric field sources, electrodes, spark gap, and ion guns, and combinations and variations of these and other types of devices.

In some embodiments, the rotational device 102 and the plasma creation device 106 may be combined. For example, a superconducting magnet creating a magnetic field between about 0.5 and about 2 Teslas or greater, and a set of electrodes with a voltage difference of between about 2 kV (kilovolts) and 3 kV or greater will both create a plasma and cause the said plasma to rotate; another example is plasma being created by electromagnetic waves at the resonant frequencies of ions and electrons in a magnetic field, and being caused to rotate by the same electromagnetic waves and magnetic field.

The rotation chamber 103 forms or defines the cavity 108 that contains the plasma, and preferably the weakly ionized plasma. Associated with the cavity are the rotational device 102 and the plasma creation device 106. In this manner, these devices 102, 106, create a plasma and cause the plasma to rotate within the chamber at high revolutions, e.g., at least about 1,000 revolutions per second (RPS), at least about 5,000 RPS, at least about 50,000 RPS, at least about 100,000 RPS, at least about 300,000 RPS, or greater, and from about 100,000 to about 300,000 RPS.

The rotation chamber 103 may be made from metals, ceramics, plastics, composites, and combinations and variations of these and other types of materials. The rotation chamber can provide a controlled pressure area 104 or it may itself be contained in or be part of the controlled pressure area 104. The rotation chamber provides a controlled environment and preferably surfaces that, among other things, direct or contain the rotation of the plasma. The rotation chamber may also include or be an electrode.

The rotation chamber 103 has a wall 105 or structures that provide physical barriers to the rotating plasma, as well as, in some embodiments, a physical barrier to contain or control the atmosphere and pressures. The rotation chamber wall 105 can define, in whole or in part, a cavity 108. The cavity 108 forms a volume or defines a region, where the plasma rotates and the fusion reaction may also take place.

A fusion surface 109 is provided in the device 100. In dealing with nuclear distances and areas where the fusion reaction takes place, relative or common terms of distance may not completely apply. Thus, as used herein, when it is provided that the fusion reaction occurs at, near, or adjacent to a surface or region, these terms are to be used in their broadest possible sense, and would include the reaction taking place in that general region, or being bounded by or otherwise physically contained by that surface. In the device 100, preferably the fusion reaction takes place in whole or in part adjacent to the fusion surface 109. The fusion surface may form in whole or in part the rotation chamber 103, the controlled pressure area 104, the cavity 108, and combinations and variations of these. The fusion surface 109 may also be contained within some or all of these structures, provided however that the fusion surface is located within the controlled pressure area 104. The fusion surface may be solid, a screen, nanoparticles, a gel, a matrix, coatings and platings generally, micro and nano structured surfaces, and for example may be formed from copper, stainless steel, silver, metal platings, ceramics, composites, plastics, metals, metalloids, organics, oxides, glass, polymeric materials, alloys, graphite, and combinations and variations of these and other materials. Moreover, the fusion surface 109 may include or be the second working material.

Figure 2:
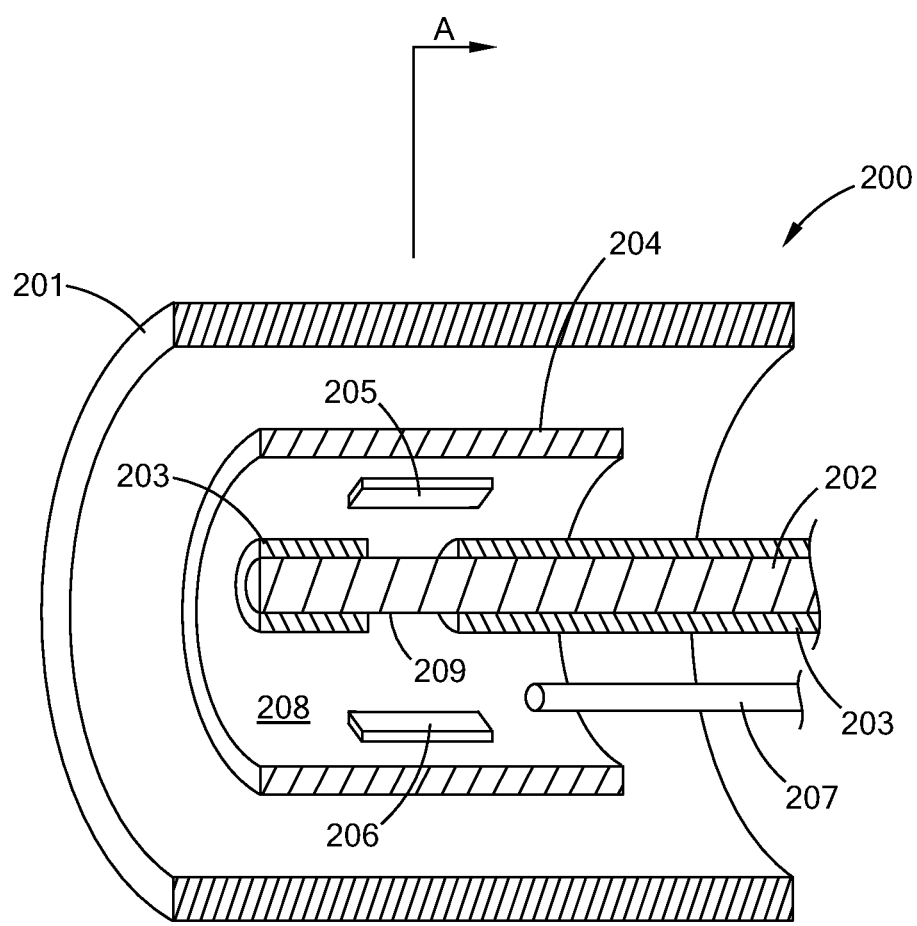
FIG. 2 shows a perspective cross-sectional view of an embodiment of a controlled fusion device in accordance with the present inventions.

Turning to FIG. 2, there is shown a perspective cross-sectional view of an embodiment of a controlled fusion device 200. The controlled fusion device 200 has a superconducting magnet 201 which provides a magnetic field from about 0.5 to 2 Teslas. Within the magnet 201, and thus within the magnetic field created by the magnet, are an outer electrode 204, and an inner electrode 202. The inner electrode has insulation 203. Located on the inner surface 208 of the outer electrode 204 is a first boron plate 205 and a second boron plate 206. A working gas inlet line 207 is located within the inner electrode 204 and within the magnet 201.

The outer electrode 204 is in the shape of a tube having an inner diameter of 16 centimeters (cm). The outer electrode 204 is made from copper. An uninsulated or exposed section 209 of the inner electrode 202 is located axially across from the boron plates 205 and 206. Although not shown in the figure, the inner and outer electrodes are contained within a controlled pressure environment. The inner electrode and the uninsulated section 209 has an diameter of 4 cm. Thus the inner and outer electrodes are electrically associated with a power source and circuit shown in FIG. 4A, and thus there is provided a voltage across the two electrodes. Preferably, in this embodiment the boron plates are made from boron nitride or lanthanum hexaboride both of which are excellent electron emitters.

It should be understood that this embodiment may be configured such that the components and their respective positions may be modified or changed. For example, multiple inner electrodes may be used, different configurations for the outer electrode may be used, more or fewer boron plates may be used, a continuous ring of boron may be used, or other configurations of the boron may be used, the location and position of the working gas inlet line 207 may be changed and multiple working gas inlet lines 207 may be used.

The distance between the inner surface of the outer electrode 204 and the exposed outer section of the inner electrode 209 is approximately 6 cm. It is in this region that an electric current is flowed through the working gas to create a plasma, and preferably a weakly ionized plasma. The concentration and type of the working gas, the pressure of the working gas, the distance between the electrodes, and other factors are evaluated in determining the voltage and current used to create the plasma. Moreover, the voltage and current used to impart the Lorentz force to create the rotation of the plasma is based upon the magnetic field and other factors. Thus, in this embodiment, the distance between the electrodes may be less than a centimeter, may be less than 2 cm, may be from about 2 cm to about 50 cm, may be from about 5 cm to about 20 cm, and may be greater than a meter. In determining this distance, consideration should be given to the detrimental effect that increased distance has on electrical power requirements to form the plasma and to create sufficient Lorentz forces to induce sufficient rotation to allow fusion to take place. In using smaller distances, consideration should also be given to avoiding the creation of boundary layer effects, which may adversely affect the ability of the Lorentz forces to impart sufficient rotation to give rise to fusion. The magnetic field may be from about 0.5 Tesla to about 20 Teslas, from about 2 Teslas to about 5 Teslas, and may be greater or lower depending upon the plasma current such that sufficient rotation is imparted. The hydrogen gas is preferably at approximately 3 torr, but may be from about 0.5 torr to about 12 torr, from about 1 torr to about 7 torr, and preferably 2 torr or greater. Further, and more preferably, the pressure of the hydrogen should be as large as is possible without adversely affecting or inhibiting the plasma creation. The axial length of the electrodes, and more particularly the axial length of the uninsulated section of the inner electrode, may be less than a centimeter, and can be substantially longer than a centimeter, provided that the voltage across the electrodes is sufficiently high to induce a sufficient amount of rotation in the region where fusion is intended to take place. Further, this embodiment may be used with other first working materials and other second working materials.

Generally, the device of the embodiment of FIG. 2 can be operated by providing the magnetic field of between about 0.5 Tesla and about 2 Teslas; purging the device of all atmosphere; and after purging, filling the device with hydrogen to about 3 torr. Applying a voltage of about 1.4 kV through a current-limiting resistor to the inner electrode creates a plasma current of about 10 to 50 A, which imparts, due to the Lorentz force created by the magnetic field and current, a rotation of about 1,000 RPS. Preferably, this initial rotation in devices of the embodiment of the type of FIG. 2, enhances the ability to achieve rotational speeds sufficient to cause fusion. After the initial rotation is established, a pulse of about 400 V to 1 kV between the outer and inner electrodes creates a plasma current of about 2 to 5 kA, and imparts a rotation of at least about 100,000 RPS. The rotation of the plasma is maintained for about 10 milliseconds. During this rotation of the plasma, alpha particles are created by a fusion reaction between a proton and a boron-11 nucleus. It is believed that the average kinetic energy of the protons is approximately 500 eV (electron-volts). The cumulative energy imparted to the three alpha particles produced by each fusion reaction is thought to be approximately 8.68 MeV.

In addition to a single pulse operation, the embodiment of FIG. 2 may be operated with one, two, or more serially spaced pulses. The serially spaced pulses may be staggered or overlapping. Further, a CW (continuous wave) voltage may be applied for periods of greater duration than the pulses. These approaches may thus provide substantially longer periods of fusion activity than the observed 10 milliseconds, where the creation of alpha particles and associated energy production can take place.

Also, secondary nuclear reactions between energetic alpha particles and other materials may take place, adding additional energy to the system. For example, alpha particles produced by a primary reaction between hydrogen-1 and boron-11 may react with carbon in the wall of the controlled fusion device, creating oxygen and releasing additional energy. Thus, the fusion product itself may become a working material, e.g., a third working material.

Turning to FIGS. 2A through 2E, there are shown perspective cross-sectional views of the embodiment of FIG. 2 taken along line A-A. As described subsequently, these figures illustrate the various electric fields, magnetic fields, and operating parameters of the embodiment of FIG. 2, resulting in the creation of the fusion reaction and fusion products, e.g., alpha particles and related energy generation.

Figure 2A:
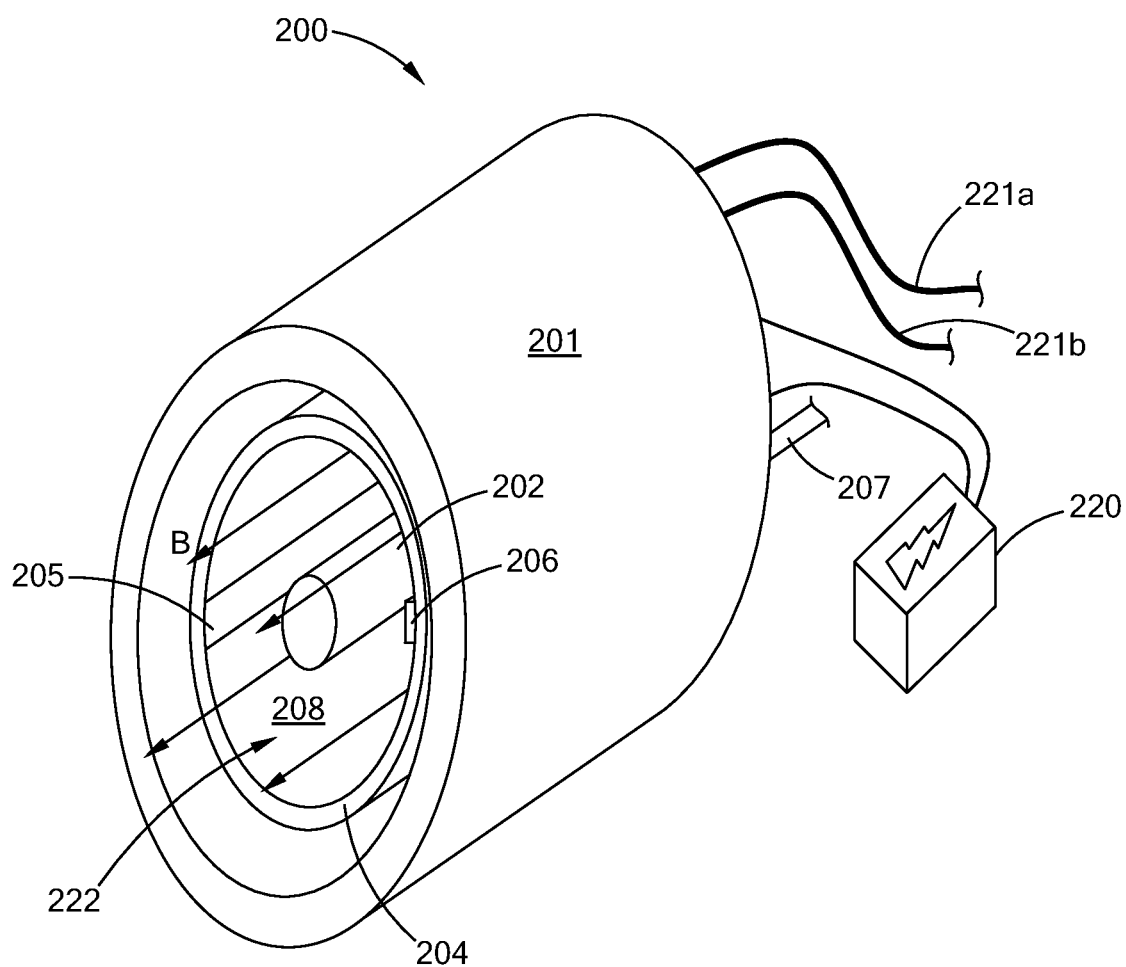
FIGS. 2A-2E show perspective cross-sectional snap shot views of the embodiment of FIG. 2 taken along line A-A during stages of its operation.

Turning to FIG. 2A, the magnetic field lines are shown by arrows (B). These magnetic field lines, created by magnet 201, are shown passing through the annular space 222 between the inner 202 and outer 204 electrodes. Hydrogen gas is filling this annular space 222. As shown in this figure, because the voltage has not been applied across the electrodes 202 and 204, no rotation has taken place. A power source 220, and water cooling lines 221a, 221b are also shown.

Figure 2B:
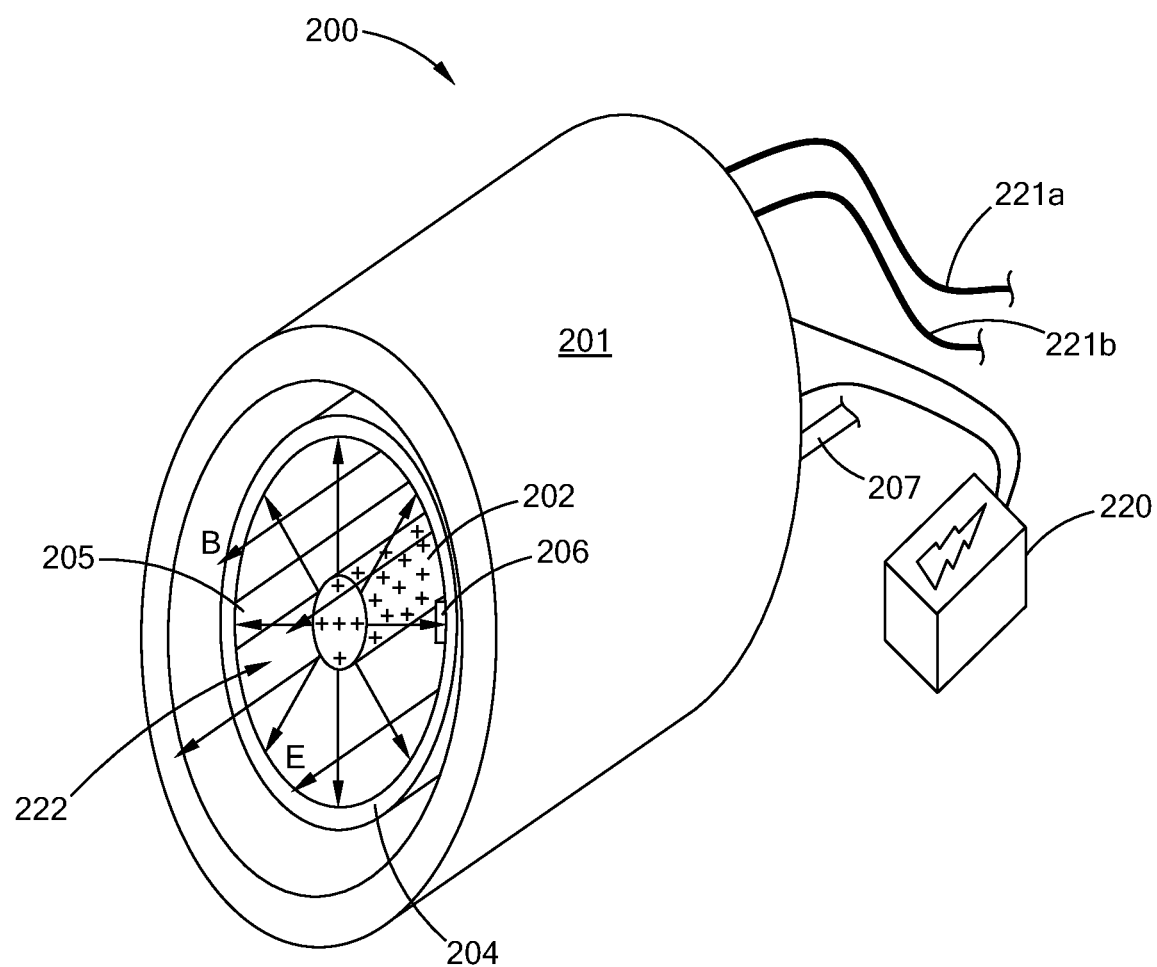

Turning to FIG. 2B, the electric field is created and is illustrated by the plus symbols on the inner electrode 202 and the arrows (E) extending radially outward from inner electrode 202 to the outer electrode 204. From this figure it can be seen that the electric field lines (E) are normal to the magnetic field lines (B). Preferably, the voltage is initially applied at a lower level to create weak ionization and slow initial rotation.

Figure 2C:
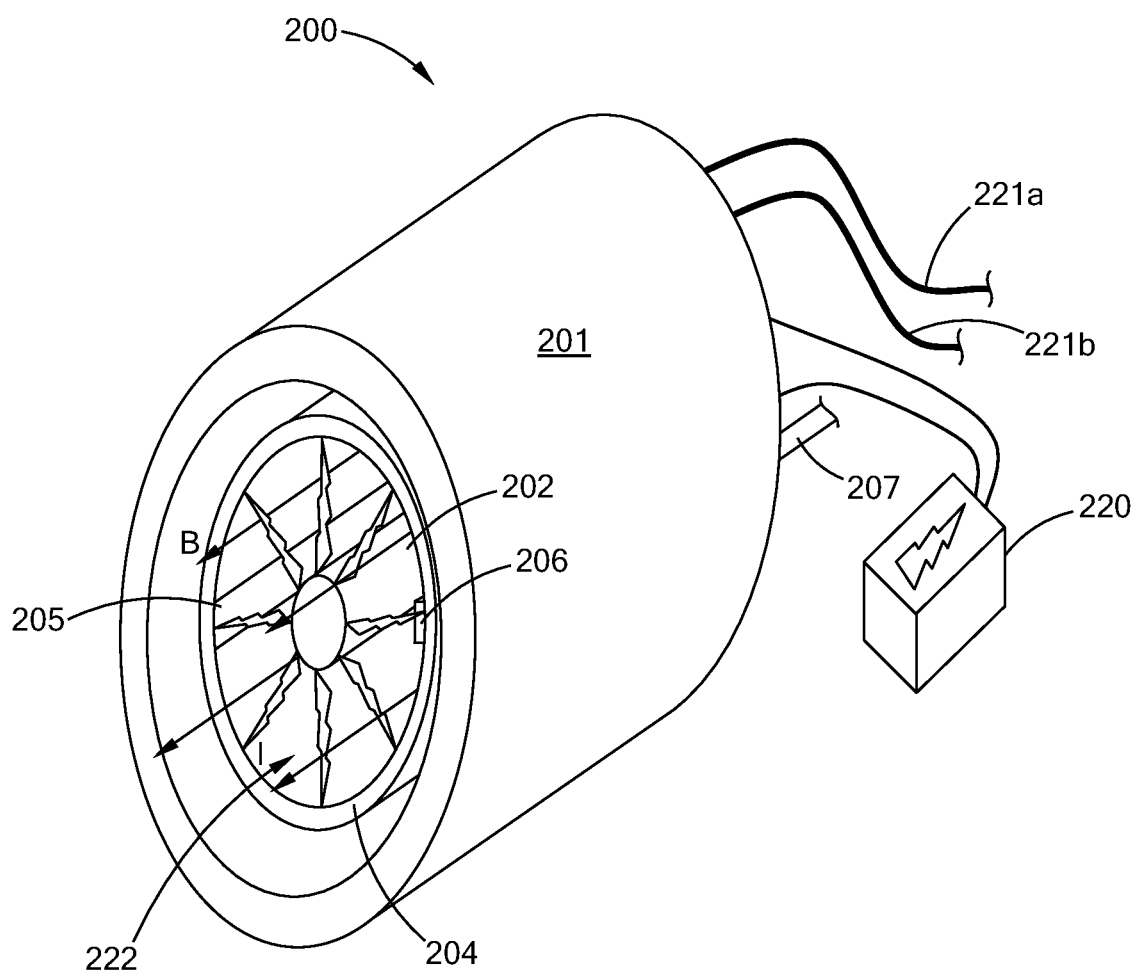

Turning to FIG. 2C, there is shown the creation of the weakly ionized plasma, which initially occurs at the application of the low power CW voltage. Thus, the electric field has ionized some hydrogen to create a weakly-ionized plasma (e.g., 1 ion for about every 100,000 neutrals). The presence of these ions allows current to flow, illustrated by the jagged lightning bolt-like lines (I) extending radially outward. The weakness of the plasma allows it to remain stable.

Figure 2D:
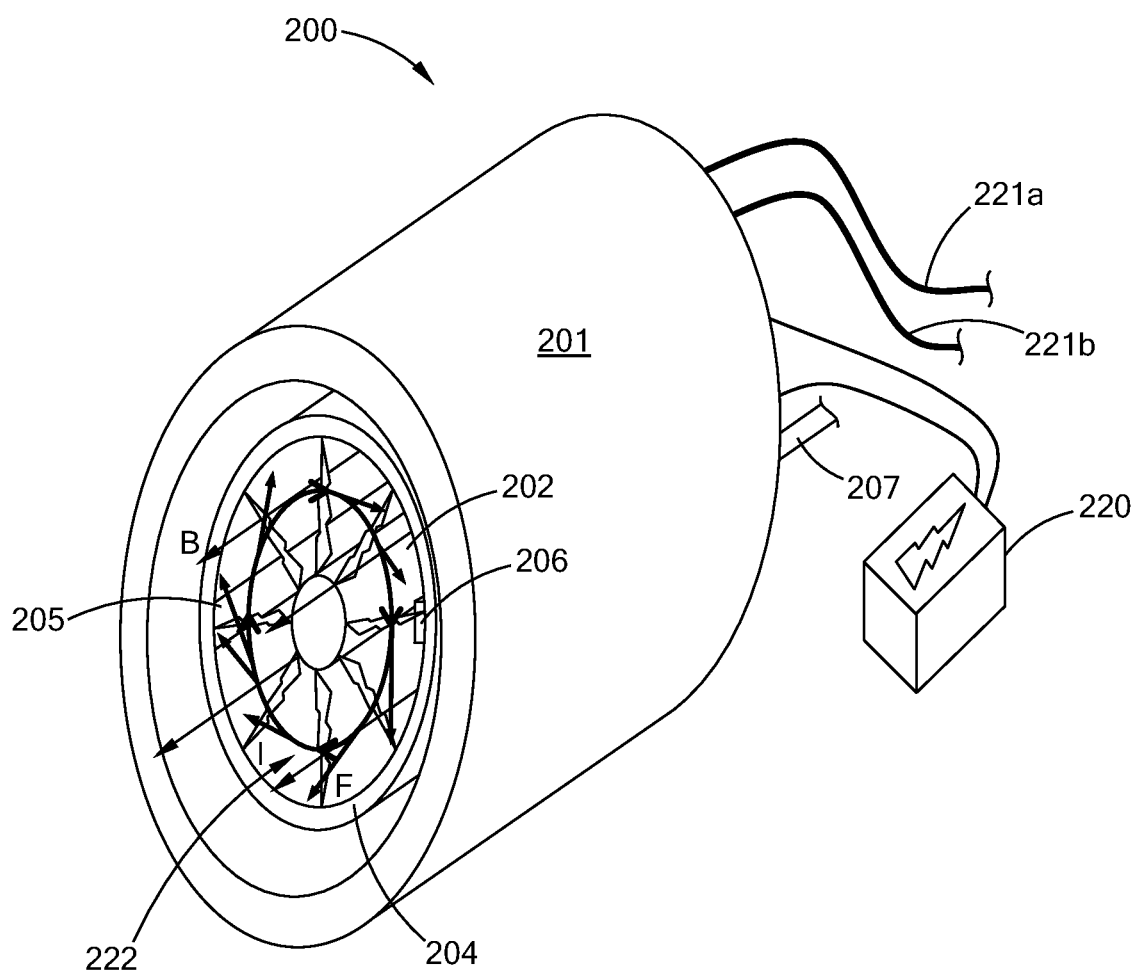

Proceeding then to FIG. 2D, the high power pulse has been applied across the electrodes, creating an azimuthal Lorentz force, shown by arrows (F), acting upon the ions in the weakly ionized plasma. The flow of the plasma current in both FIGS. 2C and 2D is illustrated by the jagged lightning bolt-like lines (I) extending radially outward. The direction of the Lorentz force (F) on the ions of the weakly ionized plasma is perpendicular to both the magnetic field (B) and electric field (E) (as shown by the tangential arrows in FIG. 2D), and induces a rotation in the direction of forces (F) and the circular arrows (R) shown in FIG. 2E.

Thus, the rotation of the ions in the weakly ionized plasma causes the neutrals (e.g., the non-ionized hydrogen) to rotate. It is believed that this rotation is caused by collisions between the ions and the neutrals. Thus the embodiment of FIG. 2 enables the acceleration of a substantial number of neutral particles by only a very few ions to an energy level sufficient for the fusion reaction.

For example, if using hydrogen the ratio of ions to neutrals may be from about 1:1,000 to about 1:120,000, from about 1:50,000 to about 1:100,000, from about 1:100,000 to about 1:180,000, 1 to at least about 1, 1 to at least about 10, 1 to at least about 100, 1 to at least about 1,000, 1 to at least about 10,000, 1 to at least about 50,000, 1 to at least about 80,000, 1 to at least about 100,000, 1 to at least about 180,000.

Figure 2E:
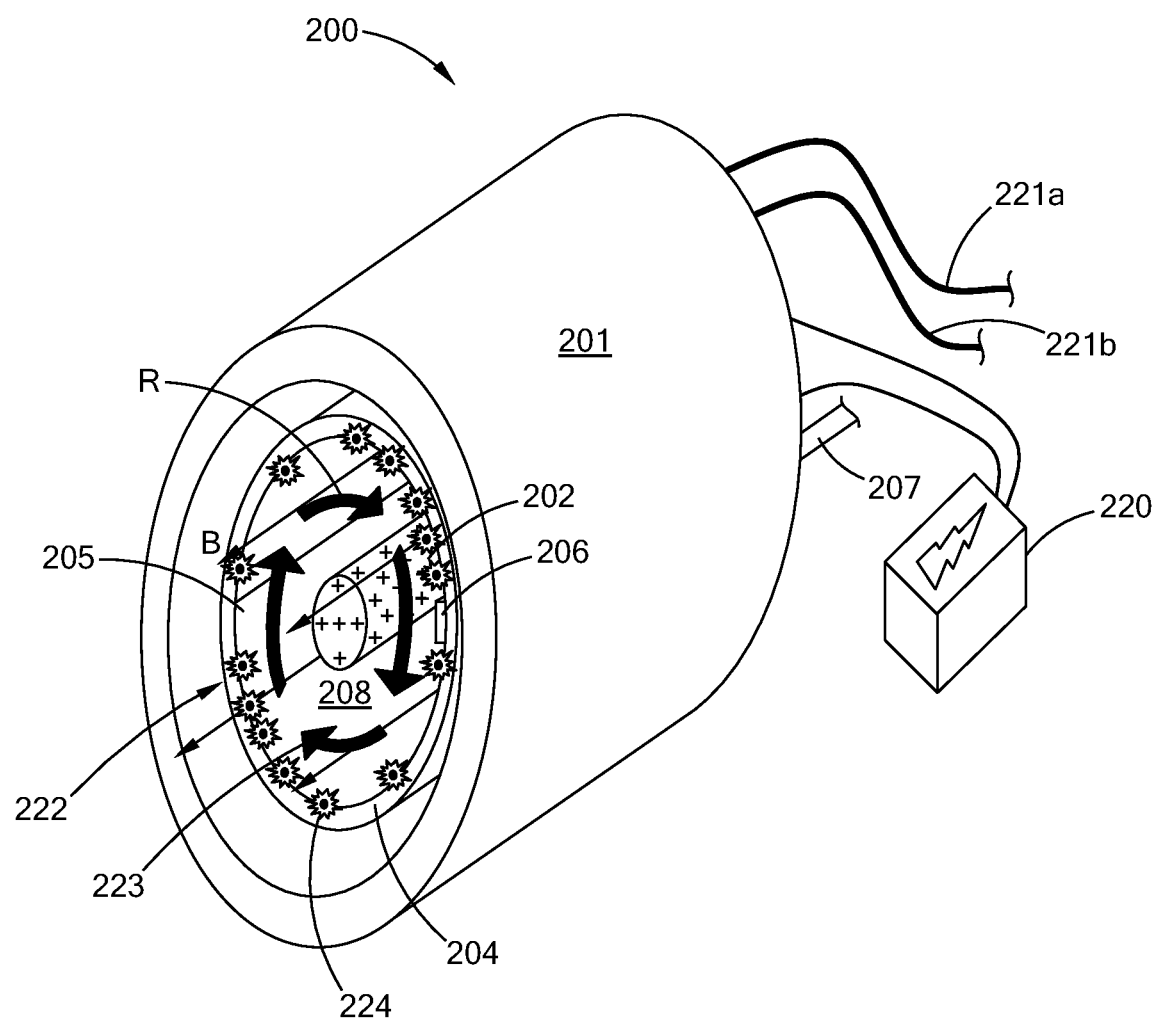

Thus, turning to FIG. 2E, there is illustrated in a conceptual manner the fusion reaction taking place along a fusion surface 208 which in this embodiment is the inner surface 208 of outer electrode 204. It is presently believed that in the embodiment of FIG. 2, the vast majority of the fusion reactions take place adjacent to the fusion surface. The fusion reaction is illustrated by the starburst-like graphics around the boron particles that are believed to have migrated from the boron plates 205 and 206.

Figure 4A:
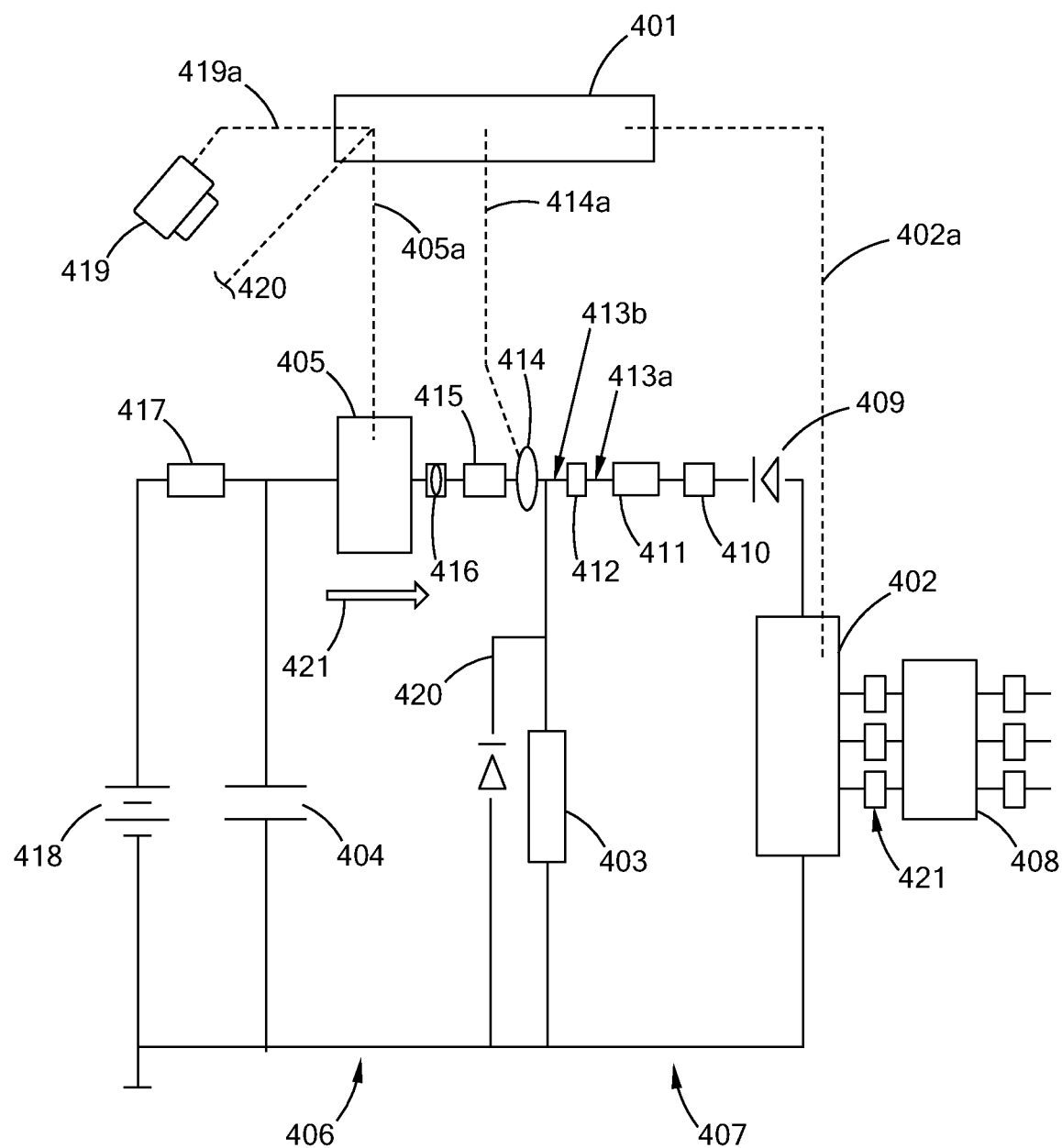
FIG. 4A shows an embodiment of a control apparatus and discharge circuit that is part of a controlled fusion device in accordance with the present inventions.

FIG. 4A depicts an embodiment of a control apparatus and discharge circuit that is part of a controlled fusion device, such as that depicted in FIG. 2. A system control block 401 allows an operator to manage and control one or more elements operatively interconnected with the controlled fusion device. The system control block 401 may include a computer. Alternatively, it may include manual switches or any other types of control interfaces known in the art. Communication pathways, e.g., control and data signal transmission and receipt and the like are as shown by dashed lines in the figure. The control apparatus includes a continuous wave (CW) discharge circuit 407 and a pulsed discharge circuit 406. The CW discharge circuit 407 is made up of a DC power supply 402 configured to deliver a voltage of between 1.4 and 2.0 kV, although other voltages are also possible. (data and control communication pathway is shown by dashed line 402a.) The DC power supply 402 has a bank of fuses 421 and a Variac 408 associated with it. The DC power supply 402 is operatively connected to electrodes in the controlled fusion device through an impedance of approximately 5 Ohms in order to apply continuous voltage across the plasma load 403. As discussed above with reference to FIG. 2, the CW voltage may pre-ionize the plasma and initiate rotation of the plasma. In operation, the CW discharge circuit 407 provides a current of approximately 10 to 50 Amps through the plasma. The CW discharge circuit 407 also has a high voltage probes 413a, 413b connected to, e.g., in data communication with, an oscilloscope, a 0.1 Ohm 1% resistance device 412, a 5 Ohm resistance device 411, a 30 Amp Fuse 410, and a 36 A 3 kV isolation diode 409. A crowbar diode 420 bridges the CW discharge circuit 407 and the pulsed discharge circuit 406.

The pulsed discharge circuit 406 is made up of a capacitor bank 404 which is charged to between 1.5 and 4 kV. In some embodiments, the capacitor bank 404 has a capacitance of 3.6 mF, although other capacitance values may be used. When the system control block closes the gate drive switch 405 (e.g., via control and data pathway 405a), the capacitor bank 404 is discharged through the plasma, creating a current (shown by arrow 421) of between 3 kA and 50 kA for approximately 10 to 15 milliseconds. This current pulse 421 induces rapid rotation of the plasma, up to about 100,000 RPS, which induces fusion. Other variations of a control apparatus and discharge circuit are also possible and would also fall within the scope and spirit of the present invention. The pulsed discharge circuit 406 also has a voltage source 418, from 1.5 kV to 4 kV, a 100 Ohm resistance device 417, a 16 micron hertz device 416, a 0.3 Ohm resistance device 415, and a current monitor 414 having a 10 As saturation (in control and data communication via pathway 414a). The system also has a control and data communications pathway 420 that is associated with the gas (puff) inlet valve (not shown), and a fast video camera 419 having data and communications pathway 419a.

As the voltage is applied and the degree of ionization increases, the current flows more readily, thus resulting in a perceived drop in the required voltage. Thus, as a result, sequencing or use of various sources of voltage may be employed, a low voltage CW source may be used to create initial start-up rotation, a high voltage may be used to form the requisite degree of ionization and high speed rotation (e.g., about at least 100,000 RPS), and then a lower voltage may be used for maintaining the degree of ionization and speed of rotation to conduct fusion reactions over an extended period of time. To enhance the overall efficiency of the system, it is preferred that for each type of voltage needed, the most efficient source of voltage be used. Thus, sequencing the power inputs such that as the conductivity increases inside the fusion region, the voltage input is reduced to track such increases. This in turn lowers the required power input, thereby increasing the overall gain of this fusion device.

Figure 3:
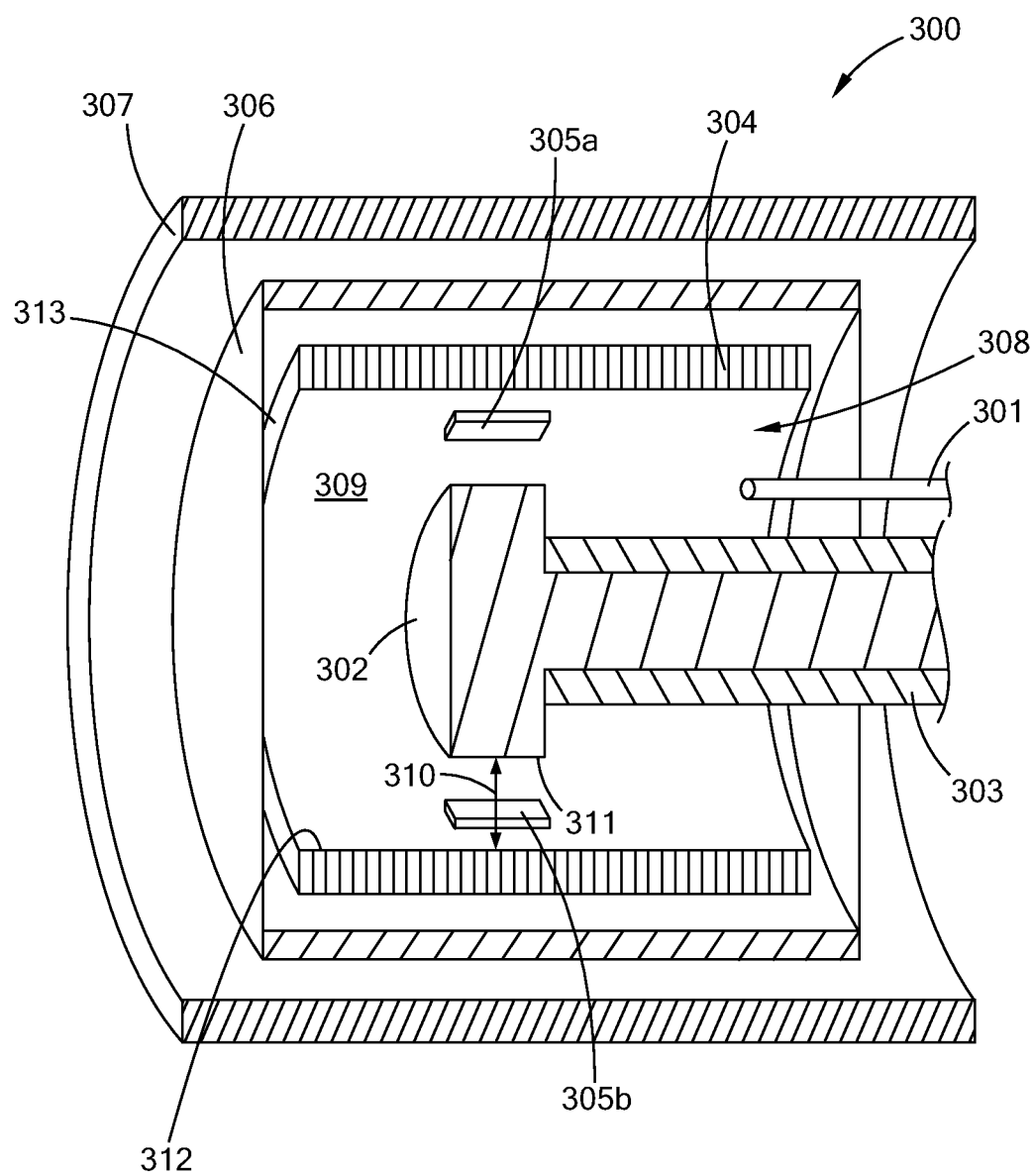
FIG. 3 shows a perspective cross-sectional view of an embodiment of a controlled fusion device in accordance with the present inventions.

Turning to FIG. 3, there is shown a perspective cross-sectional view of an embodiment of a controlled fusion device 300. The controlled fusion device 300 has a super-conducting magnet 307. Within the magnet 307, and thus within the magnetic field created by the magnet, are a controlled pressure chamber 306, an outer electrode 304, and an inner electrode 302. The inner electrode has insulation 303. Located on the inner surface 312 of the outer electrode 304 is a member 305a, having the second working material, and a second member 305b, having a second working material. A working gas inlet line 301 is located within the inner electrode 304 and within the magnet 307.

The outer electrode 304 is in the shape of a tube having an inner diameter of 16 centimeters (cm), and is made from copper. The wall 313 of the outer electrode 304 is about 2 cm in thickness. The inner electrode 302 is made from copper, and has an expanded, and uninsulated outer surface 311. The distance between the outer surface 311 of the inner electrode 302 and the inner surface 312 of the outer electrode 304 is shown by double arrow 310, and is about 3.5 cm. The members 305a, 305b are located axially across from the inner electrode's 302 outer surface 311.

A fusion chamber 308 is at least partially positioned within the magnetic field of the magnet 307. A fusion surface 309 is associated with the controlled pressure chamber 306.

The inner and the outer electrodes are electrically associated with a power source and circuit, for example of the type shown in FIG. 4B (which is described in further detail below in the specification), and thus there is provided a voltage across the two electrodes 304, 302. Preferably, in this embodiment the first working material, is a working gas, and in particular hydrogen, and the second working material is boron nitride or lanthanum hexaboride.

In the region between the outer surface 311 of the electrode 302 and the inner surface 312, the electric current is flowed through the first working material to create preferably a weakly ionized plasma. In operation, the fusion reaction takes place in the fusion cavity 308, and preferably adjacent the fusion surface 309.

It should be understood that this embodiment may be configured such that the components and their respective positions may be modified or changed. For example, multiple inner electrodes may be used, different configurations for the outer electrode may be used, more or fewer second working material members may be used, and a continuous ring may be used. The location and position of the working gas inlet line, the fusion chamber, the fusion surface and other components, as well, may be varied.

Figure 4B:
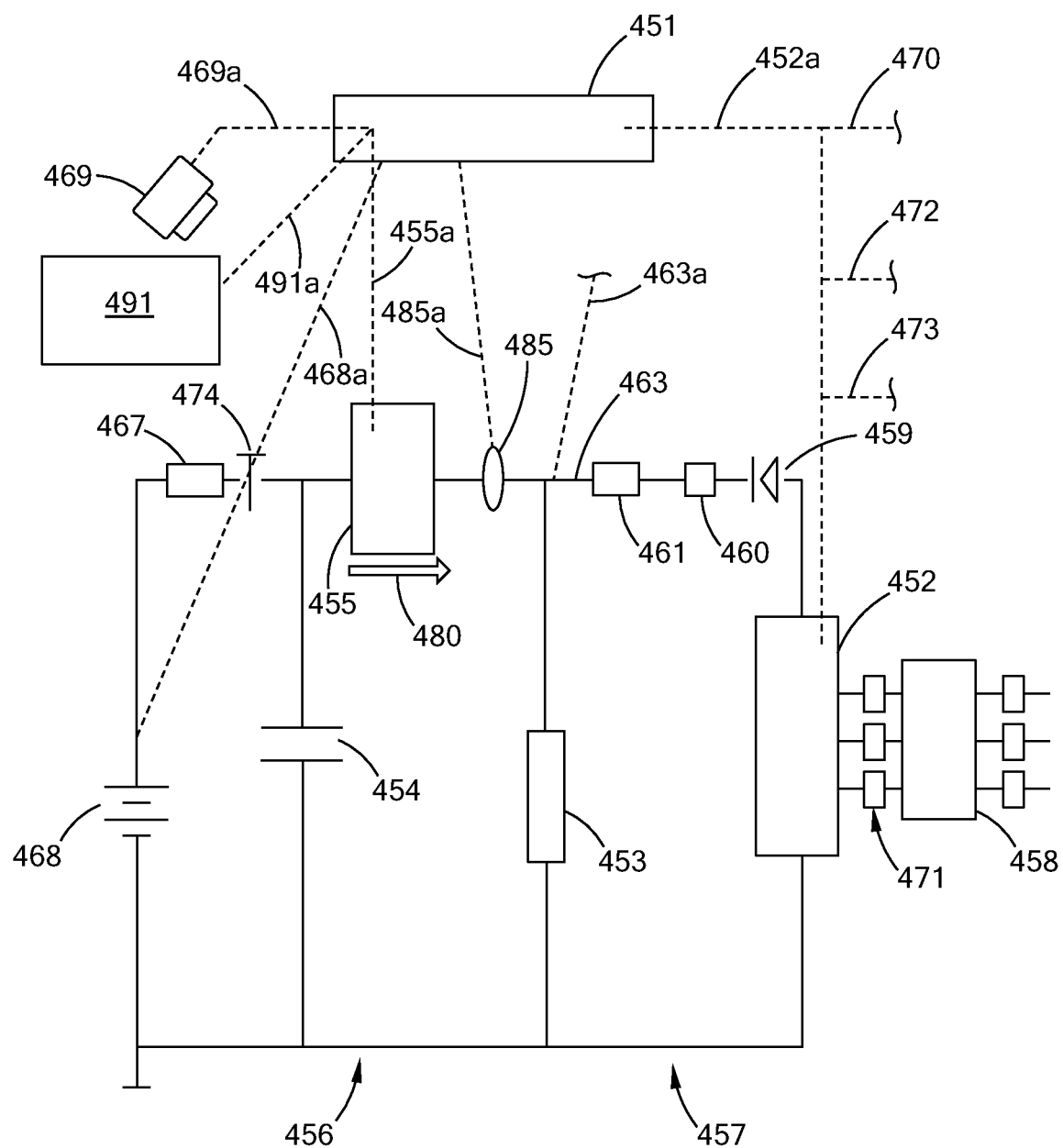
FIG. 4B shows another embodiment of a system control and discharge circuit in accordance with the present inventions.

FIG. 4B depicts another embodiment of a system control and discharge circuit which may be used in conjunction with the system described with reference to FIG. 3. The system control and discharge circuit includes a CW discharge circuit 457 and a pulsed discharge circuit 456. The CW discharge circuit 457 includes a DC power supply 452 configured to supply 1.44 kV through an impedance of between 6 and 18 Ohms across the plasma 453. However, other voltage levels and impedance values may be used. The DC power supply 452 is configured to supply on the order of 10 Amps across the plasma in order to pre-ionize the plasma and initiate rotation. The DC power supply 452 has a bank of fuses 471 and a transformer 458. The CW discharge circuit 457 also has a high voltage probes 463 in communication (via pathway 463a) with an oscilloscope (not shown), a 6-18 Ohm resistance device 461, a 30 Amp fuse 460, an isolation diode 459 (e.g., at 36 A, 3 kV).

The pulsed discharge circuit 456 includes a capacitor bank 454 with a capacitance of 5.6 mF, although other capacitance values are also possible. The capacitor bank is charged to approximately 3 kV, from power voltage source 468 (3 kV, 5 A). When the system control block 451 closes the pulse control switch 455, a current pulse of 3 to 30 kA (arrow 480) is applied to the plasma, inducing rapid rotation, which gives rise to fusion events. The pulsed discharge circuit 456 also has a 100 Ohm resistance device 467, a relay 474, and a 10 As saturation current monitor 485, and pathway 485a.

The control system and discharge circuit of the embodiment of FIG. 4B, has a controller 451 (which can be one or more controllers, PLCs, computers, processor-memory combinations, and variations and combinations of these). The controller 451 is in communication via a communication and data network having various communication pathways, illustrated as dashed lines. Thus, pathway 469a places a fast video camera 469 in communication with the controller 451, pathway 452a is associated with the DC power supply, pathway 470 is associated with the gas puff valve, pathway 472 is associated with a thermocouple, pathway 473 is associated with other monitoring equipment, e.g., additional oscilloscopes, pathway 491a is associated with an optical fiber monochromator 491, pathway 468a is associated with the voltage supply 468, and pathway 455a is associated with the pulse control 455.

Generally, the term "about" is meant to encompass a variance or range of ±10%, the experimental or instrument error associated with obtaining the stated value, and preferably the larger of these.

Embodiments of the present inventions may utilize quantum, electrostatic, mechanical, or other effects including, among other things, large E-fields, high electron densities, ponderomotive forces, modification or change of the Coulomb barrier, modification or change of the reaction cross section, space charge or electron shielding effects, the use of neutrals, ion-neutral coupling, nuclear magnetic moment interaction, spin polarization, magnetic dipole-dipole interaction, high particle density materials, compression forces associated with centrifugal forces or ponderomotive forces, phase transitions of hydrogen, positive feedback mechanisms, and modification and variations of these and other effects. All references in this specification to modifying, changing, lowering, reducing or eliminating the barrier include means by which the Coulomb barrier is offset by, or its effect is reduced by, the presence of one or more other features (e.g., high electron densities) even though the Coulomb barrier itself (independent of such features) remains unchanged.

It is noted that there is no requirement to provide or address the theory underlying the novel and groundbreaking fusion methods, devices and systems that are the subject of the present inventions. Nevertheless, these theories are provided to further advance the art in this important area. The theories put forth in this specification, unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the fusion methods, devices and system of the present inventions, and such later developed theories shall not serve to diminish or limit the scope of protection afforded the claimed inventions.

Modification or Change of the Coulomb Barrier

Figure 5A:
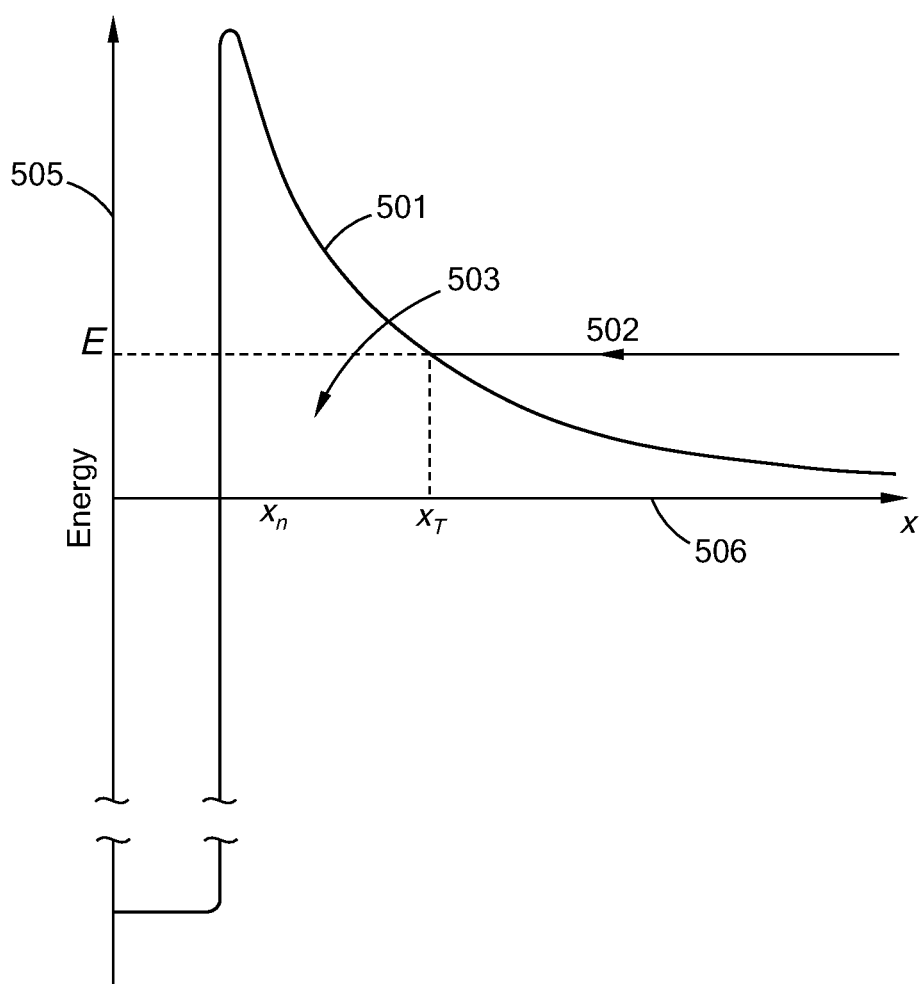
FIGS. 5A-5C show the potential energy curve of a two particle system in which a first nucleus is approaching a second nucleus, in accordance with an embodiment of the present inventions.
Figure 5B:
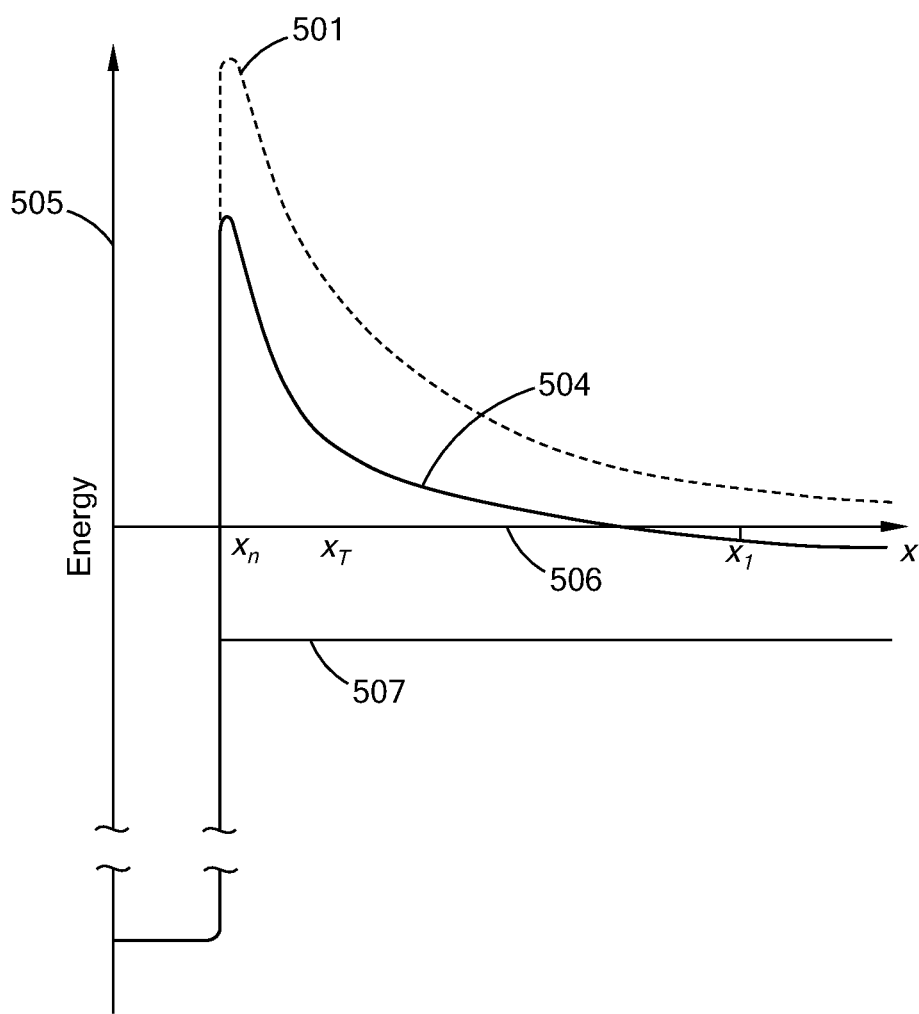
Figure 5C:
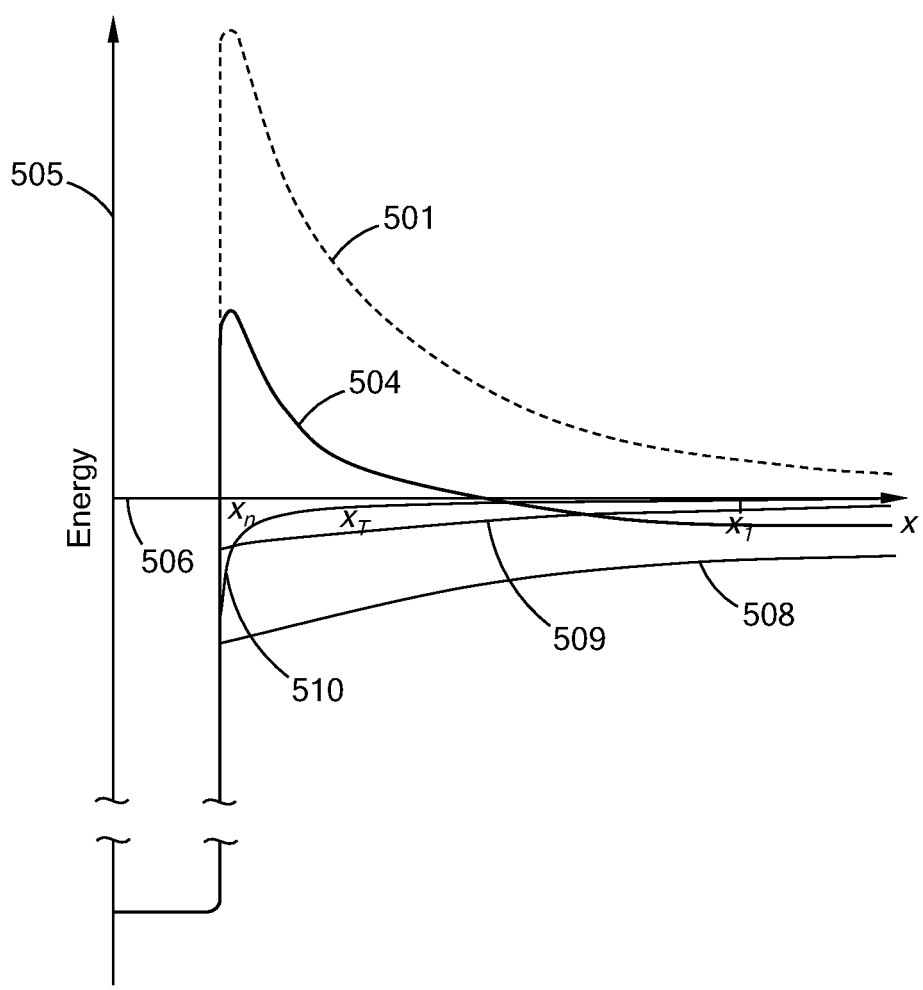

In order to fuse, two nuclei must come into contact; however, nuclei are very small (on the order of $10^{-15}$ m), and because they are positively charged, they are electrostatically repulsed by one another. Turning to FIG. 5A to 5C there are shown are shown examples of an explanation of the affects of an embodiment of the present inventions, through the illustrative use of a potential energy curve of a two particle system. The potential energy curve of a two particle system 501 in which a first nucleus 502 is approaching a second nucleus is illustrated in FIG. 5A. On the horizontal axis 506, x is the distance between the two nuclei. Energy of the system is shown on the y-axis 505. The system potential 501 is near zero when the first nucleus is located far away from the second nucleus, and increases as the first nucleus approaches the second nucleus. The system potential 501 is the sum of the repulsive (positive) Coulomb potential and the attractive (negative) strong nuclear force potential. Once the two nuclei are very close, at distance $x_n$ apart (where $x_n$ is approximately equal to the sum of the radii of the two fusing nuclei), the system potential 501 becomes negative due to the effect of the strong nuclear force. Thus, the term "Coulomb barrier" is used to describe the difficulty of bringing the two nuclei into contact, either by getting through or getting above the potential curve shown in FIG. 5A.

FIG. 5A labels the kinetic energy of the two-nucleus system, "$\epsilon$," as expressed by:

$$\epsilon = \frac{1}{2}m_r v^2$$

where $v=v_1-v_2$, $v_1$ and $v_2$ are the velocities of the two nuclei, and $m_r$ is the reduced mass of the system, given by:

$$m_r = \frac{m_1 m_2}{m_1 + m_2}$$

where $m_1$ and $m_2$ are the masses of the two nuclei. Classical mechanics holds that, when the nuclei are approaching one another, $\epsilon$ must be greater than the height of the Coulomb barrier for the nuclei to come into contact. However, quantum mechanics allows for "tunneling" through a potential barrier, $x_T$, thus making fusion reactions possible when $\epsilon$ is below this threshold. However, the magnitude of the barrier still presents an impediment to tunneling, $x_T$ such that reactions with larger Coulomb barriers (e.g., higher, wider, or both) are generally less likely to occur than those with smaller barriers. Thus, under classical mechanics energies in area 503 should not overcome the Coulomb barrier.

Embodiments of the present invention may lower or reduce the Coulomb barrier by creating, modifying, or utilizing effects that have negative (attractive) potentials. Such a negative potential is illustrated in FIG. 5B. In this figure, a negative potential 507 is shown, and the additive effect of the negative potential 507 and the initial system potential 501 creates a new, resultant system potential 504. This new resultant systems potential 507 has a distance $x_1$ where the potential starts out as negative, has a substantially lower Coulomb barrier, and the distance $x_T$ for tunneling reduced and closer to the distance where attraction takes over $x_n$.

Thus, for example, embodiments of the present invention may lower or reduce the Coulomb barrier through the use of effects such as: centrifugal effects; space charge or electron shielding effects; the use of neutrals; ion-neutral coupling; or nuclear magnetic moment interaction, spin polarization, or dipole-dipole interaction effects; and combinations and variations of these and other effects. FIG. 5C illustrates the resultant system potential 504 that arises from combining the initial system potential 503 with a centrifugal potential 508, an electron shielding potential 509, and a nuclear magnetic moment interaction potential 510. Each of these alone and in combination reduces the Coulomb barrier, (making it lower, less thick, and both) which makes it easier for the nuclei to tunnel through or overcome the potential barrier, thus increasing the probability that the fusion reaction will take place.

Centrifugal Potential

When a material rotates within a confined space, the confining walls provide a counterforce (centripetal force) to the force created by the rotating materials (centrifugal force). These countering forces compress the rotating materials against other materials in the area adjacent the confining walls. This compression gives rise to a negative centrifugal potential. A centrifugal potential effectively creates an attractive force towards the confining wall, and this force gets stronger as materials approach the confining wall. Embodiments of the present invention may generate a strong centrifugal potential by inducing rapid rotation of particles within a confined space, causing particles to accelerate toward the outer wall of the confinement structure. In one embodiment of the present inventions, rotation of the plasma produces a centrifugal acceleration of $10^9$ g, although this value can be made higher or lower by changing system parameters (for example, by changing the radius of curvature of the device, or by changing the azimuthal velocity of reactants). This centrifugal acceleration is analogous to gravity, but the effective force is directed radially outward, as opposed to radially inward in the case of gravity. Thus, at the localized fusion reaction site, i.e., between one nucleus and another, forces equivalent to pressures in the hundreds of millions, and even billions of psi may be present. One advantage of the use of centrifugal acceleration is that the material is compressed adjacent to a surface, rather than compressed toward a point. It is believed this provides a larger region where reactants are in close contact and fusion can take place, increasing the probability and rate of fusion. Thus, there is further provided readily and easily accessible means to extract the energy created from the fusion reaction for use. The effect of the centrifugal potential 506 is illustrated in FIG. 5C.

Electron Shielding

An advantage of using weakly ionized plasma is that the reactants largely comprise neutral atoms. The electrons interposed between the nuclei shield the repulsive Coulomb force between the positively charged nuclei. This phenomenon affects the Coulomb repulsion and may reduce the Coulomb barrier. In addition, using reactants that are highly efficient electron emitters introduces a cloud of electrons, a negative space charge, between the positively charged reactants, which further enhances this shielding effect. In an embodiment of the present invention, the second working material is selected to comprise lanthanum hexaboride, which has one of the highest electron emissivities of any known compound. It is believed that electrons emitted by the lanthanum hexaboride working material remain in the vicinity of the boron, and provide an electron shielding effect which reduces the Coulomb barrier and enhances the fusion reaction rate. In another embodiment the second working material comprises boron nitride, which is also an efficient electron emitter, and has a similar effect. The effect of the electron shielding potential 507 is illustrated in FIG. 5C. In a further embodiment, there is present in the system a material with a geometry or surface profile that creates non-uniform electric fields. Thus, by way of example, a lanthanum hexaboride surface with a dendritic profile may be desirable to generate localized electron shielding for fusion.

Nuclear Magnetic Moment Interactions

Many nuclei have an intrinsic "spin," a form of angular momentum, which is associated with their own small magnetic field. The magnetic field lines form as though one end of the nucleus were a magnetic north pole, and the other end were a magnetic south pole, leading the nucleus to be referred to as a "magnetic dipole," and the strength and orientation of the dipole described by the "nuclear magnetic moment."

Nuclear magnetic moments play a role in quantum tunneling. Specifically, when the magnetic moments of two nuclei are parallel, an attractive force between the two nuclei is created. As a result, the total potential barrier between two nuclei with parallel magnetic moments is lowered, and a tunneling event is more likely to occur. The reverse is true when two nuclei have antiparallel magnetic moments, the potential barrier is increased, and tunneling is less likely to occur.

When the magnetic moment of a particular type of nucleus is positive, the nucleus tends to align its magnetic moment in the direction of an applied magnetic field. Conversely, when the moment is negative, the nucleus tends to align antiparallel to an applied field. Most nuclei, including most nuclei which are of interest as potential fusion reactants, have positive magnetic moments (p, D, T, $^6$Li, $^7$Li, and $^{11}$B all have positive moments; $^3$He, and $^{15}$N have negative moments). In an embodiment of a controlled fusion device a magnetic field may be provided that aligns the magnetic moments in approximately the same direction at every point within the device where a magnetic field is present. This results in a reduction of the total potential energy barrier between nuclei when the first and second working materials have nuclear magnetic moments which are either both positive or both negative. It is believed that this leads to an increased rate of tunneling and a greater occurrence of fusion reactions. The effect of the nuclear magnetic moment interaction potential 508 is illustrated in FIG. 5C. This effect may also be referred to as spin polarization or magnetic dipole-dipole interaction. In addition, the gyration of a nucleus about a magnetic field line also contributes to determining the total angular momentum of the nucleus. So when the cyclotron motion of the nucleus produces additional angular momentum in the same direction as the polarization of the nuclear magnetic moment, the Coulomb barrier is further reduced.

Modification or Change of the Reaction Cross Section

The probability of a fusion reaction between a pair of nuclei is expressed by the reaction cross section, "σ." The cross section is typically measured in experiments as a function of ϵ by bombarding a stationary target of nuclei with a beam of nuclei. The cross section is normally defined such that:

$$\sigma = \frac{B}{I}$$

where B is the number of reactions per unit time per target nucleus, and I is the number of incident particles per unit time per unit target area. When cross section is defined and measured in this way, each fusion reaction will have a certain, specific cross section at a particular E for a given system.

The fusion reaction rate per unit volume in a particular reactor is normally described by:

$$R = \frac{n_1 n_2}{1 + \delta_{12}} \langle \sigma v \rangle$$

Here $\delta_{12}=1$ if the first nucleus and the second nucleus are the same type of nuclei (e.g., deuterium is being fused with deuterium) and $\delta_{12}=0$ otherwise, and $\langle \sigma v \rangle$ is the "averaged reactivity" of the system, defined as:

$$\langle \sigma v \rangle = \int_0^\infty \sigma(v) v f(v) dv$$

where $f(v)$ is the distribution function of the relative velocities, normalized in such a way that $\int_0^\infty f(v)dv=1$. When the second nucleus is at rest, $\langle \sigma v \rangle = \sigma v$; however, the preceding definition accounts for situations in which the second nucleus moves, and each pair of interacting nuclei may have a different relative velocity v.

The rate of fusion energy release is then given by:

$$\frac{dW}{dt} = RE$$

where W is the total fusion energy per unit volume released and E is the energy released by a single reaction (E=8.68 MeV in the case of p-$^{11}$B fusion).

The probability of the two nuclei coming into contact through a quantum tunneling event is described by the tunneling barrier transparency, "T," such that a higher value of T corresponds to greater likelihood of tunneling. Since tunneling is the primary mechanism by which fusion occurs, cross section is proportional to T ($\sigma \propto T$). T is approximated by:

$$T \approx e^{-\sqrt{\frac{\epsilon_G}{\epsilon}}}$$

where e is Euler's number, and $\epsilon_G$ is the modified energy of the Coulomb barrier. When the two nuclei are a distance $x \geq x_T$ apart, $\epsilon_G$ is described by:

$$\epsilon_G \propto \int_{x_n}^{x_T} q_1 \varphi(x) dx$$

Here, $q_1$ is the charge of the first nucleus, $\varphi(x)$ is the potential expressed as a function of x, and $x_T$ is the classical turning point at which $\varphi(x_T)=\epsilon$.

As a result of these relationships, a higher value of $\varphi$ (e.g., larger Coulomb barrier) will tend to translate into higher $\epsilon_G$, which in turn will tend to lead to lower T, lower σ, lower R, and, when E>0, lower $$\frac{dW}{dt}$$

for any specific system. Thus, systems in which $\varphi$ is high will tend to experience fewer fusion events and lower fusion energy release rates, and systems in which $\varphi$ is low will tend to experience more fusion events and higher fusion energy release rates. As discussed above, reducing the Coulomb barrier is equivalent to reducing $\varphi$, and embodiments of the present invention may employ these techniques to generally increase the cross section, σ; this also increases the fusion reaction rate.

High Particle Density

An embodiment of the present invention makes use of the electromagnetic force, requiring the presence of charged particles. However, instead of creating a strongly ionized plasma, we create a weakly ionized plasma, and then rely upon the ions to drive neutrals through the principle of ion-neutral coupling. This approach does not give rise to plasma instabilities, and so particle density ($n_1$ and $n_2$) can be many orders of magnitude higher than with a strongly ionized plasma. In an embodiment of the present invention, particle density is at least $10^{17}/cm^3$ throughout the entire volume of the device. Further, the compression induced by the centrifugal potential leads to an increased density of particles in the region in which fusion events are expected to be concentrated, leading to densities of about $10^{18}/cm^3$ in the region of the device where fusion reactions are concentrated.

In addition, an embodiment of the present invention uses boron compounds in a solid form, which have a particle density on the order of $10^{23}/cm^3$. Thus, in the region where fusion reactions are thought to be concentrated, the present invention achieves particle densities in a physical container many orders of magnitude greater than other methods known in the art (for example, it is believed that tokamak reactors have not achieved sustained particle densities greater than about $10^{14}/cm^3$).

An advantage of the present inventions is that they effectively suppress radiation losses due to electron bremsstrahlung. Conventional fusion reactors such as tokamaks employ hot, highly ionized plasma. Electron-ion interactions, resulting in bremsstrahlung and cyclotron radiation, are a significant source of energy loss and is one of the reasons such systems have not been able to satisfy the Lawson criterion. However, the high-density, lightly ionized, and colder plasma employed in embodiments of the present inventions suppresses electron mobility and greatly reduces radiative losses.

Phase Transition of Hydrogen Under High Pressures

Hydrogen atoms under high pressure compression can become liquid or solid metals, depending on the compressional forces and their states of rotation. In either the liquid or solid states, the density is many orders of magnitude higher than that in the gaseous state. The total reaction rate will be correspondingly higher according to the product of the particle densities of the two reactants.

In addition, metallic hydrogen becomes highly conductive or even a superconductor with zero resistance. This increases the overall conductivity of the entire system, lowering the resistive loss and the input energy required. Thus, the overall efficiency of such a system is greater, making it easier to attain a large Q factor and the corresponding energy gain.

Thus, it is presently theorized that as higher rotational speeds of the neutrals, such as, for example, hydrogen neutrals, are attained, these neutrals will become, or behave, in a manner like a liquid, solid, or superconductor. This form of the working material takes part in the fusion reaction, and is presently believed to be primarily located at the outer reaches of the fusion reaction chamber or zone nearer to the wall. The presence of this form of working material may greatly enhance the overall efficiency of the system.

Positive Feedback

The present invention may generate particles during operation. In some cases these particles may provide benefit to the device's function. In embodiments utilizing ionized particles, the creation of ionizing radiation may further enhance additional fusion by increasing, modifying, maintaining, or improving the ionization or rotational movement of a working material or plasma. Thus, by way of example, an apparatus using a weakly ionized plasma and a rotation mechanism wherein the first working material is hydrogen, and the second working material is boron, may generate alpha particles. These particles may ionize additional hydrogen, and may impart to them rotational energy. Thus, this synergistic effect of fusion products creating additional ions may have the effect of increasing rotational energy without the need for additional energy from an external source. Further, to prevent this feature from leading to a runaway reaction, the system temperature and the feed of hydrogen are constantly monitored, and the feed of hydrogen can be adjusted accordingly to modify the number of neutrals present, and thus control the rate of reaction.

Diagnostics that monitor oscillations in current and voltages, which may be in-situ, and may be of micro or nano scales, may be placed inside the controlled fusion device, may communicate wirelessly to the data-control center through Wi-Fi channels. This arrangement allows for the direct monitoring and management of conditions within the fusion reaction zone. This will result in an efficient design of the fusion system. Further diagnostics and monitoring systems and techniques, such as temperature, spectroscopy, laser diagnostics, temperature monitoring, particle detectors, video, and others known to the art may be utilized to establish a control and monitoring system for a fusion reactor and power generation system.

EXAMPLES

The following examples are provided to illustrate various embodiments of controlled fusion methods, devices and systems of the present inventions. These examples are for illustrative purposes, and should not be viewed as, and do not otherwise limit, the scope of the present inventions.

Example 1

A controlled fusion device of the general type shown in the embodiment of FIG. 3, was operated to provide a controlled fusion reaction that produced high-energy alpha particles and helium. The first working material in the device is hydrogen. The second working material in the device is boron that is introduced into the device through boron nitride targets, e.g., plates, on the inner walls of the outer electrode, and a lanthanum hexaboride target, e.g., disc, that is inserted into the reaction chamber by way of a rod. The magnet provides a magnetic field of 0.5 Tesla to the internal components of the controlled fusion device. The controlled pressure chamber is purged. After purging, the controlled pressure chamber and fusion cavity are filled with hydrogen gas to about 3 torr and at ambient temperature. A voltage of about 1.4 kV is applied through a current-limiting resistor to the inner electrode, creating a plasma current of about 25 A, which imparts, due to the Lorentz force created by the magnetic field and current, an initial or preliminary rotation believed to be about 800 to 2,000 RPS. The electrodes and apparatus are designed such that the electric field produced is substantially in a desired part of the apparatus, and minimizes arcing to the undesirable surfaces. After the initial rotation is established, a pulse of about 400 V to 1 kV between the outer and inner electrodes creates a plasma current of up to about 43 kA, which creates a weakly ionized plasma having a ratio of ions to neutrals believed to be about 1:100,000; and which imparts a rotation to the weakly ionized plasma (ions and neutrals) of at least about 100,000 RPS. The rotation of the weakly ionized plasma is maintained for about 10 milliseconds.

During this rotation of the weakly ionized plasma, alpha particles are created by a fusion reaction between a proton and a boron-11 nucleus. Additionally, during this reaction helium appeared when none was present before commencing the rotation. It is believed that the average kinetic energy of these protons is approximately 500 eV (electron-volts). The cumulative energy imparted to the three alpha particles produced by each fusion reaction is thought to be approximately 8.68 MeV.

The presence of helium in the fusion chamber was shown in part by a still image captured by a high-speed video camera of the interior of the chamber of the embodiment of the device. A boron target was placed in the chamber and a supply of hydrogen gas was introduced into the chamber. The still image was obtained by applying an optical filter centered at 587.5 nanometers, which is a wavelength in the strong emission spectrum of helium when excited by high energy particles. The captured image is provided in FIG. 6. This image was captured at t=10.74 ms after initiating a high voltage pulse in the discharge rod, e.g., inner electrode, in the chamber, thereby stimulating hydrogen-boron interaction in the chamber.

Figure 6:
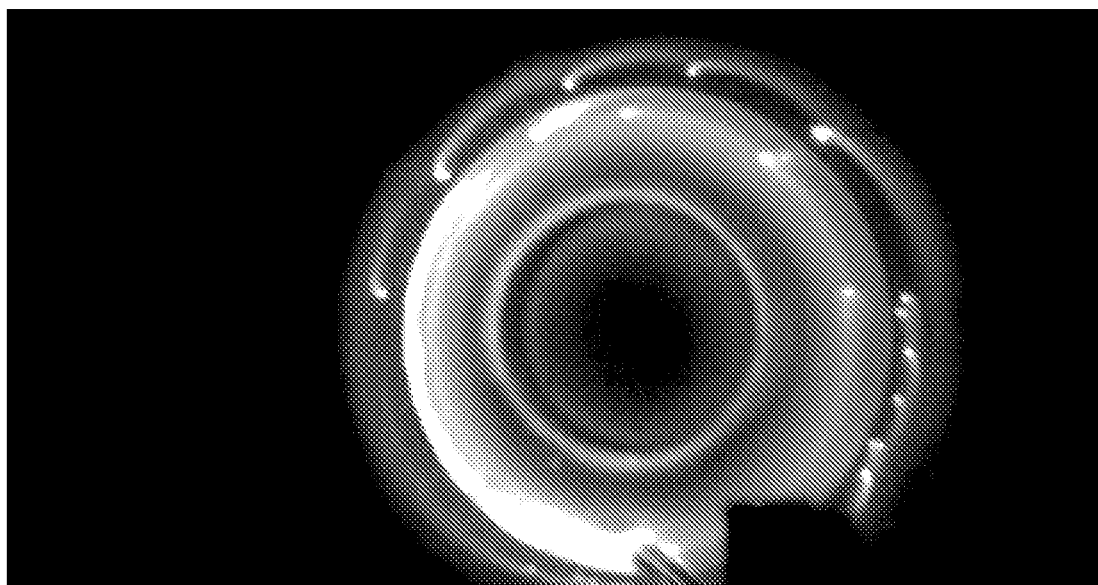
FIG. 6 is a still image captured by a high-speed video camera of the interior of the chamber of the embodiment of the device, in accordance with the present inventions, showing the presence of helium in the fusion chamber.

The presence of helium in the chamber as shown by FIG. 6 demonstrates that a plasma of ions and neutrals is created by the hydrogen gas, which is caused to rotate within the cylindrical chamber by the electric and magnetic fields at acceleration levels sufficient to cause fusion between particles in the plasma and the Boron target in the chamber, in accordance with the equation $H+^{11}B \rightarrow 3\,^4He^{++}+8.7$ MeV. Thus, FIG. 6 shows helium neutrals created as a result of hydrogen-boron interactions.

Figure 7:
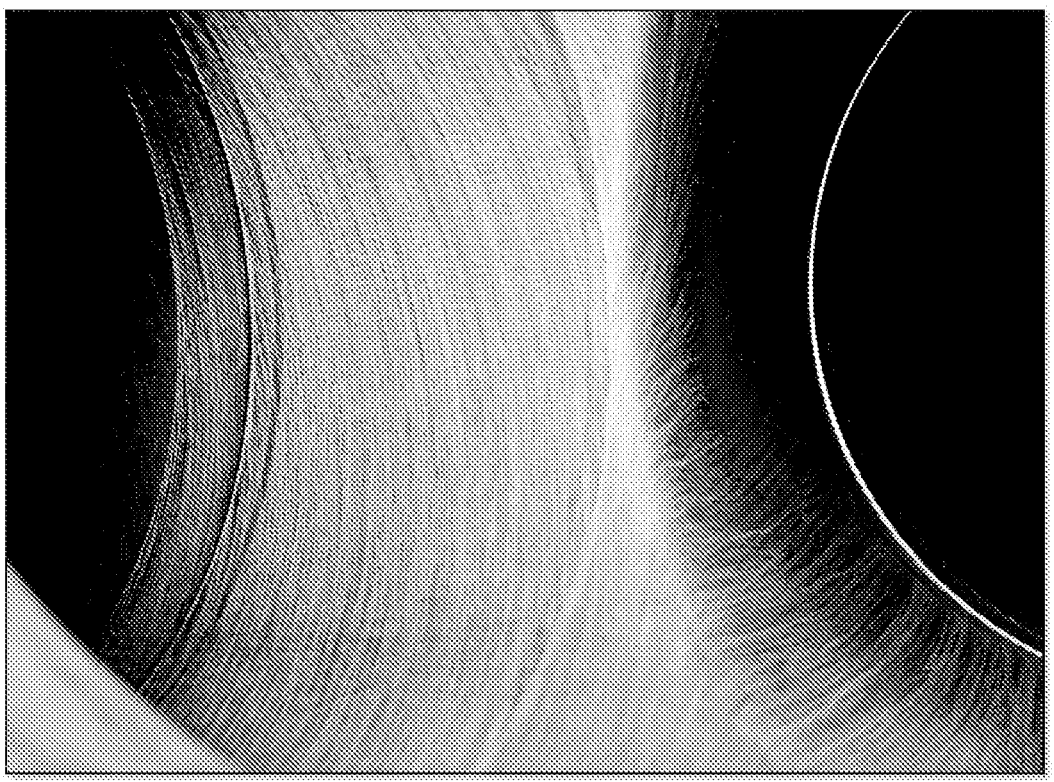
FIG. 7 is a still image of the inner surfaces of the device components in accordance with the present inventions, showing the presence of micro-etching, demonstrating the creation of high-energy particles.
Figure 8A:
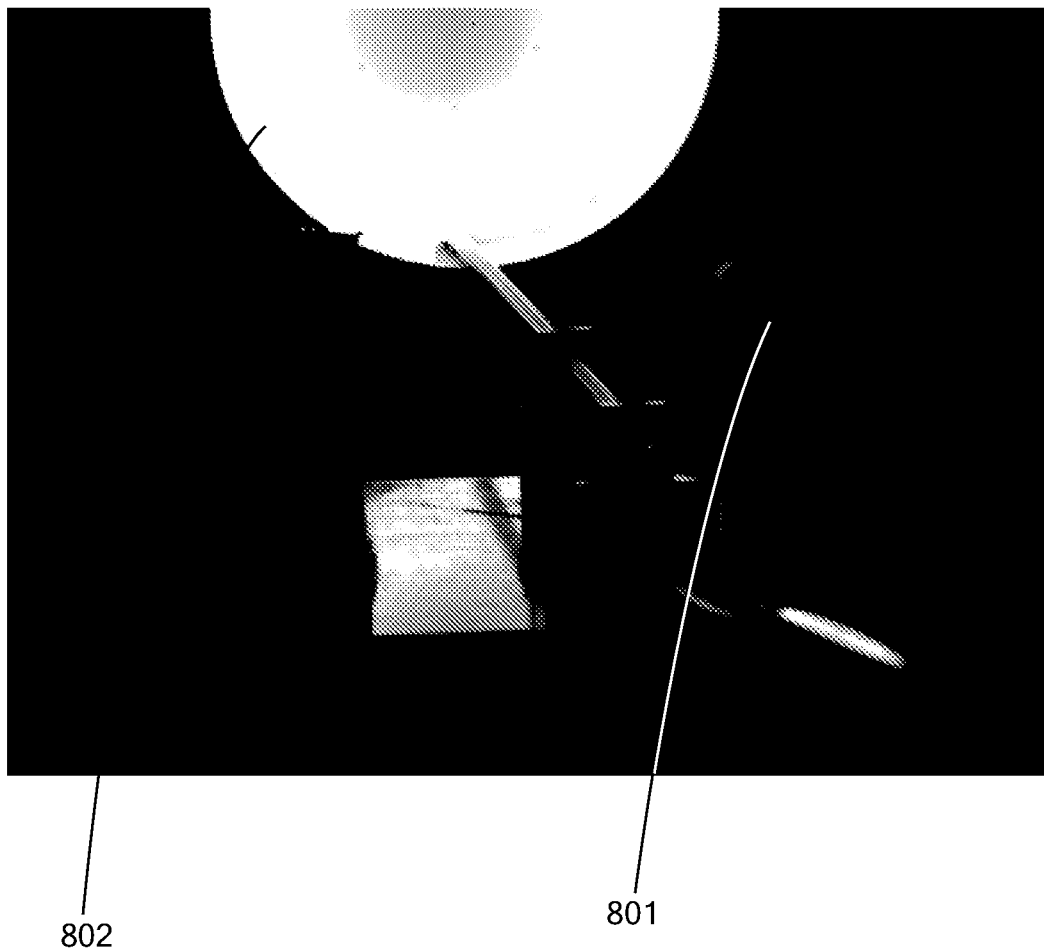
FIGS. 8A-8F are a series of photographs of a foil detector over an 8.25 millisecond time period showing the detector before any detectable impact (FIG. 8A) through various impacts during the fusion reaction (FIGS. 8B through 8D) through destruction (FIG. 8E) and being completely gone from its frame (FIG. 8F) in accordance with the present inventions.
Figure 8B:
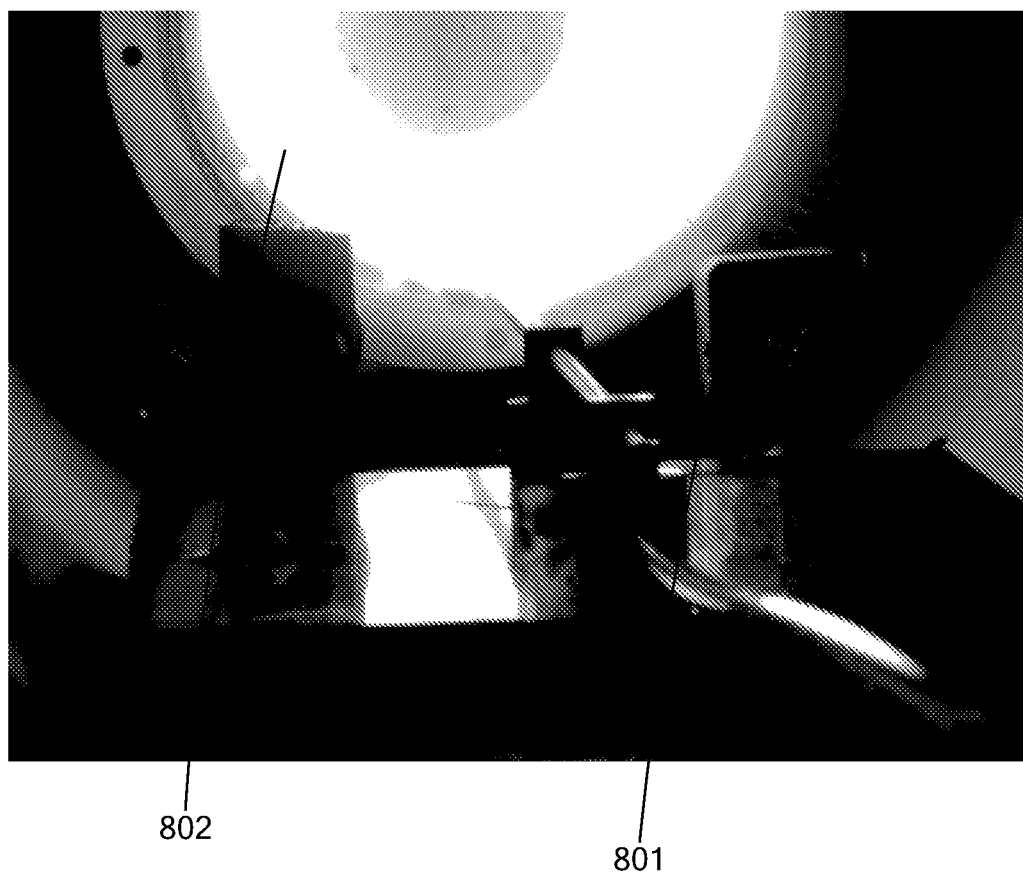
Figure 8C:
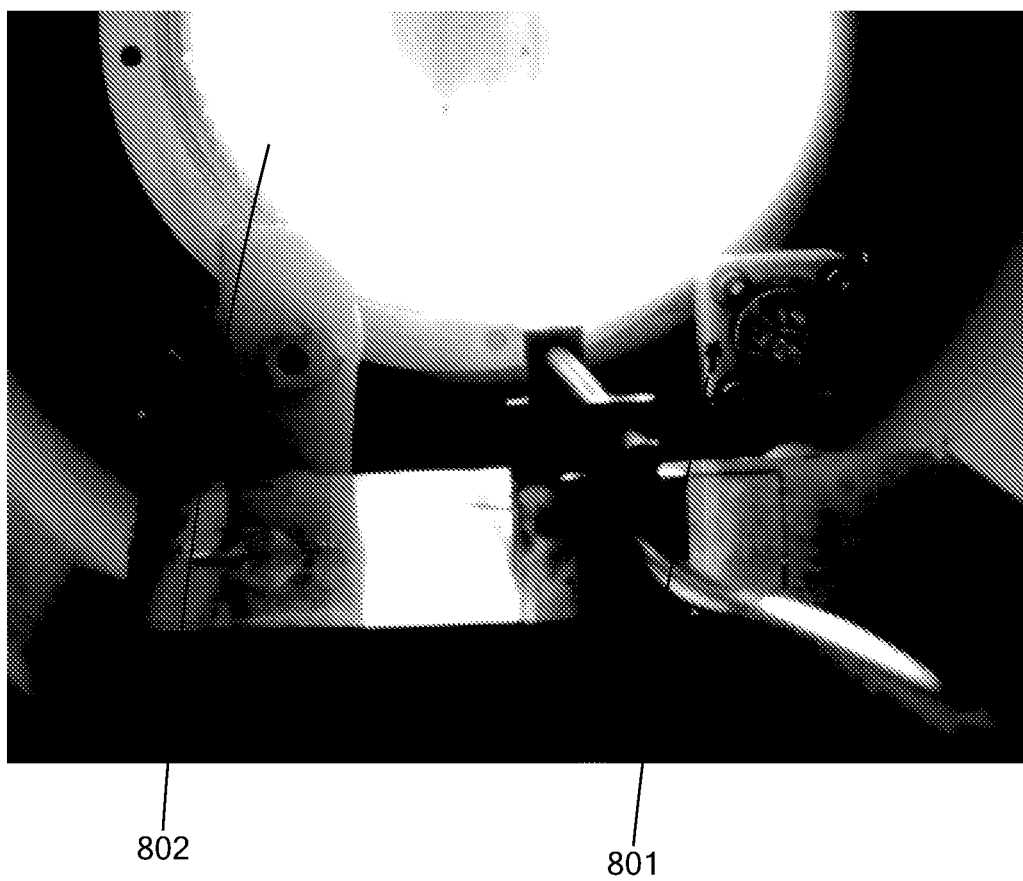
Figure 8D:
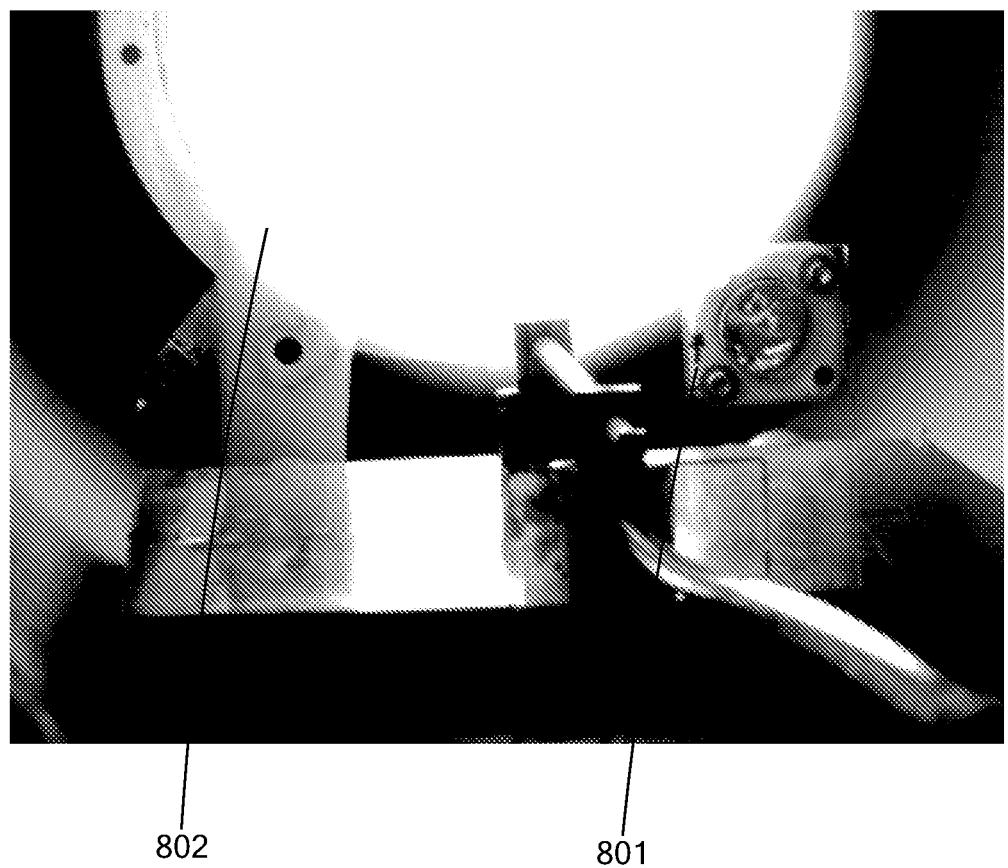
Figure 8E:
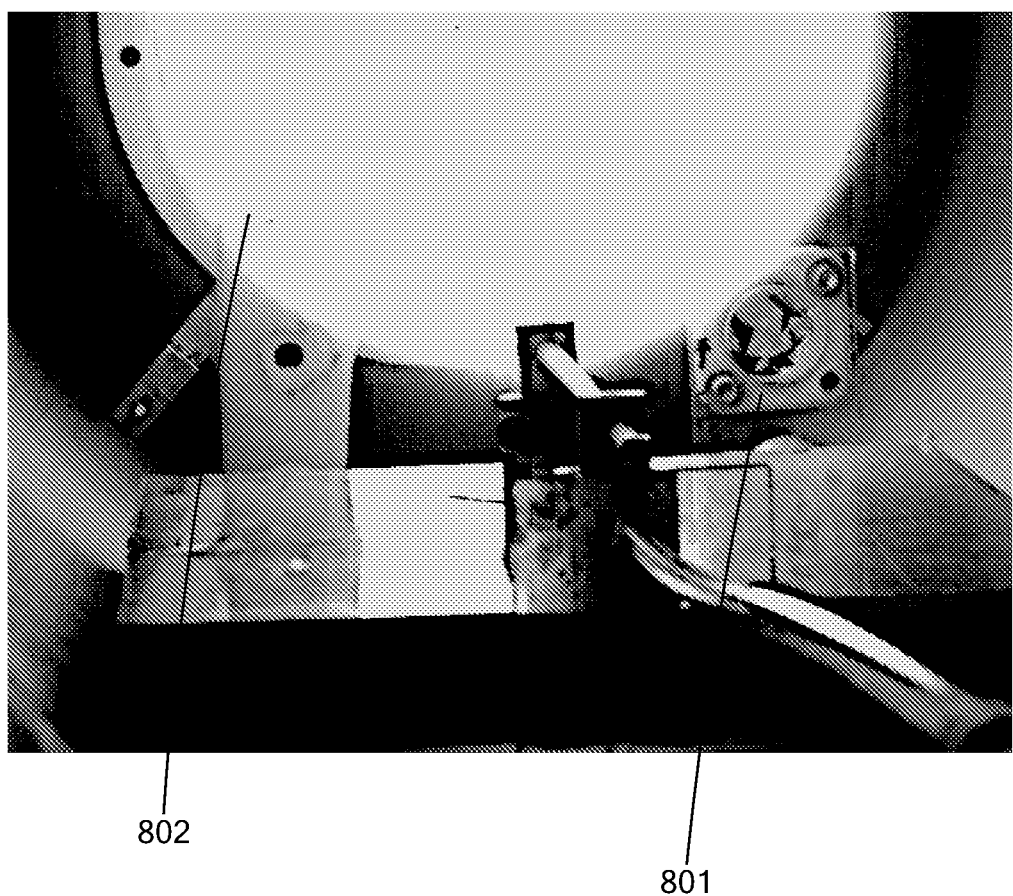
Figure 8F:
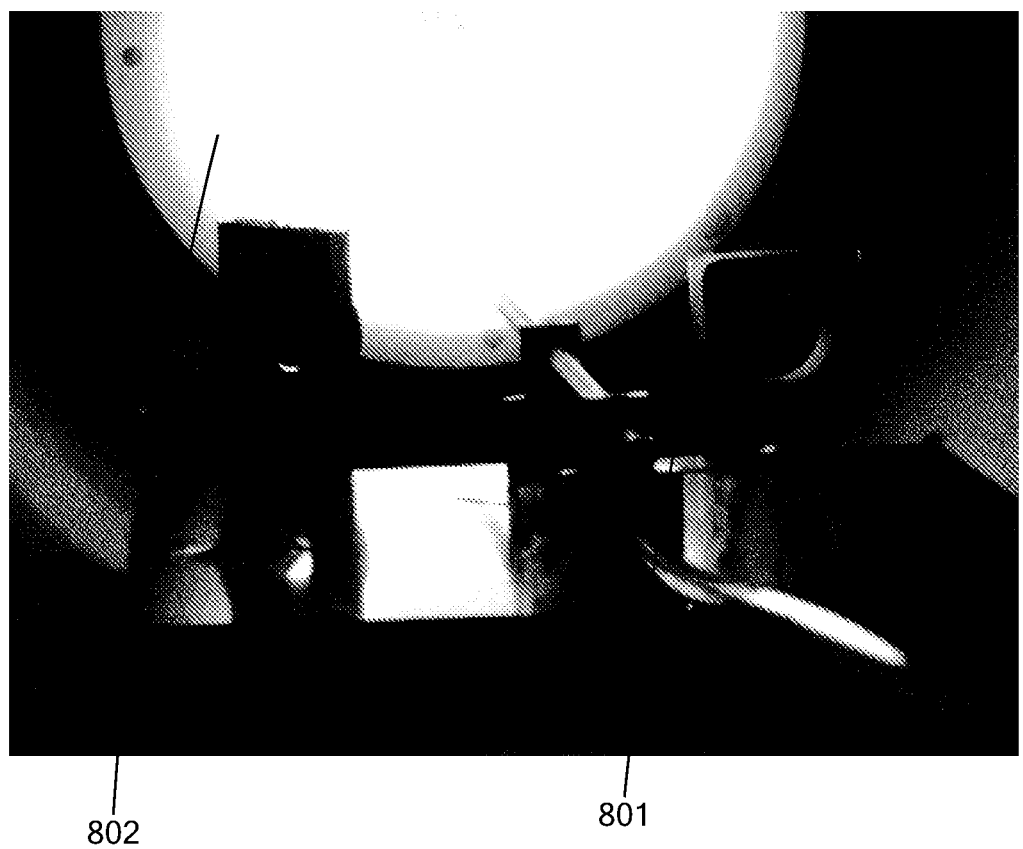

The creation of high-energy alpha particles was also shown by the presence of micro-etching on the inner surfaces of the device components, which for example is shown in the photograph of FIG. 7. Further, the creation of high-energy alpha particles was evidenced by the observed impacts on and ultimate destruction of a foil detector 801 located near to the fusion chamber 802. The foil detector 801 is made up of two sheets of aluminum foil, the first having a thickness of 1.2 µm, and the second having a thickness of 0.8 µm. The energy required to penetrate or significantly deform these foils with a single particle is at least about 2 MeV. FIGS. 8A to 8F are a series of photographs of the foil detector 801 over an 8.25 millisecond time period showing the detector before any detectable impact (FIG. 8A) through various impacts during the fusion reaction (FIGS. 8B through 8D) through destruction (FIG. 8E) and being completely gone from its frame (FIG. 8F). The direction of broken pieces of aluminum foil is downward and toward the rotating hydrogen, consistent with the rotation of the hydrogen atoms in the central generation region.

Example 1(a)

The method and device of Example 1 is operated at a sufficient magnetic field and voltage to provide at least about 250 MMBtu/hour of thermal energy. This thermal energy is converted by apparatus known to those of skill in the power and electrical generation arts, such as heat exchangers, steam turbines, and electrical generators, to provide at least about 25 MW of electricity.

Example 1(b)

Ten devices of the type of Example 1 are operated together to provide in combination to provide at least about 2,500 MMBtu/hour of thermal energy. This thermal energy is converted by apparatus known to those of skill in the power and electrical generation arts, such as heat exchangers, steam turbines, and electrical generators, to provide at least about 250 MW of electricity. Fewer or more of these devices may be combined to provide greater thermal energy, to provide backup units should one go offline, which assembly can be associated with heat conversion devices known to those in the art.

Example 1(c)

The method and device of Example 1 is operated at a sufficient magnetic field and voltage to provide at least about 10,000 MMBtu/hour of thermal energy. This thermal energy is converted by apparatus known to those of skill in the power and electrical generation arts, such as heat exchangers, steam turbines, and electrical generators, to provide at least about 1,000 MW of electricity.

Example 1(d)

The method and device of Example 1 is operated at a sufficient magnetic field and voltage to provide at least about 5 MMBtu/hour of thermal energy. This thermal energy is converted by apparatus known to those of skill in the power and electrical generation arts, such as heat exchangers, steam turbines, and electrical generators, to provide at least about 500 kW of electricity. One or more of the devices of Example 1 may be combined to provide greater thermal energy, to provide backup units should one go offline, which assembly can be associated with heat conversion devices known to those in the art.

Example 1(e)

The method and device of Example 1 is operated at a sufficient magnetic field and voltage to provide at least about 0.1 MMBtu/hour of thermal energy. This thermal energy is converted by apparatus known to those of skill in the power and electrical generation arts, such as heat exchangers, steam turbines, and electrical generators, to provide at least about 10 kW of electricity. One or more of the devices of Example 1 may be combined to provide greater thermal energy, to provide backup units should one go offline, which assembly can be associated with heat conversion devices known to those in the art.

Example 2

The operation of the device along the lines of Example 1 was repeated over 400 times. Each time the evidence of the creation of helium and high energy alpha particles was observed.

Example 3

An embodiment of a controlled fusion device generally of the type of the embodiment shown in FIG. 3, has a rare earth magnet.

Example 3(a)

An embodiment of a controlled fusion device is of the general type of the embodiment shown in FIG. 3, has an electromagnet.

Example 4

Figure 9A:
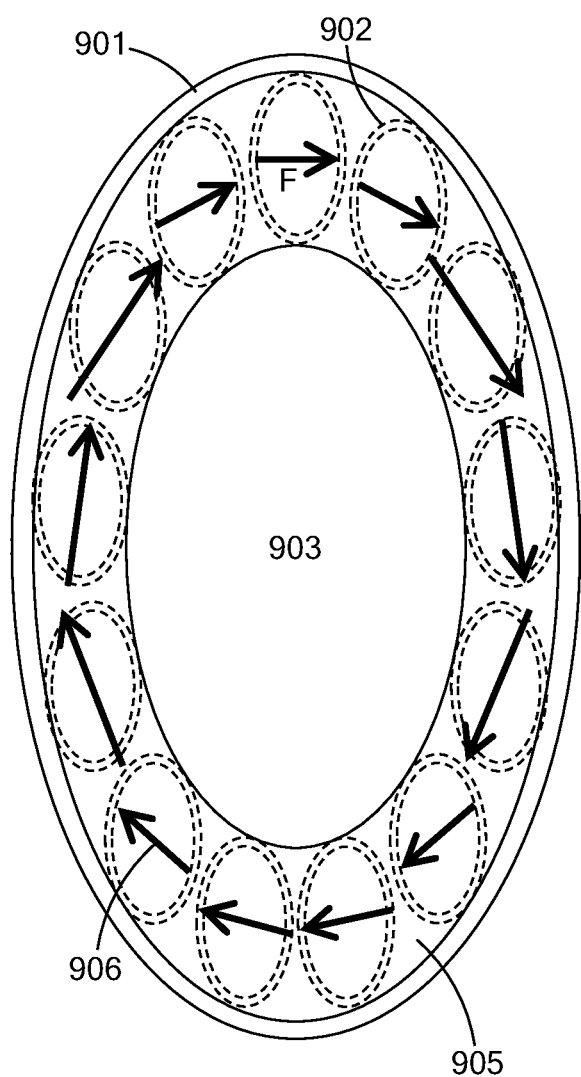
FIG. 9A is an axial cross sectional view of an embodiment of a controlled fusion device in accordance with the present inventions, which has an outer electrode and a concentric inner electrode, with localized axial magnetic fields generated within the annular space between the two electrodes.
Figure 9B:
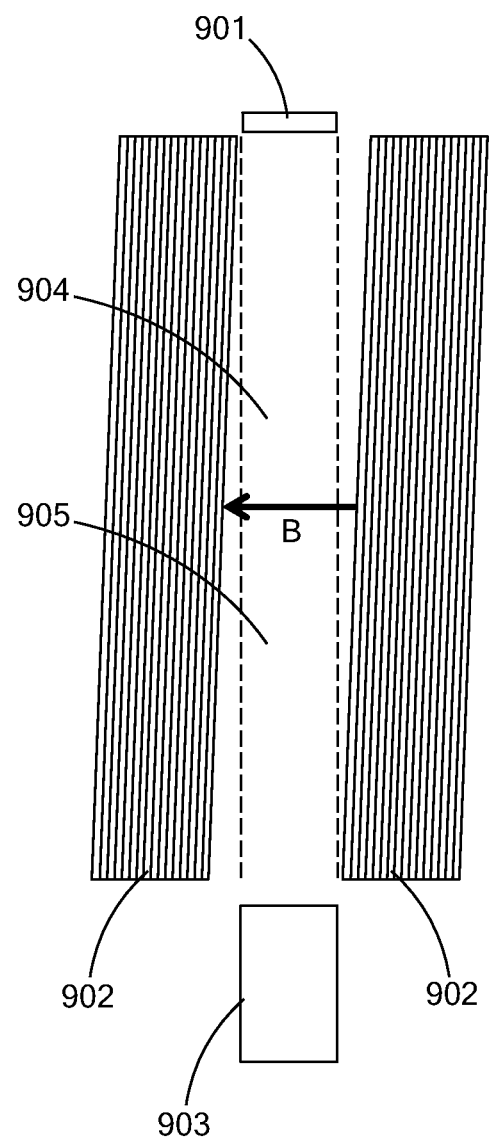
FIG. 9B is a side cross sectional view of the embodiment of the device of FIG. 9A.

An embodiment of a controlled fusion device is shown in FIGS. 9A and 9B, with FIG. 9A being an axial cross sectional view and FIG. 9B being a transverse cross sectional view. This embodiment has an outer electrode 901 and a concentric inner electrode 903, with localized axial magnetic fields 904 generated within the annular space between the two electrodes 901, 903. The magnetic fields are generated by current-carrying coils 902 placed axially adjacent to either side of the region 905 in which rotation is to be incited, and operated such that the magnetic field generated by each pair of coils 902 is oriented in the same axial direction (e.g., arrow B). Thus, in this embodiment, the magnetic fields generated by the coil pairs extends parallel to the central axis in the region of interest between the two electrodes, inducing rotation of the plasma. This embodiment may have advantages for large-scale applications, such as large-scale electrical power generation units.

Example 4(a)

The method and device of Example 4 is operated at a sufficient magnetic field and voltage to provide at least about 250 MMBtu/hour of thermal energy. This thermal energy is converted by apparatus known to those of skill in the power and electrical generation arts, such as heat exchangers, steam turbines, and electrical generators, to provide at least about 25 MW of electricity.

Example 4(b)

Ten devices of the type of Example 4 are operated together to provide in combination to provide at least about 2,500 MMBtu/hour of thermal energy. This thermal energy is converted by apparatus known to those of skill in the power and electrical generation arts, such as heat exchangers, steam turbines, and electrical generators, to provide at least about 250 MW of electricity. Fewer or more of these devices may be combined to provide greater thermal energy, to provide backup units should one go offline, which assembly can be associated with heat conversion devices known to those in the art.

Example 4(c)

The method and device of Example 4 is operated at a sufficient magnetic field and voltage to provide at least about 10,000 MMBtu/hour of thermal energy. This thermal energy is converted by apparatus known to those of skill in the power and electrical generation arts, such as heat exchangers, steam turbines, and electrical generators, to provide at least about 1,000 MW of electricity.

Example 4(d)

The method and device of Example 4 is operated at a sufficient magnetic field and voltage to provide at least about 5 MMBtu/hour of thermal energy. This thermal energy is converted by apparatus known to those of skill in the power and electrical generation arts, such as heat exchangers, steam turbines, and electrical generators, to provide at least about 500 kW of electricity. One or more of the devices of Example 4 may be combined to provide greater thermal energy, to provide backup units should one go offline, which assembly can be associated with heat conversion devices known to those in the art.

Example 4(e)

The method and device of Example 4 is operated at a sufficient magnetic field and voltage to provide at least about 0.1 MMBtu/hour of thermal energy. This thermal energy is converted by apparatus known to those of skill in the power and electrical generation arts, such as heat exchangers, steam turbines, and electrical generators, to provide at least about 10 kW of electricity. One or more of the devices of Example 4 may be combined to provide greater thermal energy, to provide backup units should one go offline, which assembly can be associated with heat conversion devices known to those in the art.

Example 5

Figure 10:
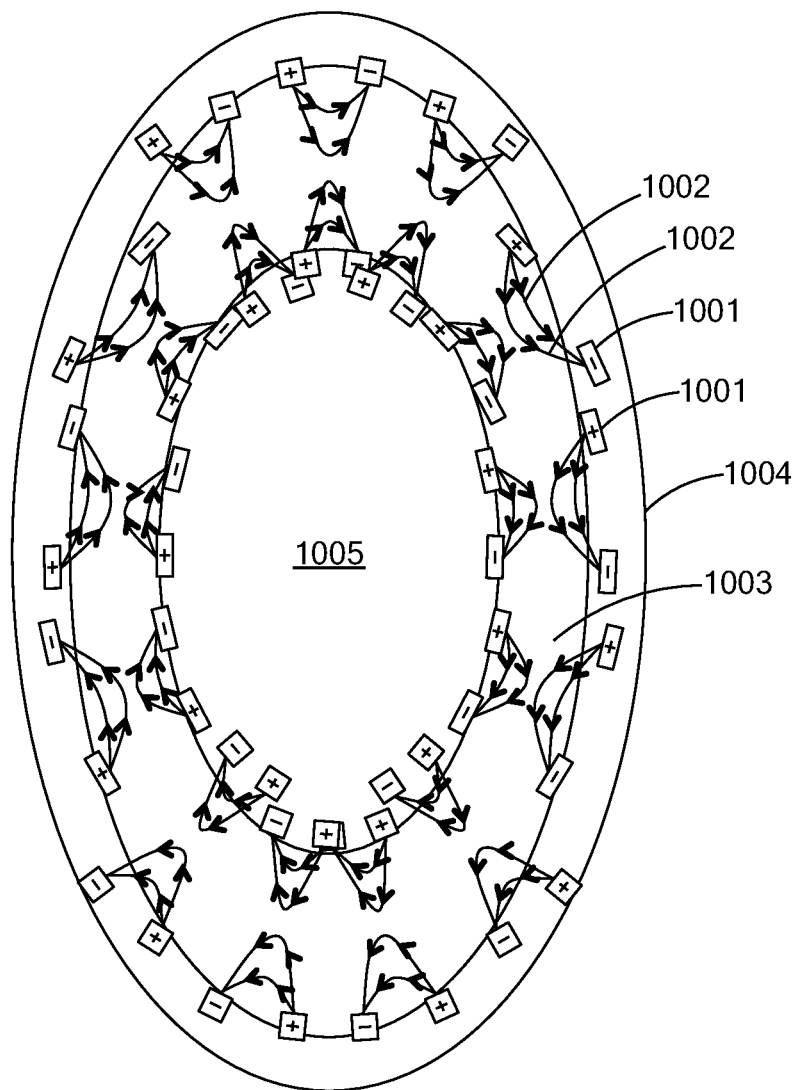
FIG. 10 is an axial cross sectional view of an embodiment of a controlled fusion device in accordance the present inventions, where material is accelerated azimuthally by means of using electrodes to generate localized electric fields within the annular space in which the material is rotating.

In an embodiment of a controlled fusion device, as shown in FIG. 10, material is accelerated azimuthally by means of using electrodes e.g., 1001 to generate localized electric fields, e.g., 1002 within the annular space 1003 in which the material is rotating. The electric fields are oscillated to accelerate the material in the intended direction (much as a Maglev train is propelled by oscillating magnetic fields in the track). Inner electrodes (inner surface of annular space 1003) are mounted on support 1005 and outer electrodes (outer surface of annular space 1003) are on support 1004. Some ions are present in the rotating material, because neutral atoms will not experience direct force as a result of electric fields, but a relatively small number of ions are sufficient to drive neutrals through the principle of ion-neutral coupling. This system does not require an axial static magnetic field.

Example 6

A controlled fusion device of the general type shown in the embodiment of FIG. 3, is operated to provide a controlled fusion reaction that produced high-energy alpha particles and helium. The first working material in the device is hydrogen. The second working material in the device is lithium. The magnet provides a magnetic field of 0.5 Tesla to the internal components of the controlled fusion device. The controlled pressure chamber is purged. After purging, the controlled pressure chamber and fusion cavity are filled with hydrogen gas to about 3 torr and at ambient temperature. A voltage of about 1.4 kV is applied through a current-limiting resistor to the inner electrode, creating a plasma current of about 25 A, which imparts, due to the Lorentz force created by the magnetic field and current, an initial or preliminary rotation believed to be about 800 to 2,000 RPS. After the initial rotation is established, a pulse of about 400 V to 1 kV between the outer and inner electrodes creates a plasma current of up to about 43 kA, which creates a weakly ionized plasma having a ratio of ions to neutrals believed to be about 1:100,000; and which imparts a rotation to the weakly ionized plasma (ions and neutrals) of at least about 100,000 RPS. The rotation of the weakly ionized plasma is maintained for about 10 milliseconds, wherein fusion reactions take place.

Example 7

Figure 11:
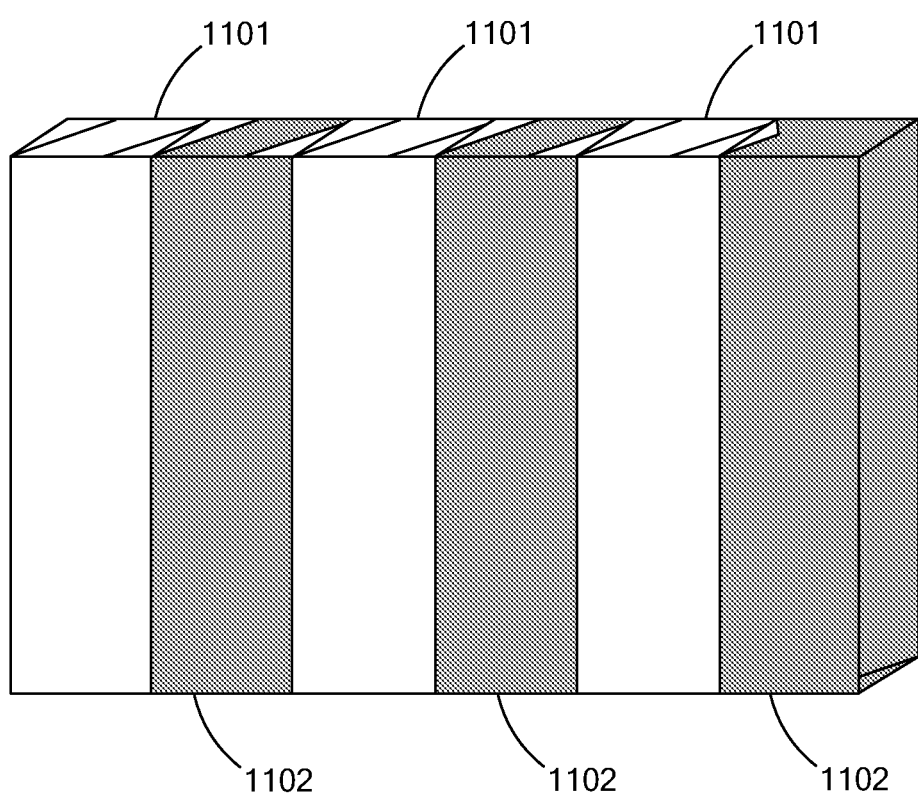
FIG. 11 shows an embodiment of a controlled fusion device in accordance with the present inventions where the second working material consists of multiple materials in solid form.

In an embodiment of a controlled fusion device, the second working material consists of multiple materials in solid form, as shown in FIG. 11. One material, elemental boron 1101, is arranged in a composite structure with a second material, barium oxide 1102. Elemental boron is selected to provide a source of boron necessary for the reaction of hydrogen-1 and boron-11 (the first working material is hydrogen). It is desirable for the second working material to be an efficient electron emitter in order to create a strong electron shielding effect, which lowers the Coulomb barrier and increases the rate of fusion. Elemental boron is a less efficient electron emitter; barium oxide is an efficient electron emitter. In this manner, the composite has a synergistic effect of combining the benefits or greater benefits of each material. By constructing the second working material to include both a fusion reactant and an efficient electron emitter, a strong electron shielding effect is created. Further, in addition to a layered structure as shown in FIG. 11, it is contemplated that other arrangements of differing materials to obtain this synergistic benefit may be used, including for example microstructures, nanoparticles, matrices, and mixtures.

Example 8

In an embodiment of a controlled fusion device, an ion cyclotron resonance device which utilizes the ponderomotive force to amplify the nuclear magnetic moment potential is associated with the controlled fusion device. The ion cyclotron resonance device includes a microwave source producing electromagnetic radiation at a frequency of 2.45 gigahertz (GHz). The magnetic field present in the controlled fusion device is tuned such that, at the point where the microwave source is introduced, the cyclotron frequency of an electron matches the frequency of the microwave source. This excites the electrons in the controlled fusion device, increasing their radius of gyration about the magnetic field lines.

A second frequency is layered on top of the 2.45 GHz microwave signal to create amplitude modulation, phase modulation, or both. This causes the excited electrons to become more and less excited at the second frequency. The second frequency is selected such that it matches the ion cyclotron frequency of hydrogen-1 ions present in the first working material in the region of the controlled fusion device where rotation is being induced. Cyclotron frequency is given by:

$$f_c = \frac{qB}{2\pi m}$$

where q is absolute value of the charge of the particle or ion, B is magnetic field strength, and m is the mass of the particle or ion. Since q is equal for an electron and a hydrogen-1 ion but m is several orders of magnitude greater for a hydrogen-1 ion, at a given value of B hydrogen-1 has a cyclotron frequency that is several orders of magnitude less than an electron's cyclotron frequency. In the embodiment, the cyclotron frequency of the hydrogen-1 ions in the region of the controlled fusion device where rotation is being induced is believed to be approximately 7.6 megahertz (MHz). The electrons are used to transfer this second frequency to the hydrogen-1, causing them to become excited, and increasing their radius of gyration about the magnetic field lines. As a result, the total angular momentum of the hydrogen-1 is increased. The direction of gyration of hydrogen-1 ions and atoms tends to be aligned, and so the nuclear magnetic moment potential is amplified.

Example 9

Figure 12:
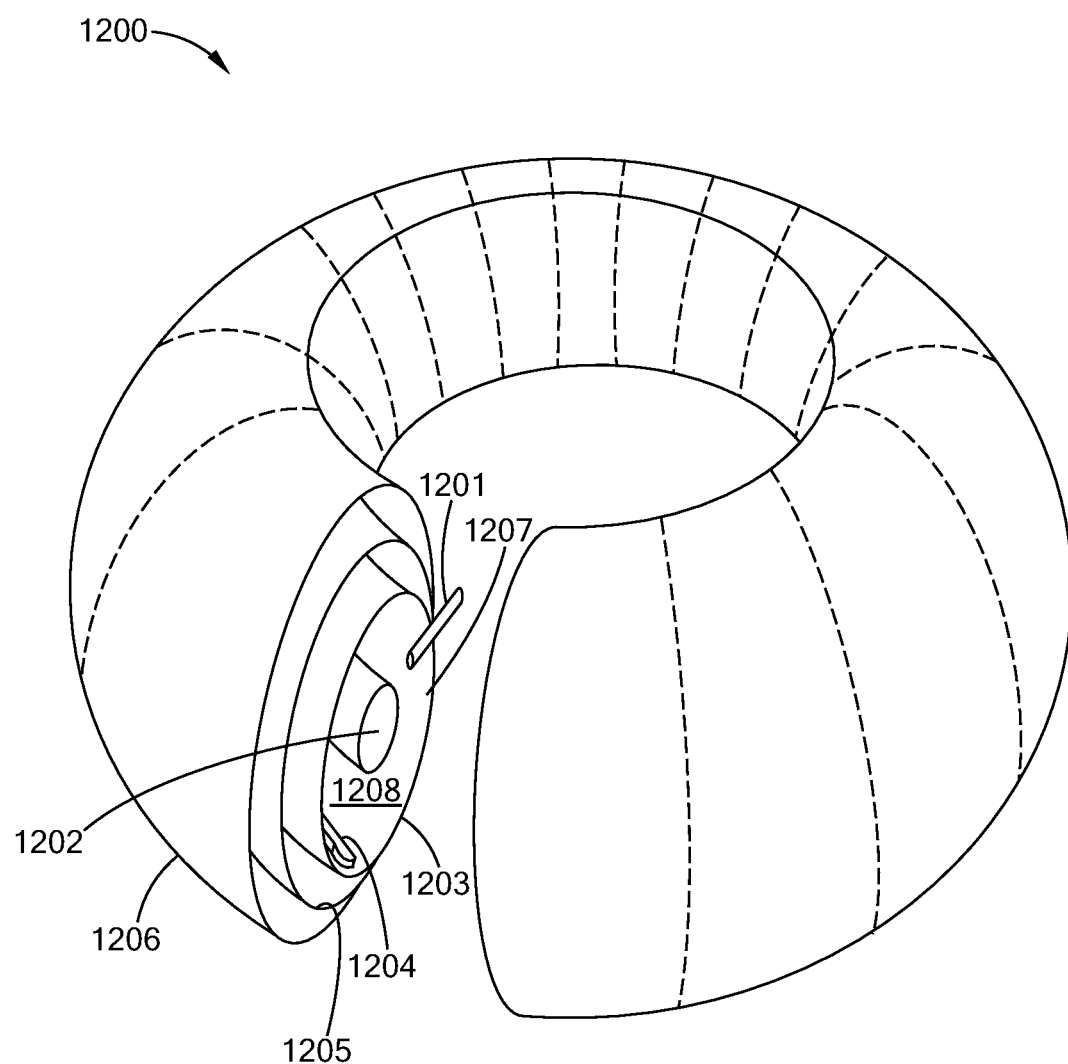
FIG. 12 shows a perspective cross-sectional view of an embodiment of a controlled fusion device in accordance with the present inventions, where the inner electrode, outer electrode, controlled pressure chamber, and magnet are in the shape of tori, as opposed to cylinders.

In FIG. 12, there is shown a perspective cross-sectional view of an embodiment of a controlled fusion device 1200. The embodiment is similar to the embodiment depicted in FIG. 2, with the notable exception that the inner electrode 1202, outer electrode 1203, controlled pressure chamber 1205, and magnet 1206 are in the shape of tori, as opposed to cylinders. These tori can be open or closed. A working gas inlet line 1201 is inserted through the magnet 1206 and controlled pressure chamber 1205, and into the annular space between the inner electrode 1202 and the outer electrode 1203. A fusion chamber 1207 is positioned within the magnetic field of the magnet 1206. A fusion surface 1208 is associated with the controlled pressure chamber 1205.

Example 10

In an embodiment of a controlled fusion device, the controlled fusion device is used for formation of material. The formation is accomplished by transmutation, whereby hydrogen-1 and lithium-6 undergo a fusion reaction to create helium-3 and helium-4. Helium-3 is a highly valuable isotope used for neutron detection, medical imaging, and cryogenics. In the embodiment, hydrogen is the first working material, and lithium fluoride, whereby the lithium is enriched in lithium-6, i.e., contains a higher proportion of lithium-6 than natural abundance, is the second working material. The controlled fusion device is operated, and gas is subsequently removed from the controlled pressure chamber. The gas contains helium-3, and can be subsequently separated to obtain high-purity helium-3 suitable for use.

Example 11

Figure 13:
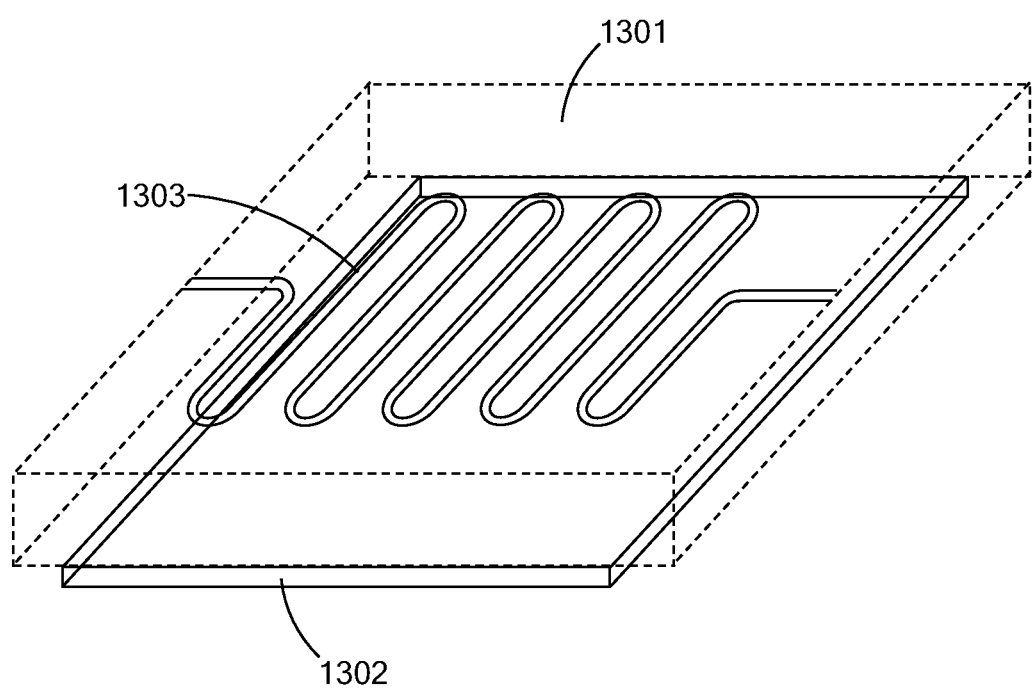
FIG. 13 is a perspective phantom line view of an embodiment of a portion of an outer electrode and a boron plate, in accordance with the present inventions, where a heating coil is added to the section of the outer electrode directly opposite the boron plate.

In an embodiment of a controlled fusion device, the controlled fusion device is similar to the embodiment depicted in FIG. 2. A difference is that a modification is made to enhance the emission of electrons by the boron plates, which is explained below, thus strengthening the electron shielding effect. A magnified view of a portion of the outer electrode 1301 and a boron plate 1302 is shown in FIG. 13. In the embodiment, a heating coil 1303 is added to the section of the outer electrode 1301 directly opposite the boron plate 1302. The boron plate 1302 is composed of lanthanum hexaboride, which is an excellent emitter of electrons when heated.

The heating coil 1303 is activated immediately prior to and during incitement of rotation in the controlled fusion device, causing heat to be transferred through the outer electrode 1301 to the boron plate 1302. The heating of the boron plate 1302 induces the emission of electrons, and causes the resulting electron cloud to be denser than it otherwise would without the use of the heating coil 1303. This in turn increases the electron shielding effect, which reduces the Coulomb barrier and increases the rate of fusion.

Example 12

Figure 14:
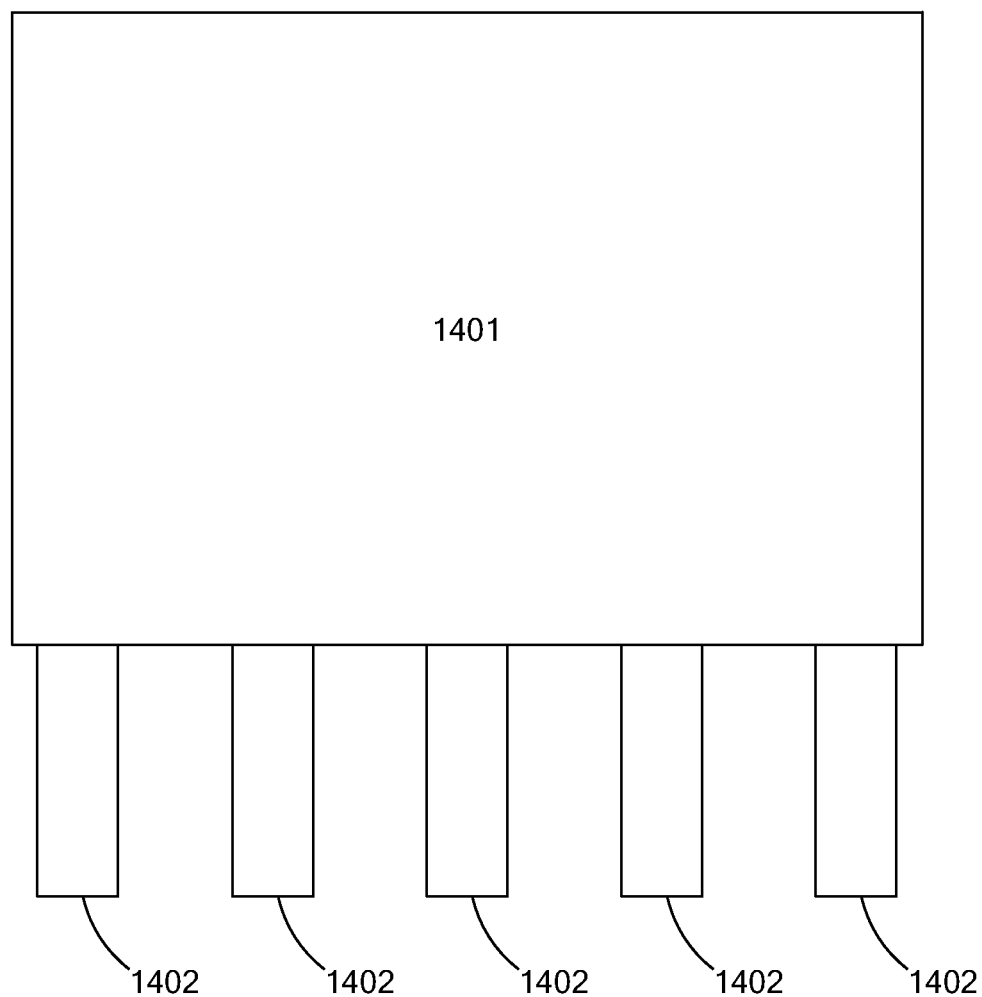
FIG. 14 shows a schematic view of an embodiment of the inner surface of the outer electrode, in accordance with the present inventions, where carbon nanotubes are adhered to the outer electrode.

In an embodiment of a controlled fusion device, the controlled fusion device is similar to the embodiment depicted in FIG. 2. A difference is that a modification is made to enhance the electron shielding effect, which is explained below. A microscopic view of the inner surface 208 of the outer electrode 1401 is shown in FIG. 14. Carbon nanotubes 1402, which are efficient electron emitters, are adhered to the outer electrode 1401.

During operation of the device, the presence of thermal energy, electromagnetic radiation, high energy particles, or electric fields induce emission of electrons by the carbon nanotubes 1402. Because the inner surface 208 of the outer electrode 1401 is the fusion surface, the electron emission is localized to the area where fusion is anticipated to be concentrated. This is ideal for creating or enhancing the electron shielding effect, which in turn lowers the Coulomb barrier and increases the rate of fusion.

Example 13

In an embodiment of a controlled fusion device, the controlled fusion device is similar to the embodiment depicted in FIG. 3. In this embodiment the first working material is helium-3 gas (instead of hydrogen gas in the preferred embodiment of FIG. 3), and the second working material is composed of deuterium oxide, a liquid commonly called "heavy water." The boron plates 305*a* and 305*b* are not necessary, and the heavy water is located along the inner surface 312 of the outer electrode 304.

During operation of the device, rotation causes the heavy water to form a ring across the entire inner surface 312 of the outer electrode 304. Fusion reactions between the helium-3 in the first working material and the deuterium in the second working material result in a release of energy, which can be subsequently captured and used for electricity generation, heating, or other useful purposes.

Example 14

Figure 16:
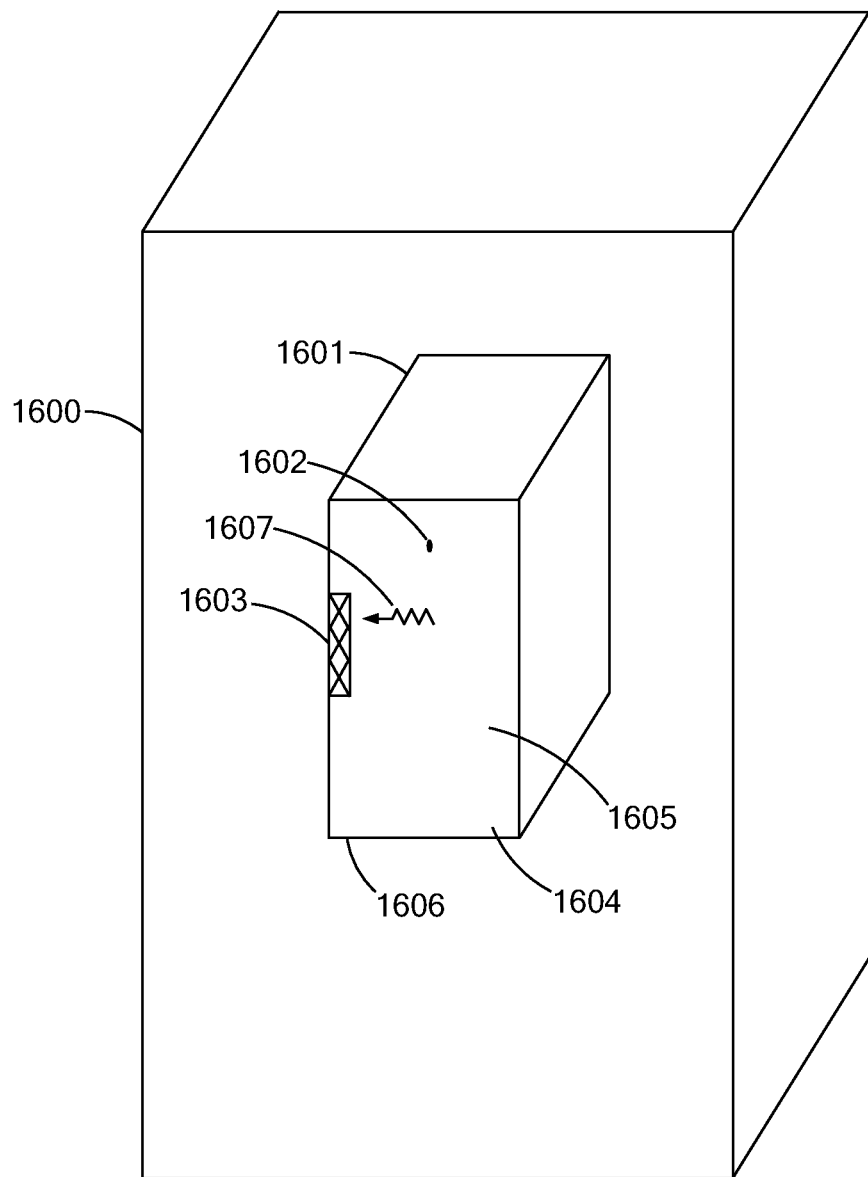
FIG. 16 in a schematic perspective view of an embodiment of a device incorporating a means to enhance a reduction of the Coulomb potential through electron emission, in accordance with the present inventions.

In an embodiment of a controlled fusion device, a method of reducing the Coulomb potential, and increasing the cross section of a fusion reaction includes the introduction, modification, enhancement, or control of a negative electrical potential; including means of generating and controlling electrons present in the working volume of a controlled fusion system. A controlled fusion device utilizing this method and effects is provided in the schematic diagram of FIG. 16. In this device, the controlled fusion device 1600 has a first working material 1602 and a second working material 1604 associated with it. The controlled fusion device 1600 has a chamber 1601 having a wall 1606 and cavity 1605. Associated with the chamber 1601 is an electron emitting material 1603. Additionally associated with the device is a source of energy 1607 to induce electron emission from material 1603. The electron emitting material 1603 may include boron nitride, lanthanum hexaboride, or other efficient electron emitters. The emitting material 1603 may be a compound, matrix, coating, bulk material, or of other construction. The source of energy 1607 may include, but is not limited to including, photons, ions, accelerated particles, electric fields, magnetic fields, heat, radiation, resistive heating etc. Thus, by way of example, a source of accelerated particles may be associated with the controlled fusion device 1600 wherein the particles are in part, or wholly, directed towards the electron emitter 1603. Further, by way of additional example, a source of photons may be associated with the controlled fusion device 1600 wherein the photons are in part, or wholly, directed towards the electron emitter 1603.

Example 15

Figure 15:
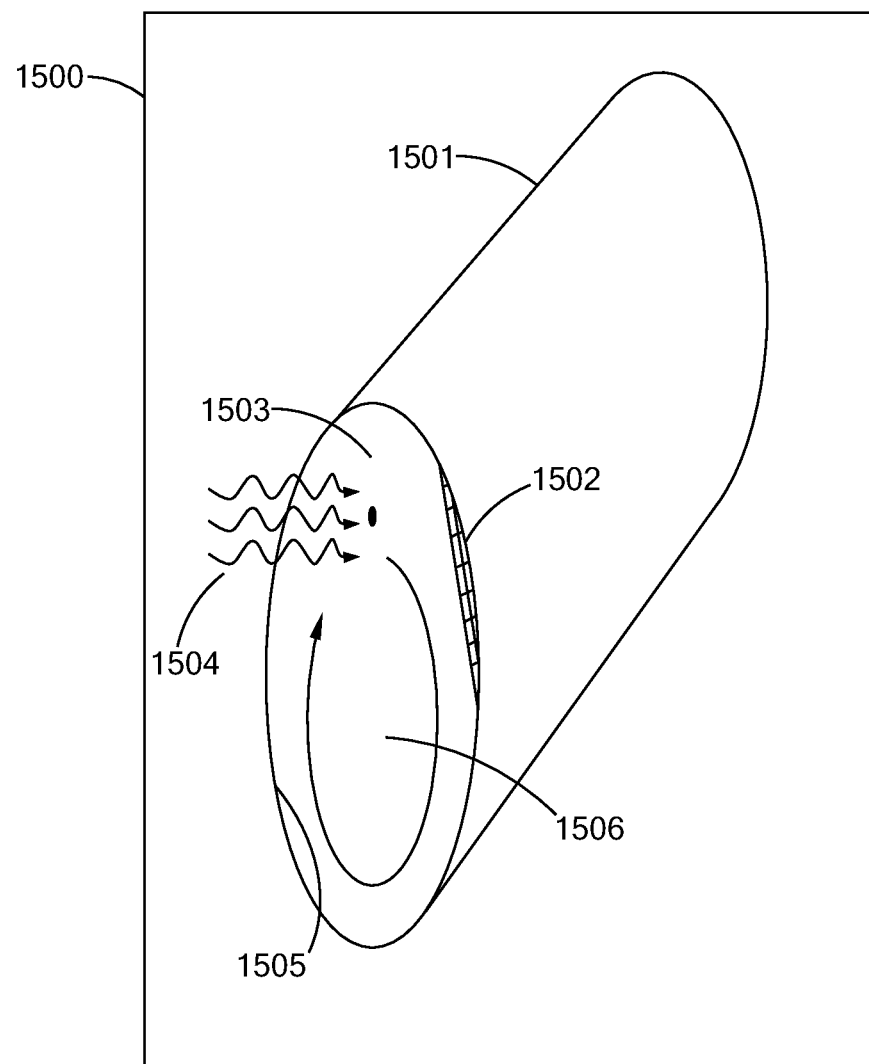
FIG. 15 is a schematic perspective view of an embodiment of a controlled fusion device, in accordance with the present inventions, utilizing photon pressure as the rotation source.

In an embodiment of a controlled fusion device, ions may not be required. Thus, in this embodiment the controlled fusion device is preferably ion-free, although its benefits may still be obtained with the presence of some ions. Thus, a controlled fusion device utilizing photon pressure as the rotation source is shown in FIG. 15. The controlled fusion device 1500 has a first working material 1503 and a second working material 1502 associated with it. The controlled fusion device 1500 has a rotation chamber 1501 having a rotation chamber wall 1505 and cavity 1506. Associated with the rotation chamber 1501 is a source of photons 1504.

In this example, photons from source 1504 impinge the first working material 1503. The interaction of the photons with the material imparts a force to the working material 1503. This force can be substantively directed in a predetermined direction. This "photon pressure" can be used to accelerate the first working material 1503 substantially azimuthally to induce rotation of the kind desirable for controlled fusion. The photon source 1504 can be a single source, a multitude of sources, or a multiply-directed energy from a single source. For example, an array of sources can be provided to induce rotation by placing the sources along the radius of the device 1501 with photons directed tangentially to a predefined working material path.

The rotation induced by photon pressure will create an expansive pressure to the device wall 1505 and between the first working material 1503 and the second working material 1502, which can also be the same material. This pressure can induce or assist in the creation of a fusion event.

Additionally, the photons in the system can provide a space charge emission of working material 1502, or an electron emitter associated with the fusion device 1500.

Further, other embodiments in which rotation is induced for controlled fusion without reliance or without substantial reliance on the presence of ions are contemplated.

Example 16

Figure 17:
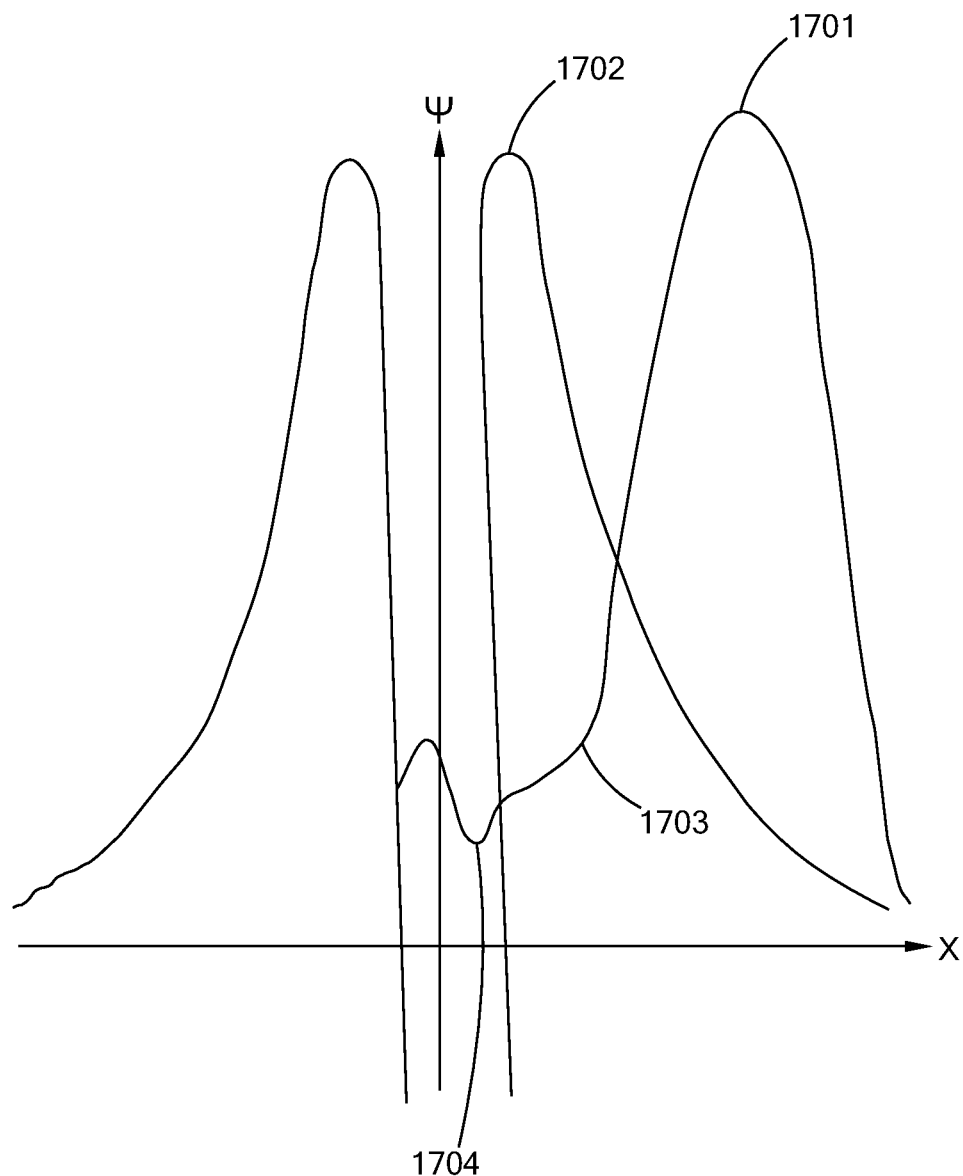
FIG. 17 is a graph illustrating an embodiment of a resonance condition dependent on the modified Coulomb potential in accordance with the present inventions.

In an embodiment of a controlled fusion device, the Coulomb potential may allow for quantum tunneling through the barrier. This tunneling probability is typically understood to be a function of the relative energy of the nuclei, where the higher the energy the higher the probability of tunneling. However, Coulomb potentials of a certain "shape" may allow for enhanced tunneling at relatively lower energies by a condition described as resonance. FIG. 17 depicts the resonance condition. 1701 is the incoming nucleus wavefunction, 1702 is the Coulomb potential of the system, 1703 is the decaying wavefunction or an evanescent wave of 1701, and 1704 is the portion of the wavefunction present past the Coulomb barrier.

Because the shape of the Coulomb barrier 1702 and the energy of 1701 changes the shape of 1703, the decaying portion of the wavefunction, the shape of 1704 is influenced by both the Coulomb barrier and the energy of the system. At certain energies for a specific Coulomb barrier and a nuclear potential, the wavefunction may experience a resonant condition such that its "shape" allows for optimum transmission through the Coulomb barrier 1702. This condition may occur at less energy than would otherwise be required to achieve a given probability of tunneling.

Figure 18:
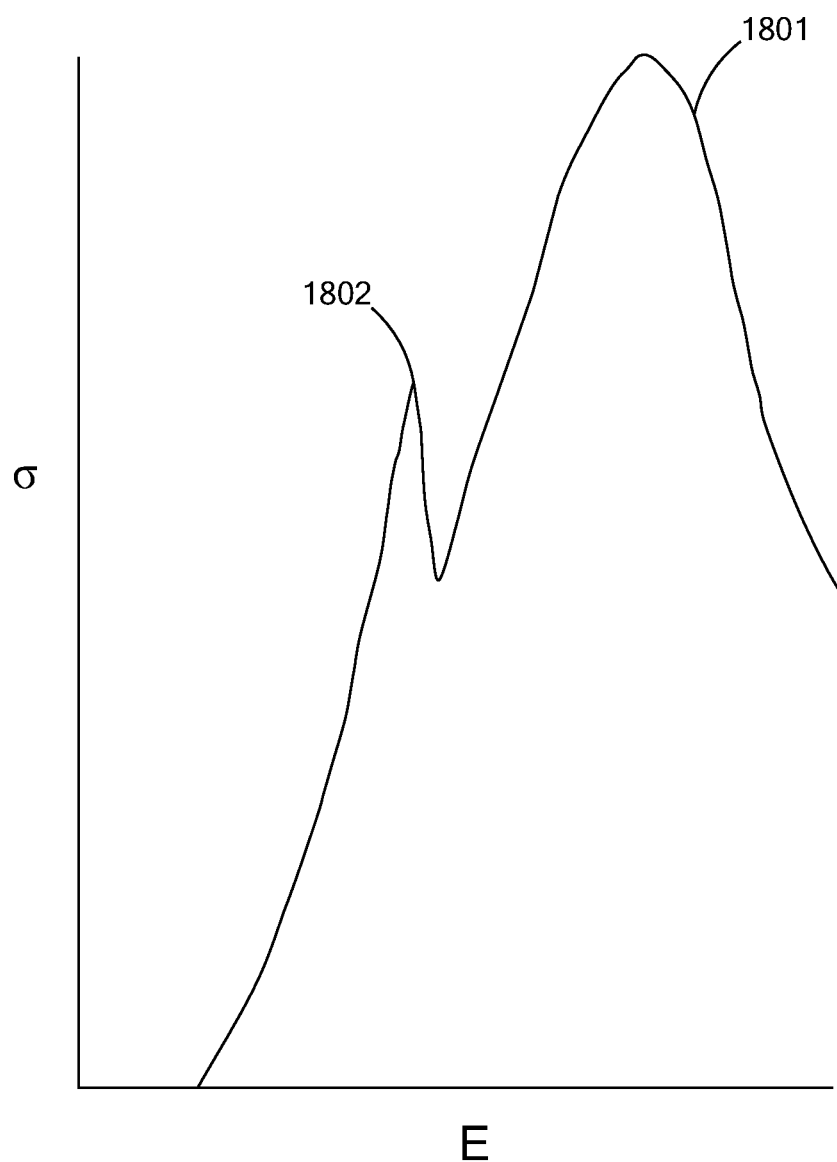
FIG. 18 is a graph illustrating an embodiment of a reaction cross section with a resonance peak in accordance with the present inventions.

This resonance condition modifies the cross section of the reaction as depicted in FIG. 18. 1801 is the cross section of the reaction as a function of energy without the resonance condition. 1802 is a resonant peak which can be seen to increase the cross section of the reaction at certain energies in the center-of-mass reference frame. Thus, for example, the aforementioned methods and devices can be used to control the Coulomb potential as well as the energy of the reaction system to achieve, control, modify, or induce a resonant condition of tunneling.

Example 17

Figure 19:
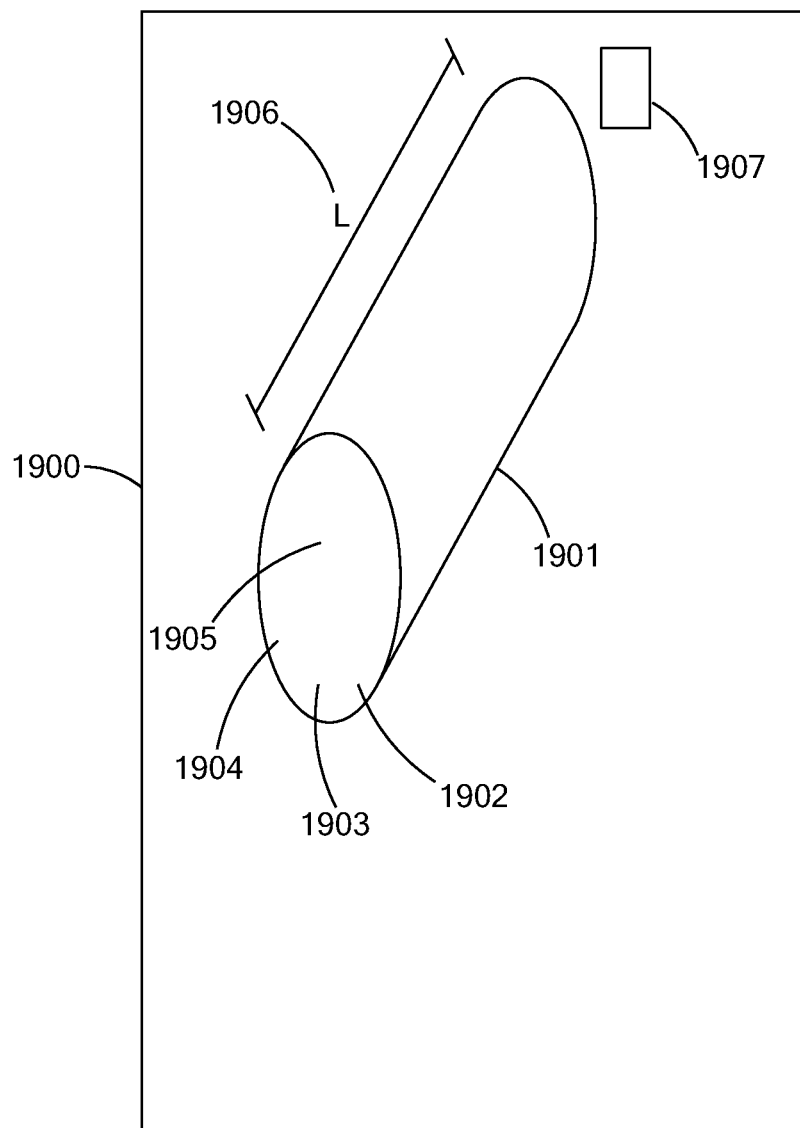
FIG. 19 is a perspective schematic view of an embodiment of a micro-reactor controlled fusion device, in accordance with the present inventions where the rotation source is electromagnetic and operates based on a resonance.

In an embodiment of a controlled fusion device, a variety of geometries and orientations may be utilized. By way of example, FIG. 19 depicts a micro-reactor 1900 which operates on the principles described herein. In this embodiment the rotation source is electromagnetic and operates based on a resonance. This device includes a reaction chamber 1901, a chamber wall 1902, a first working material 1903, a second working material 1904, and a cavity 1905. The geometry of this cavity and chamber is important to this embodiment, and will at present, by way of example, be described by a characteristic dimension L 1906.

Electromagnetic radiation has a wavelength associated with it. There can be set up a source of electromagnetic radiation 1907 whereby the wavelength and characteristic dimension 1906 are selected to have a specific relationship. The result of this selection criteria can be a resonating wave present in the cavity 1904. Specifically, this wave may rotate azimuthally such that, when interacting with charged particles present as part of, or in addition to, a working material, one or more working materials are accelerated substantially azimuthally.

This embodiment allows for reactor dimensions of significant variation, including, but not limited to, reactors smaller than previously envisioned in the art on the scale of centimeters of characteristic length.

In some embodiments the source of electromagnetic radiation may be a microwave generator. In some embodiments, there may be a plurality of sources. In some embodiments multiple resonant frequencies may be established within a given cavity. Further, there are envisioned embodiments where the resonant frequency is adjusted during operation, or tuned, so as to induce optimum fusion conditions.

Example 18

Figure 20:
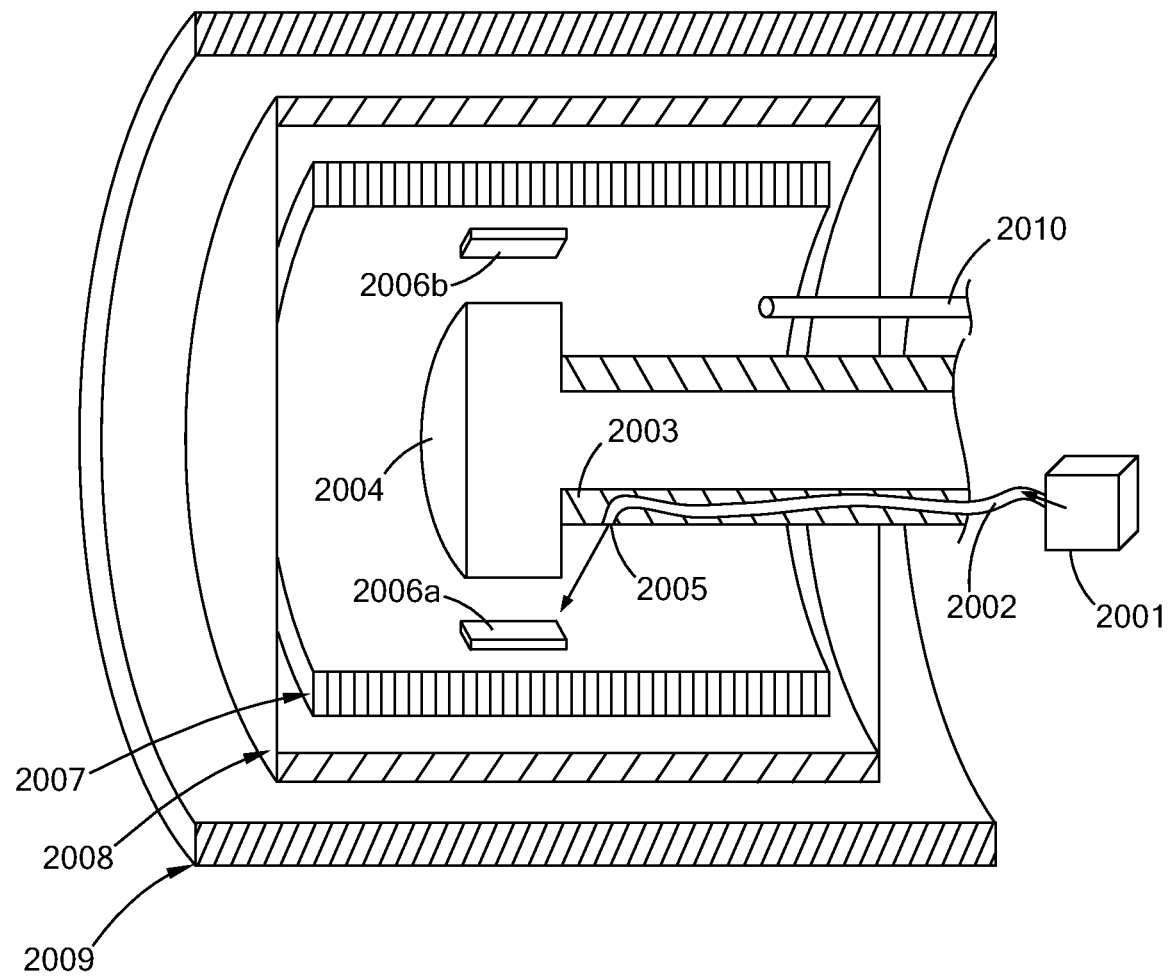
FIG. 20 is a cross sectional schematic view of an embodiment of a controlled fusion device including a laser, which may be used to increase electron shielding effects, in accordance with the present inventions.

In an embodiment of a controlled fusion device, the controlled fusion device is similar to the embodiment depicted in FIG. 3. Thus, as illustrated in FIG. 20 a laser 2001 is added and connected to an optical fiber 2002 which is run through insulation 2003 surrounding the inner electrode 2004. The optical fiber 2002 is terminated at a point 2005 near a plate 2006a. The end of the fiber 2002 is oriented such that the light coming out of it is directed toward the plate 2006a. The plate 2006a includes a photoemissive compound.

When the laser 2001 is turned on, the light incident on the plate 2006a causes it to emit electrons, and causes the resulting electron cloud to be denser than it otherwise would without the use of the laser 2001. This in turn increases the electron shielding effect, which reduces the Coulomb barrier and increases the rate of fusion.

The device has a second plate 2006b with a flue material, a gas puff inlet 2010 an outer electrode 2007, and a pressure control vessel 2008, and a magnet 2009. A second fiber and beam launch can also be used to direct the laser beam to the plate 2006b.

Example 19

Figure 21:
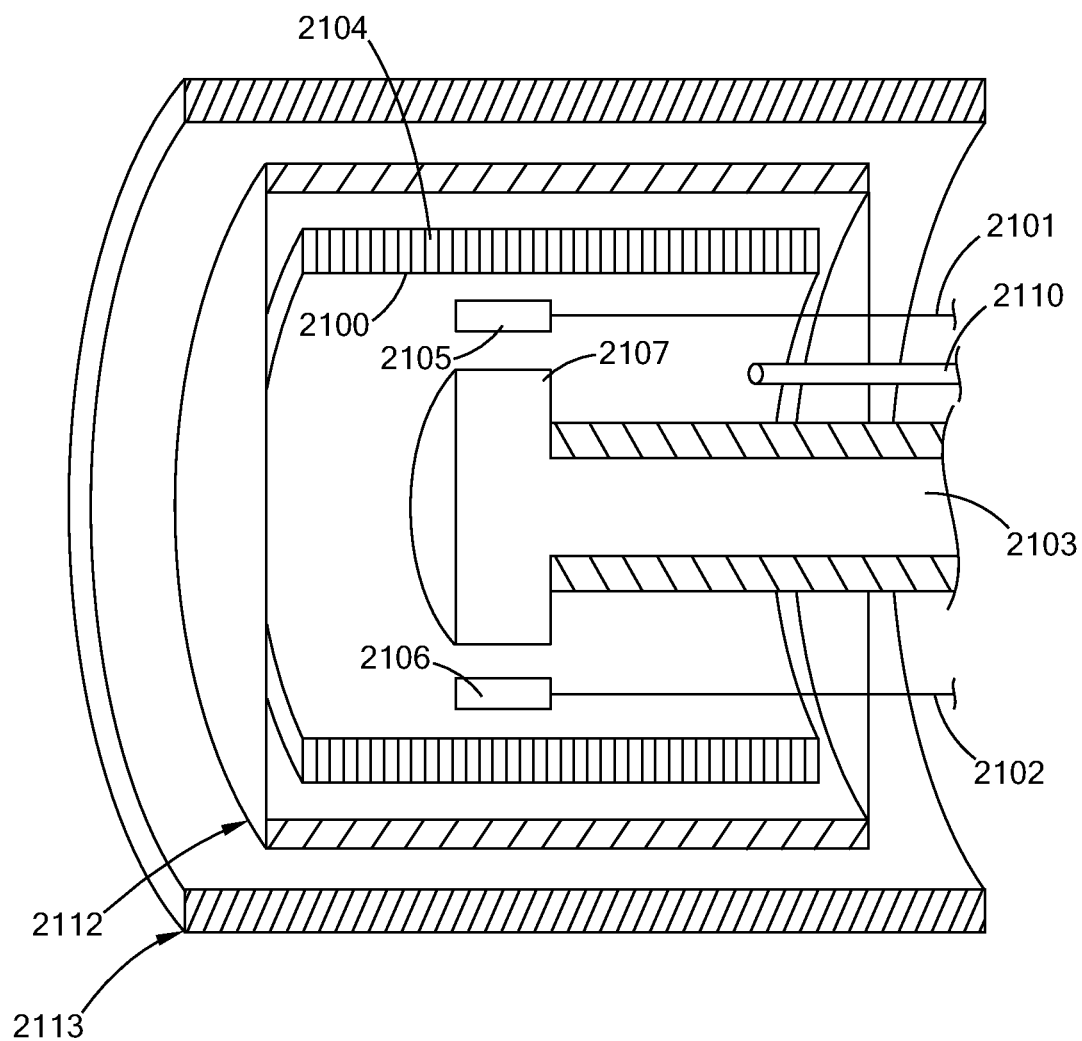
FIG. 21 is a cross sectional schematic view of an embodiment of a controlled fusion device in which two wires coated in boron containing compounds run axially through the controlled fusion device in accordance with the present inventions.

In an embodiment of a controlled fusion device, the controlled fusion device is similar to the embodiment depicted in FIG. 3. Thus, as illustrated in FIG. 21, the boron plates 305a and 305b are preferably removed, and are replaced by two wires 2101 and 2102 run axially through the controlled fusion device into the annular space between the inner electrode 2103 and the outer electrode 2104, with boron coatings 2105 and 2106 covering the wires 2101 and 2102 in the axial section of the controlled fusion device where the inner electrode is uninsulated 2107. Since the boron coatings 2105 and 2106 are located some distance radially inward from the inner surface 2108 of the outer electrode 2104, fusion reactions will tend to be concentrated in a region located more radially inward than in the embodiment depicted in FIG. 3. This may be advantageous, because the energy of particles may be greater in the vicinity of the boron coatings 2105 and 2106 than along the inner surface 2108 of the outer electrode 2104, where the growth of a boundary layer may dampen particle velocities. Higher particle energies tend to correspond to higher rates of tunneling, leading to elevated rates of fusion. The embodiment has a controlled pressure housing 2112, and a magnet 2113.

Example 20

Figure 22:
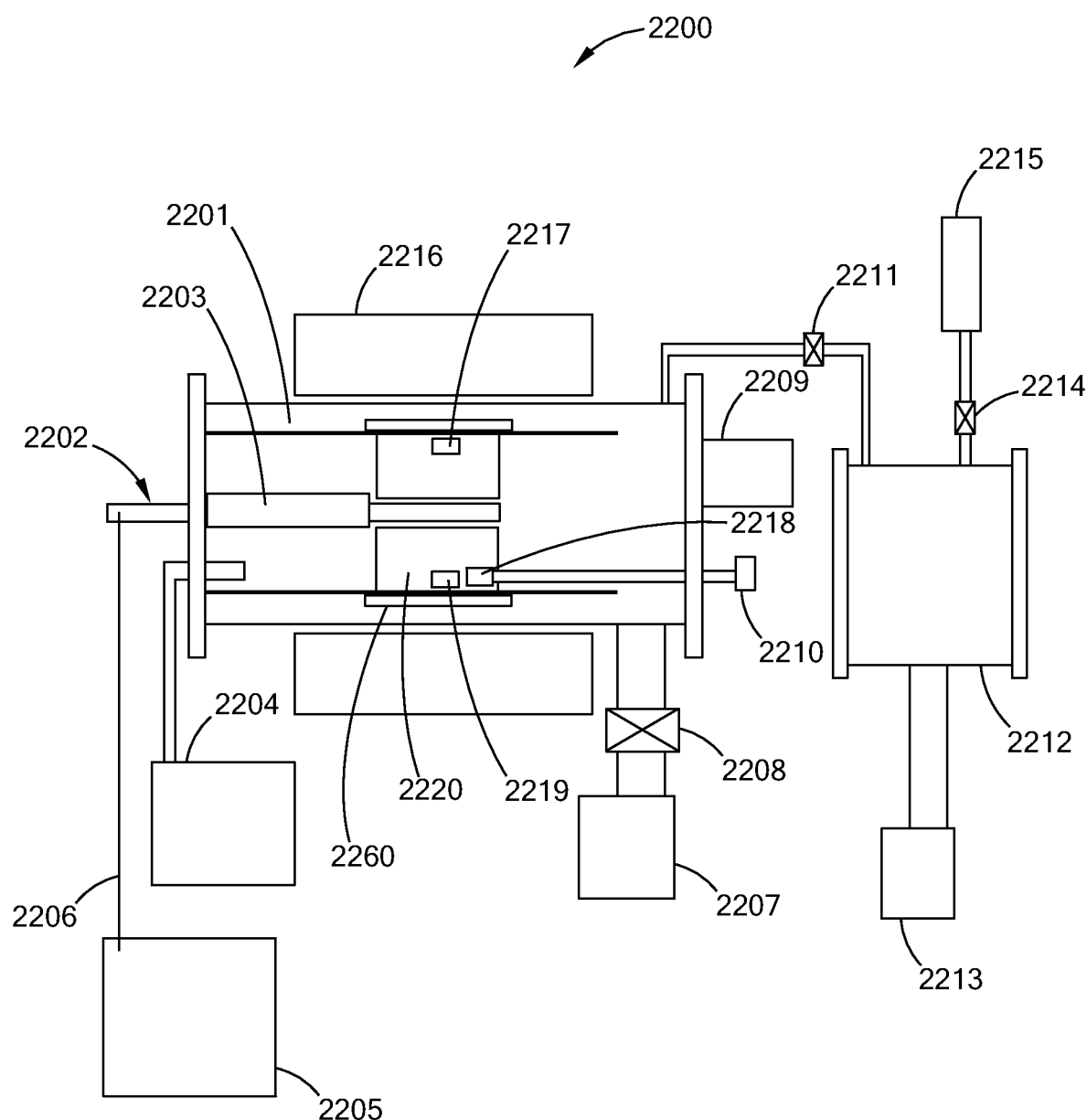
FIG. 22 a schematic view of an embodiment of a controlled fusion device and energy utilization assembly, in accordance with the present inventions.

Turning to FIG. 22, there is provided a schematic of a controlled fusion device and energy utilization assembly. This configuration 2200 has a fusion device 2200 having a DC-AC power supply 2205, a gas input line 2204, a power cable 2206, a discharge rod 2202, which has an insulation covering 2203. The discharge rod 2202 extends into the fusion device beyond the insulation covering 2203 and into the gas rotation area 2220. Within the gas rotation area 2220 are the Boron targets 2217, 2219, and a Boron target 2218, mechanically associated with a control arm 2210. The fusion device has an outer electrode 2201, and a magnet 2216. In this embodiment the energy utilization assembly 2260 is located inside the fusion device pressure control structure, and just outside of the outer electrode 2201, and directly adjacent to the gas rotation area 2220. The fusion device also has a camera 2209, a vacuum pump 2207 and valve 2208. A sample and analysis assembly is also provided with this embodiment. This assembly has a valve 2211, an analysis chamber 2212, a pump 2213, a valve 2214 and an RGA (residual gas analyzer) 2215. The analysis chamber may have a pressure of $10^{-5}$ torr.

In this embodiment, the energy utilization assembly can be a heat exchanger that utilizes a working fluid such as water, high pressure water, liquid sodium, steam, or other heat exchanging media known to the art. The heat exchanger may be channels positioned on the inner surface of the outer electrode, within the walls of the outer electrode, or along the outer surface of the outer electrode, including for example jackets, coils, counter-current mechanisms. Additionally, the working fluid may be a charged fluid, or have a charge associated with it, which facilitates the utilization of the magnetic and electric fields present within the device to provide motive forces to the working fluid to enhance heat exchanging efficiencies.

Further, this embodiment, as well as the embodiments of the other examples and figures set forth in this specification generally, and preferably, may have a control circuit which may, in whole or in part, be operated by a system of controllers and computers, and which may have remote access as well. Thus, for example, the control system may be a distributed control network, a control network, or other types of control systems known to those of skill in the art for controlling large plants and facilities, and individual apparatus, as well as combinations and variations of these. Further, this control system in a more preferred embodiment may be integrated with, or otherwise associated with, an enterprise data system, such as, for example, SAP. The control system may control any and all parameters of the fusion reaction, the heat energy gathering or utilization processes, and conversion to electrical or other useful forms of energy. Preferably, the control system maintains a predetermined and preselected balance between heat generation and heat extraction. Thus, for example, to maintain this predetermined and preselected balance, the control system may modulate the electrical pulses, e.g., lengthening or shortening the time period between each pulse, changing the voltage applied to create the plasma, changing the magnetic field, for example, with an adjustable magnet in conjunction with a superconducting magnet, and changing the density of the reactants.

This embodiment may also have similar types of heat exchanging apparatus associated with the inner electrode. It should further be understood that these various heat exchanging and capturing systems may be utilized with other embodiments of the controlled fusion devices, in addition to those using electrical discharge to create a plasma.

Example 21

Figure 23:
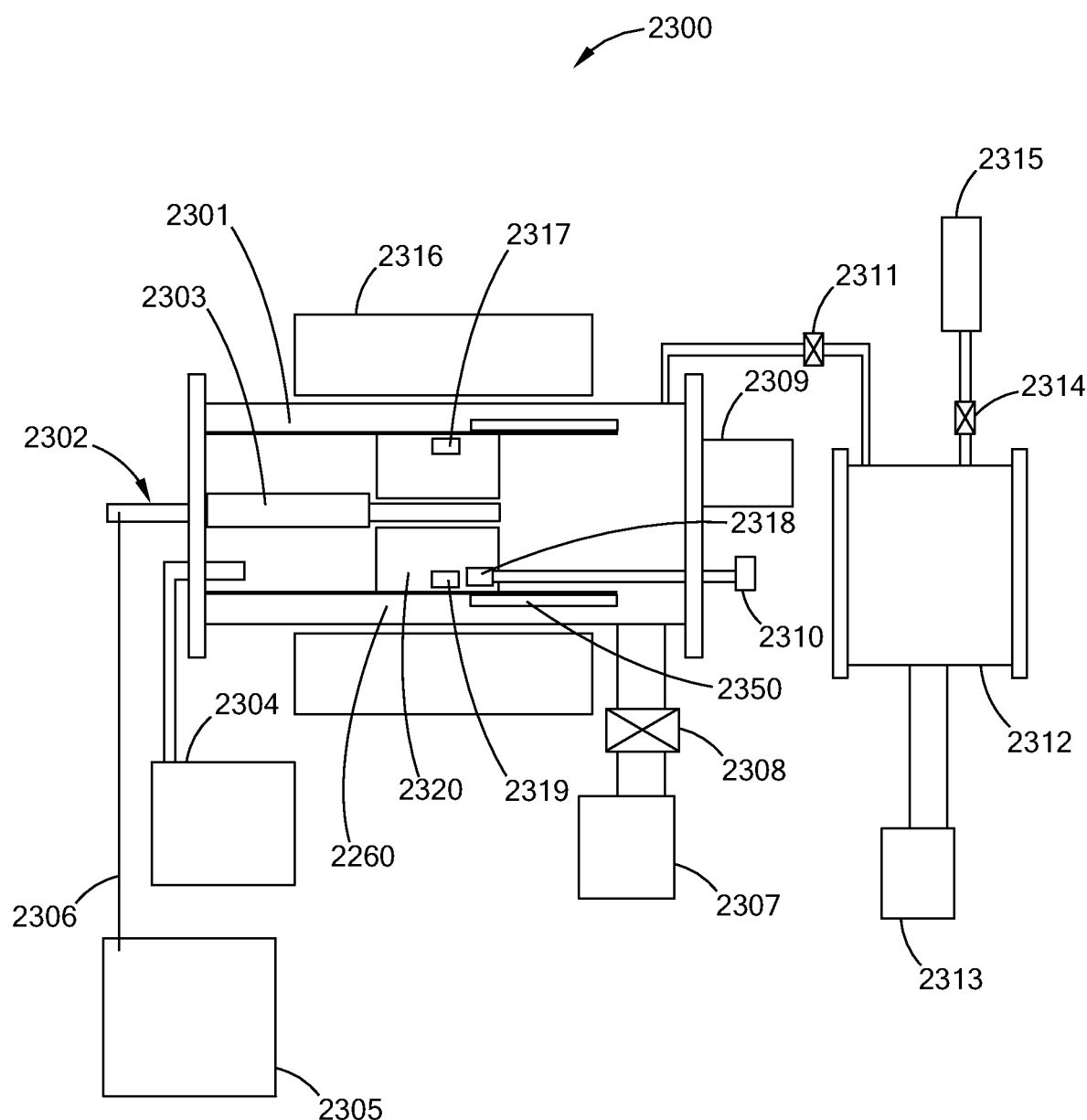
FIG. 23 a schematic view of an embodiment a controlled fusion device and direct energy conversion assembly in accordance with the present inventions.

Turning to FIG. 23, there is provided a schematic of a controlled fusion device and direct energy conversion assembly. This configuration 2300 has a fusion device 2300 having a DC-AC power supply 2305, an a gas input line 2304, a power cable 2306, a discharge rod 2302, which has an insulation covering 2303. The discharge rod 2302 extends into the fusion device beyond the insulation covering 2303 and into the gas rotation area 2320. Within the gas rotation area 2320 are the Boron targets 2317, 2319, and a Boron target 2318, mechanically associated with a control arm 2310. The fusion device has an outer electrode 2301, and a magnet 2316. In this embodiment the energy utilization assembly, e.g., a direct energy conversion assembly 2350, is located inside the fusion device pressure control structure, and just outside of the outer electrode 2301, and away from (down stream from) the gas rotation area 2320. The fusion device also has a camera 2309, a vacuum pump 2307 and valve 2308. A sample and analysis assembly is also provided with this embodiment. This assembly has a valve 2311, an analysis chamber 2312, a pump 2313, a valve 2314 and an RGA (residual gas analyzer) 2315. The analysis chamber may have a pressure of $10^{-5}$ torr.

In this embodiment, the direct energy conversion assembly may include a metallic or other electron-motive material: in the shape of a plate, rod, cylinder, sectional components of a cylinder, and the like; electrically-conductive coils that are positioned adjacent the likely path of charged high-energy particles created by the fusion reaction, so that a current may be directly induced as the charged particles are collected. Further, although not shown in the Figure, such devices may also be located at the axial end of the fusion reaction region or chamber. For example, in embodiments utilizing the fusion reaction that creates alpha particles, the alpha particles lose energy by ionizing materials in the direct energy conversion assembly, producing free electrons that carry electrical current. In other embodiments, charged particles may be directed into a beam by use of electric or magnetic fields, or a combination of both, producing a direct current.

In another embodiment of a controlled fusion device, a direct energy conversion assembly includes an array of semiconductor PN junctions. The PN junctions create a depletion layer that creates regions having an electric field gradient. Charged particles, such as alphas created in a fusion reaction, or electromagnetic radiation, or both, interact with the semiconductor material, producing electron-hole pairs in the vicinity of the electric field gradient. As the electrons and ions are accelerated toward the edges of the depletion layer, a current is created.

In another embodiment of a controlled fusion device, a direct energy conversion assembly includes an assembly for utilizing high-energy charged particles to generate an electric current. For example, using the alpha particles generated via the hydrogen-boron reaction discussed above, the alpha particles may be directed from the fusion reaction region to a region having a first plate and a second plate separated by a readily ionizable material. Thus, in this manner, as the directed alpha particles pass through this readily ionizable material, electrons and positive ions are created. The electrons migrate to the first plate, the positive ions migrate to the second plate, creating a potential that then results in the flow of a current when the plates are electrically connected. For example, the first plate may be made from a low work function material such as magnesium, and the second plate may be made from a high work function material such as gold, and the readily ionizable material may be argon gas. Further, the ionizable material may be in the form of a gel, thus simplifying the need to contain the ionizing material in the direct energy conversion region. Additionally, the first plate, second plate, and readily ionizable material may be combined into a solid multi-layered semiconductor structure capable of surviving the alpha impacts and generating a potential between layers within that multi-layered structure. In an additional embodiment, the controlled fusion device may have its axis in a vertical or essentially vertical position with the opening having the alphas exiting therefrom, pointing downwardly toward a container having a gel or a liquid which serves as the ionizable material. In this manner, containment of the readily ionizable material may be accomplished without the need for any membrane or other member that permits the transmission of alpha particle while having the readily ionizable material adjacent or in the low pressure containment area of controlled fusion device.

Example 22

Figure 24A:
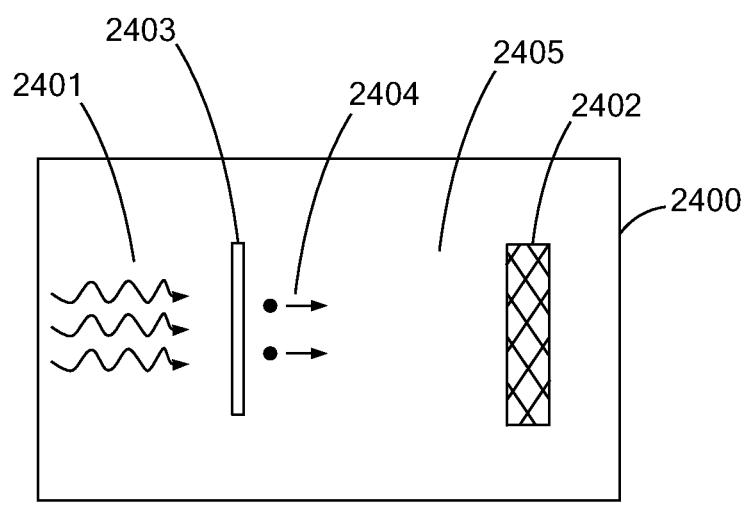
FIG. 24A is a schematic of a controlled fusion device in accordance with the present inventions.

FIG. 24A shows a controlled fusion device 2400 comprising a source of radiation 2401, a first working material 2404, a radiation target 2403, a second working material 2402, and a cavity 2405. The radiation 2401 impinges on the radiation target 2403 generating the first working material 2404. The radiation may be a laser, ion beam, pulsed radiation source, and more. The radiation target may be a metallic foil, a polymer, and more. The first working material may be protons, ions, or other desirable reactants and materials. The first working material is made to move in the direction of the second working material 2402. The energy of the first working material may be greater than 1 eV, greater than 100 eV, greater than 1 keV, greater than 100 keV, greater than 1 MeV, or greater than 10 MeV.

Figure 24B:
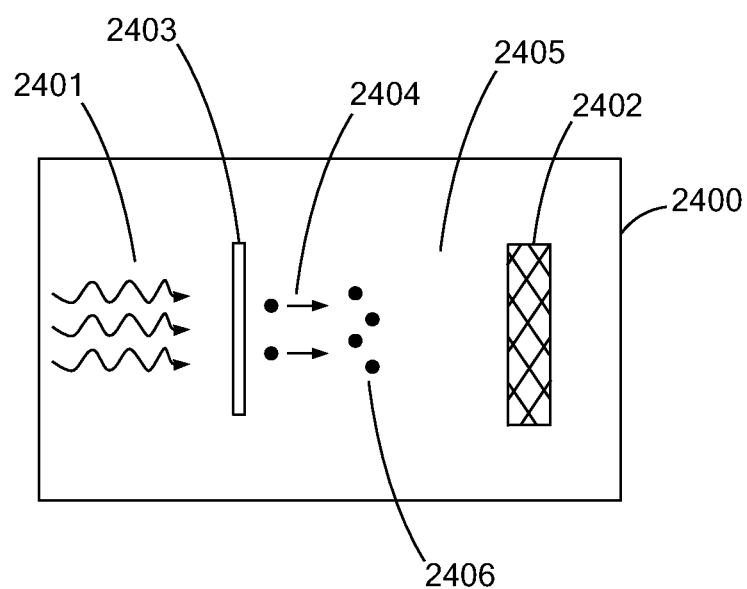
FIG. 24B is a schematic of the fusion device of FIG. 24A with a third working material added, in accordance with the present inventions.

FIG. 24B shows the controlled fusion device of FIG. 24A, to which a third working material is added. The controlled fusion device 2400 has a source of radiation 2401, a first working material 2404, a radiation target 2403, a second working material 2402, a cavity 2405, and a third working material 2406. The radiation 2401 impinges on the radiation target 2403 generating a first working material 2404. The radiation may be a laser, ion beam, pulsed radiation source, and more. The radiation target may be a metallic foil, a polymer, and more. The first working material may be protons, ions, or other desirable reactants and materials. The first working material is made to move in the direction of the third working material 2406. The motion of the first working material is coupled to the third working material which is made to move in the direction of the second working material 2402. The energy of the first working material may be greater than 1 eV, greater than 100 eV, greater than 1 keV, greater than 100 keV, greater than 1 MeV, or greater than 10 MeV.

Example 23

In an embodiment of a controlled fusion device, the controlled fusion device is of the general type depicted in FIG. 3. Thus, a plurality of boron structures positioned on the wires may form a shell of boron shell of boron compounds between the inner electrode and the outer electrode.

Example 24

Embodiments of the present controlled fusion devices can be relatively compact and small. This enables to placement of these devices in many applications where size is an issue. It also permits several of these smaller devices to be utilized together to provide the requisite amount of power needed. These devices can essentially be small and compact, for example, about the size of a small refrigerator, a bag of golf clubs, a suitcase, a few feet by a few feet, one square foot or less, e.g., the size of a large can of coffee.

Figure 25:
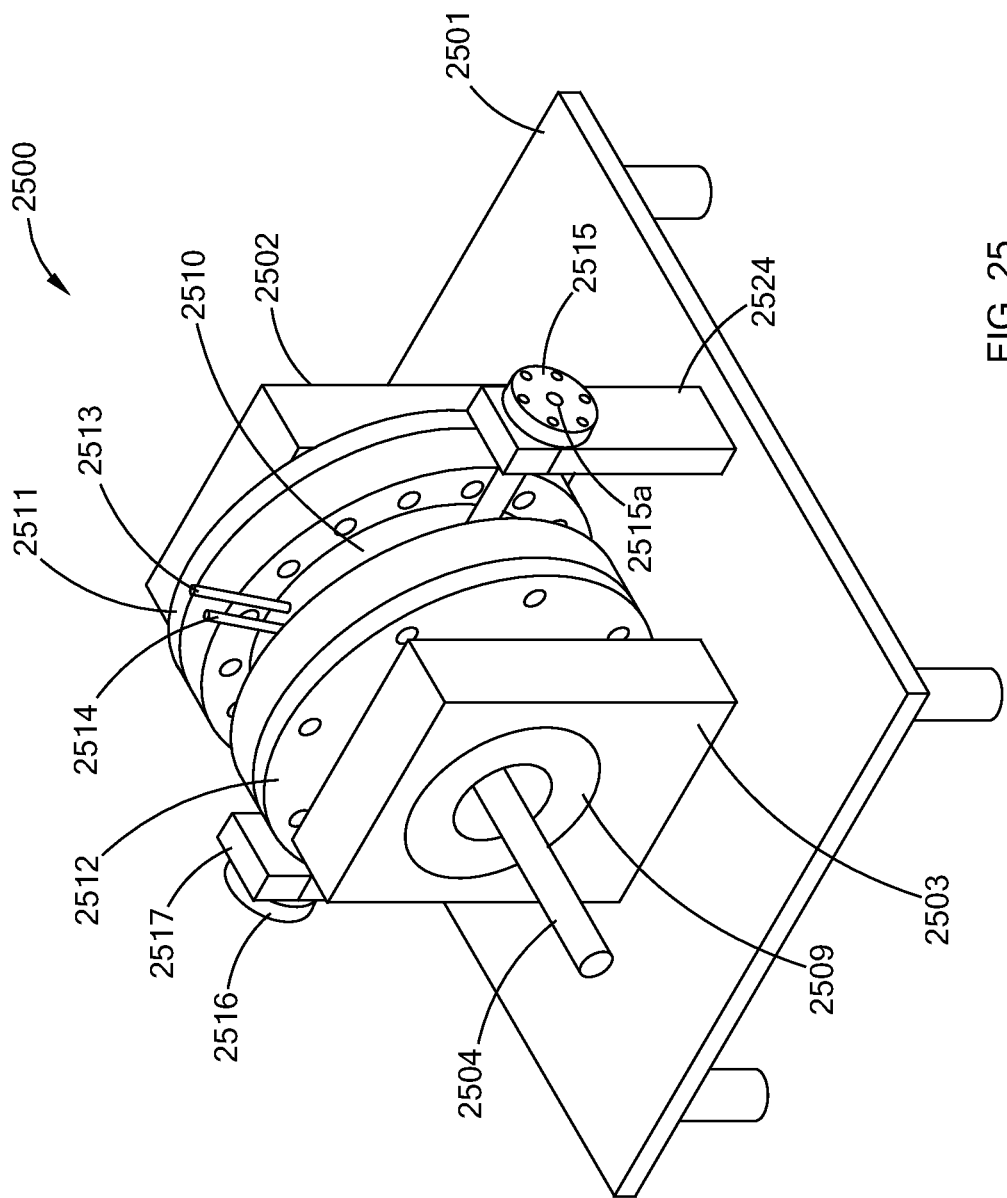
FIG. 25 is a perspective view of a controlled fusion device in accordance with the present inventions.
Figure 25A:
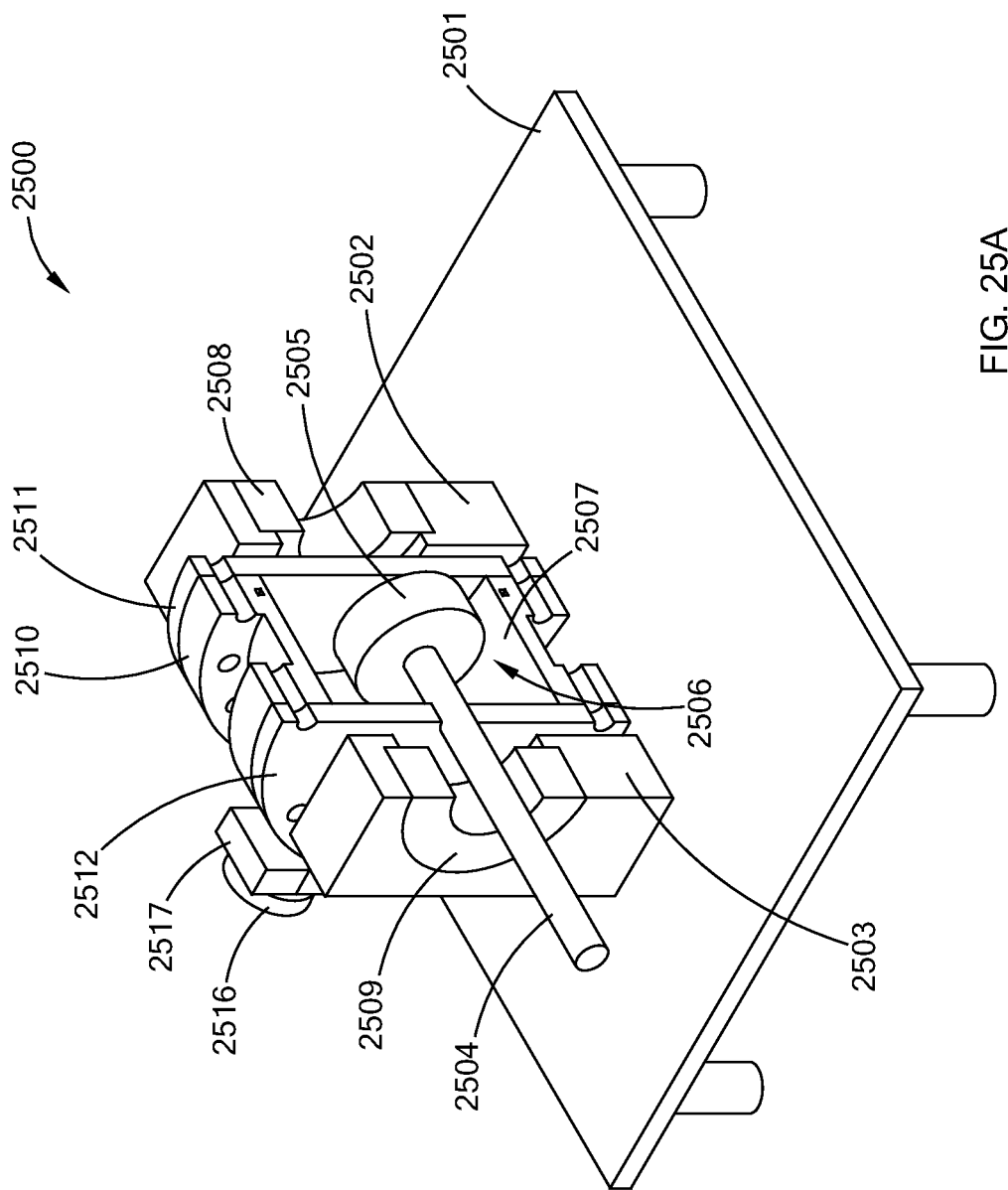
FIG. 25A is a cross sectional view of the device of FIG. 25.

Thus, turning to FIG. 25 there is shown a perspective view of an embodiment of a tabletop controlled fusion device 2500. The device 2500 is mounted on a table 2501 (2 feet by 2 feet). The device 2500 has two magnet holders 2503, 2502 at the axial ends of the device. Each magnet holder holds a magnet 2509, 2508. Between the magnet holder 2503, 2502 there is an assembly to contain the rotating gas, this assembly has two outer cover flanges 2512, 2511 that are attached to the axial ends of a housing 2510. The housing 2510 and flanges 2512, 2511 form the cavity 2506 where the gases rotate. The inner surface 2507 of housing 2510 is the surface where the fusion process primarily takes places. The housing 2510 also serves as the outer electrode. The inner electrode 2504 has a discharge head 2505. Additionally, mounts 2524 and 2517 hold the assembly. Each mount has a bottom arm 2524a, 2517a, and a top caps 2524b, 2517b, respectively. Gas inlet line 2515 has opening 2515a and gas outlet 2516 has an outlet opening (not shown). Cooling water circulation lines, inlet 2514, outlet 2513 are provided so that water can be circulated around housing 2510.

Figure 25B:
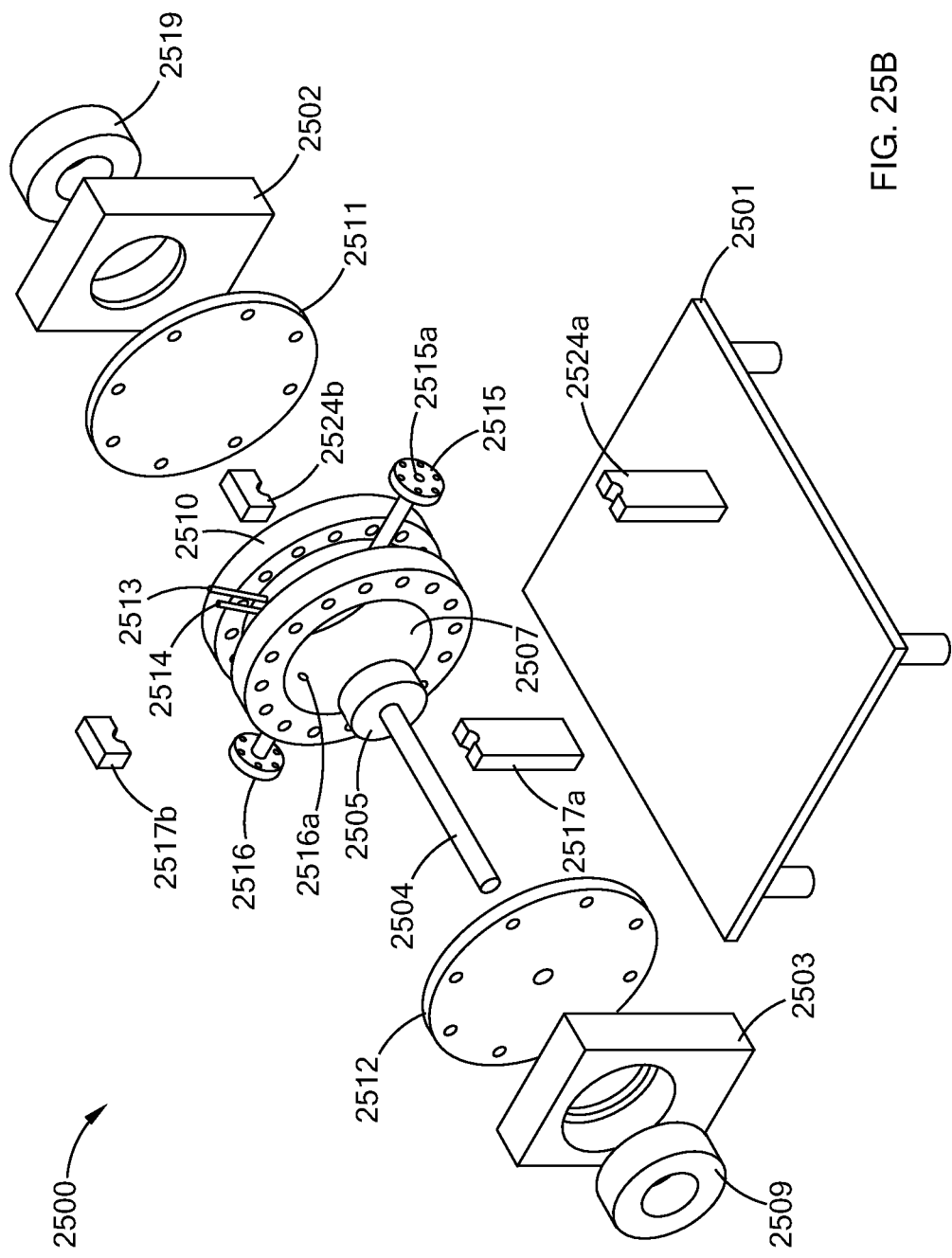
FIG. 25B is an exploded perspective view of the device of FIG. 25.

FIG. 25B is a cross section of the embodiment of FIG. 25, and FIG. 25C is an exploded view showing the components of the embodiment of FIG. 25.

Example 24a

The device of example 24 is fueled with fusion materials to provided for aneutronic fusion, and is used to power an electric automobile.

Example 24b

The embodiment of FIG. 25, is made larger than the device of FIG. 24, and is fueled to provide for neutronic fusion and the generation of neutrons. The device is used in a medical device to provide for a controlled and targeted beam of neutrons for the treatment of medical conditions.

Example 24c

The embodiment of FIG. 25, is made smaller, having an outer diameter of less about 6 inches, and is fueled to provide for neutronic fusion and the generation of neutrons. The device is incorporated in to an oil and gas exploration (e.g., drilling for oil) down hole logging and measuring tool (often referred to as LWD, MWD, and LMWD). The generated neutrons from the device are used for analytical purpose to evaluate the nature of the formation associated with a borehole. The low amount (zero in some embodiments) of power that is required for the generation of neutrons with the device provides substantial benefits especially when measuring or logging very deep (or long) boreholes, e.g., over 10,000 feet, by not requiring the substantial power losses in the transmission of electricity down hole to have to be overcome.

Example 25

In the embodiment of this example a microwave source is used to help start the rotation of the gases (weakly ionized gases). In this manner the microwave source requires less power than the use of a current to initially get the rotation of the gases starting, and thus, the use of the microwave generator provide for a better, e.g., more efficient, energy balance.

Figure 26:
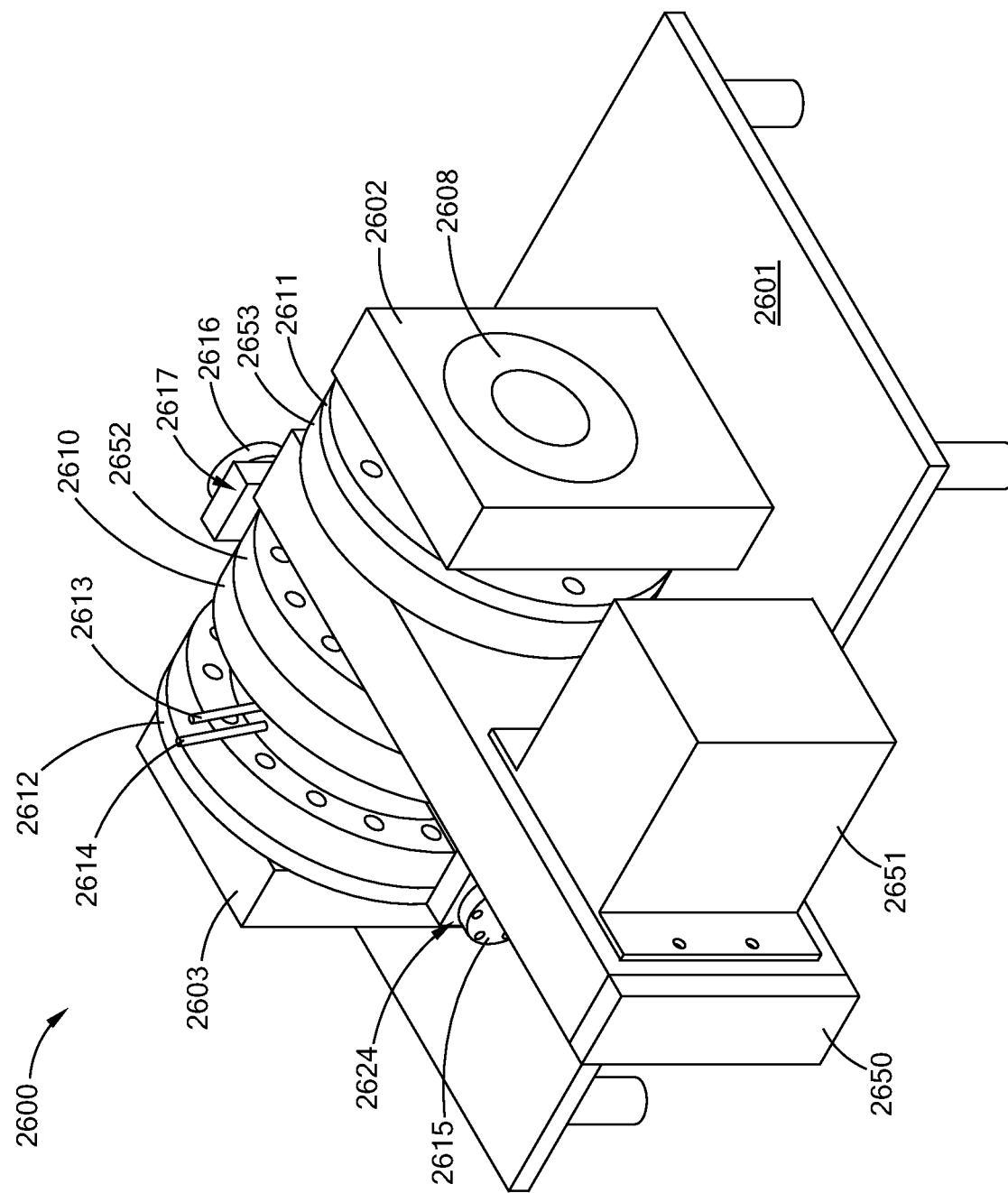
FIG. 26 is a perspective view of an embodiment of a controlled fusion device in accordance with the present inventions.
Figure 26A:
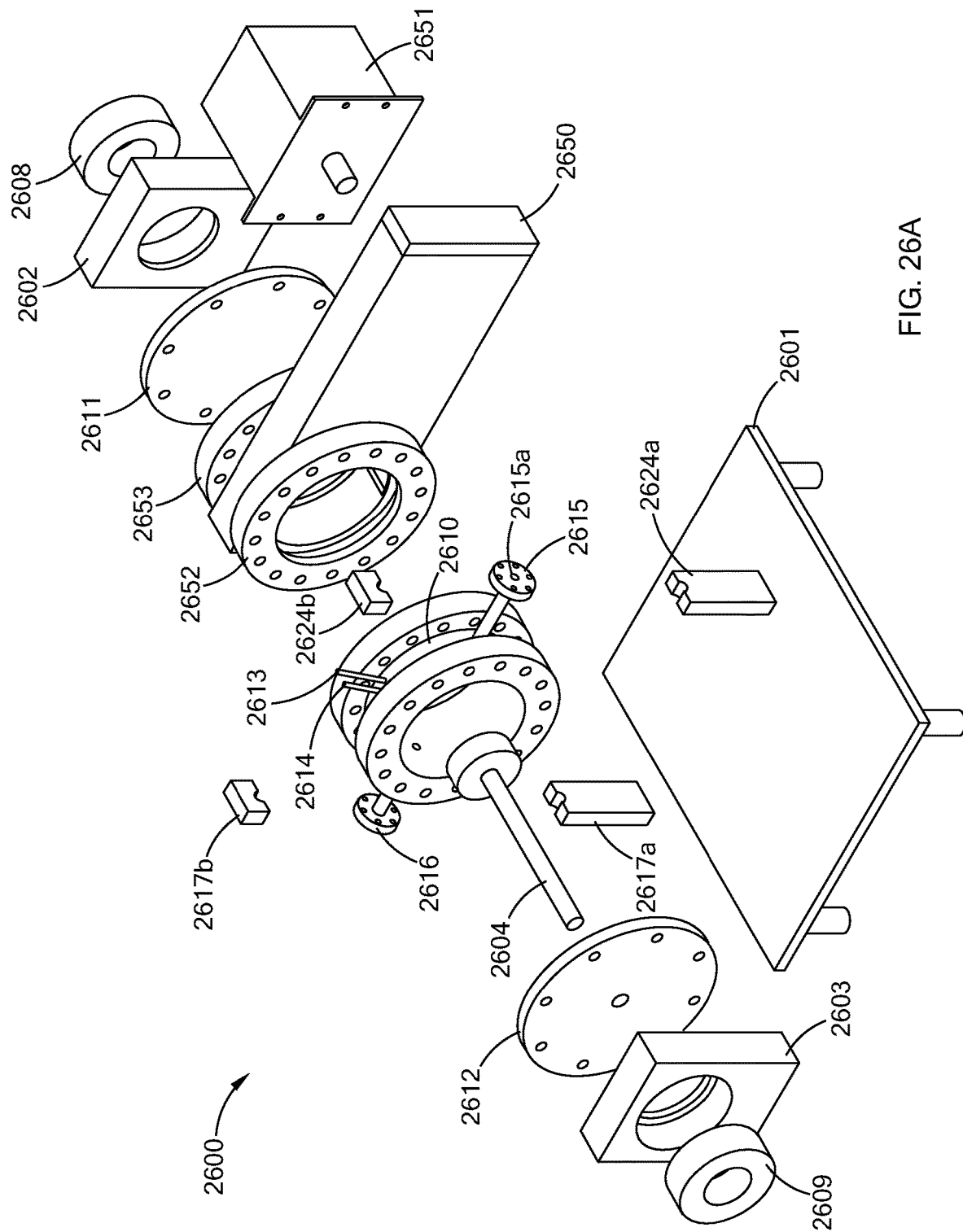
FIG. 26A is an exploded view of the embodiment of FIG. 26.

Thus, turning to FIG. 26 there is shown a perspective view of an embodiment of a tabletop controlled fusion device 2600. The device 2600 is mounted on a table 2601 (1 feet by 2 feet). The device 2600 has two magnet holders 2603, 2602 at the axial ends of the device. Each magnet holder holds a magnet 2609, 2608. Between the magnet holder 2603, 2602 there is an assembly to contain the rotating gas, this assembly has two outer cover flanges 2612, 2611. Flange 2612 is attached to the axial end of housing 2610. Flanged microwave delivery assembly 2650 is attached to the other end of housing 2610, and flange 2611 is attached to the assembly 2650. The microwave source 2651 is attached to assembly 2650. The housing 2510, the assembly 2652, and flanges 2612, 2611 form the cavity where the gases rotate. The inner surface of housing 2610 is the surface where the fusion process primarily takes places. The housing 2610 also serves as the outer electrode. The inner electrode 2604 has a discharge head. Additionally, mounts 2624 and 2617 hold the assembly. Each mount has a bottom arm 2624a, 2617a, and a top caps 2624b, 2617b, respectively. Gas inlet line 2615 has opening 2615a and gas outlet 2616 has an outlet opening (not shown). Cooling water circulation lines, inlet 2614, outlet 2613 are provided so that water can be circulated around housing 2610.

Example 26

Figure 27:
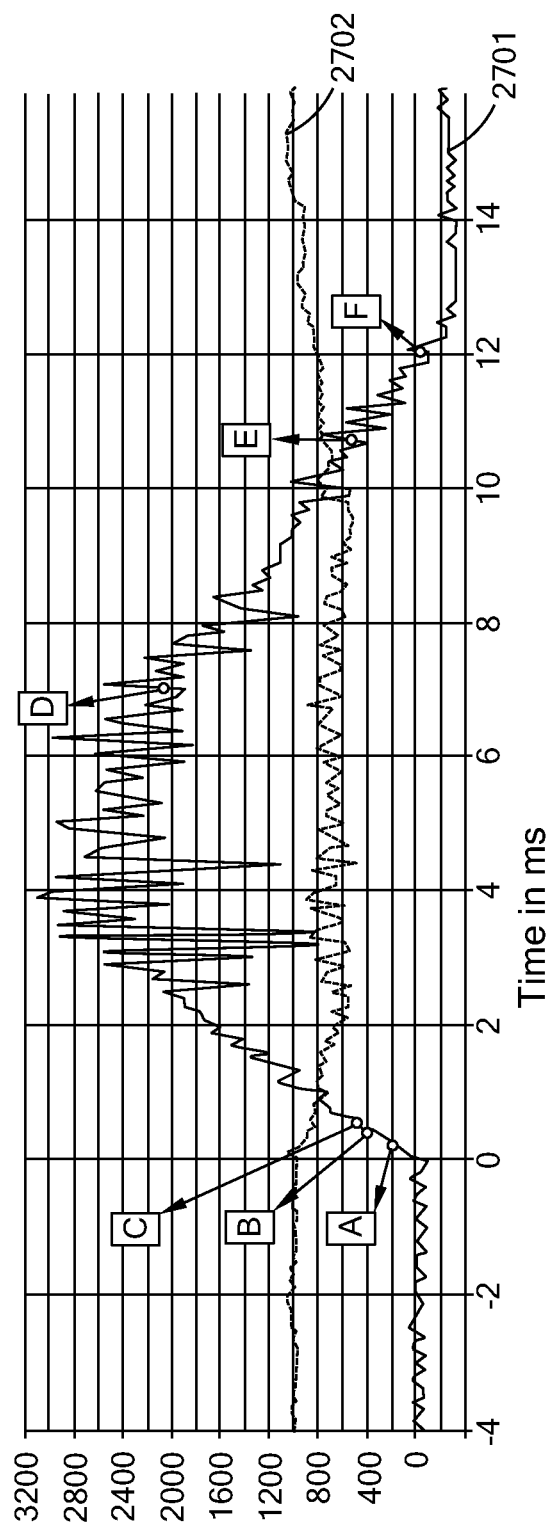
FIG. 27 is a graph of the plot of voltage and current during the operation of a controlled fusion device in accordance with the present inventions.
Figure 27C:
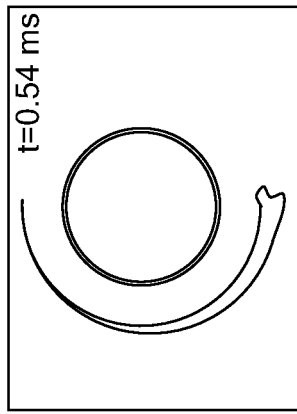
FIGS. 27A to 27F are schematic representations of photographs of He and fusion products, in accordance with the present inventions.
Figure 27F:
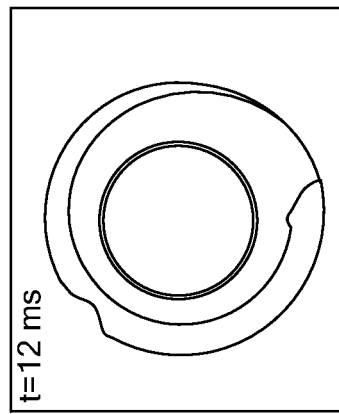

A device of the general type shown in FIG. 3 was used to conduct fusion interactions. FIG. 27 shows the current and voltage that is applied to the device to rotate the gases. Thus, line 2702 shows the voltage across the electrode over time in ms. Line 2701 shows the pulse current in amps over time. The two lines show the relationship of CW voltage and current during the pulse. Point (A) on the graph of FIG. 27 corresponds to FIG. 27A, point (B) on the graph of FIG. 27 corresponds to FIG. 27B, point (C) on the graph of FIG. 27 corresponds to FIG. 27C, point (D) on the graph of FIG. 27 corresponds to FIG. 27D, point (E) on the graph of FIG. 27 corresponds to FIG. 27E, and point (F) on the graph of FIG. 27 corresponds to FIG. 27F.

Figure 27B:
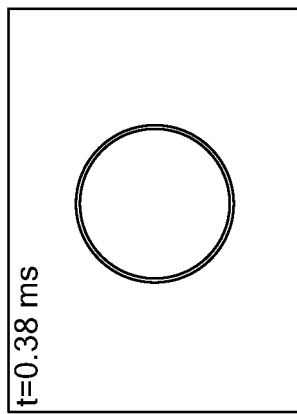
Figure 27E:
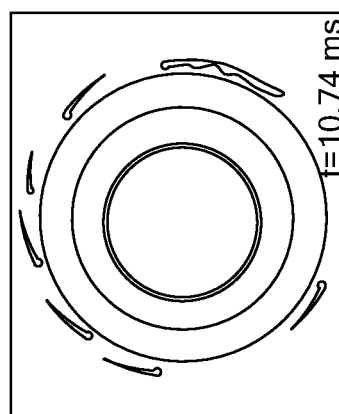
Figure 27A:
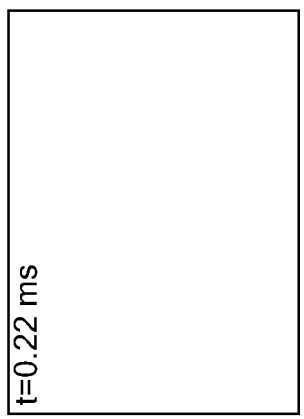
Figure 27D:
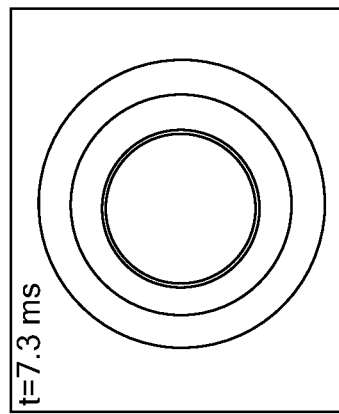

FIGS. 27A to 27F are schematic representations of photographs that were taken within the rotating gas cavity of the fusion device. FIG. 27A shows that no reaction is taking place, the weakly ionized gas is spinning by the applied voltage and the pulse is only beginning to be applied. FIG. 27B shows that fusion products are beginning to be formed, and as the pulse increases through points C and D the fusion reaction products are additionally increased. As the pulse stopped, e.g., current lowered, points E and F, the fusion reaction and production of fusion products continues.

Example 27

Figure 28:
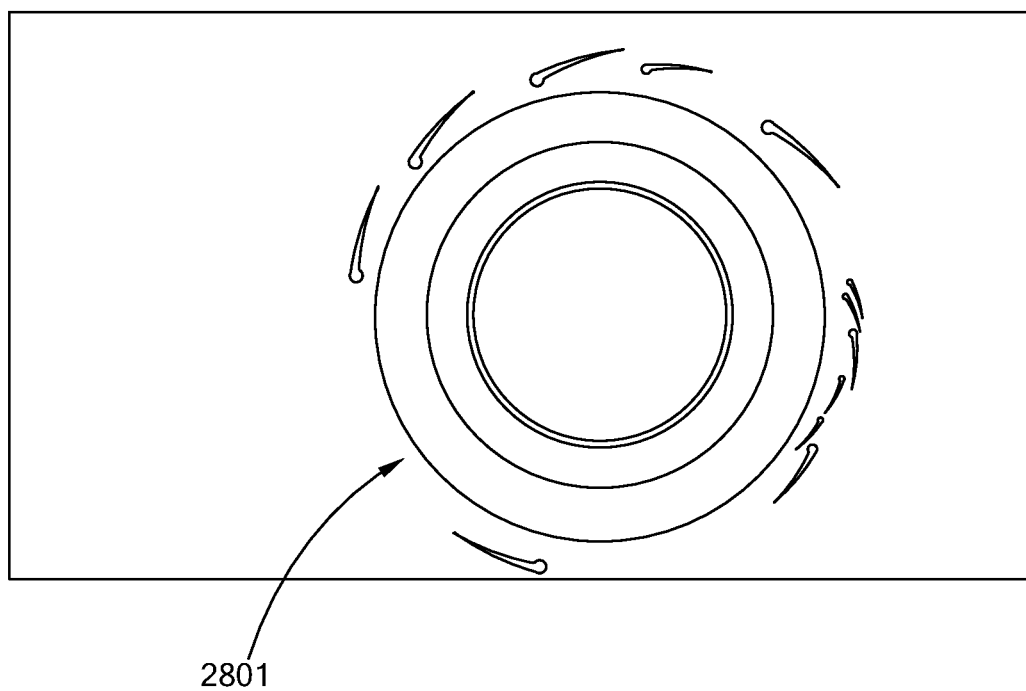
FIG. 28 is a schematic representations of a photograph of He and fusion products, in accordance with the present inventions.

A device of the general type shown in FIG. 3 was used to conduct fusion interactions. FIG. 28 is a graphic representation of He I neutrals emission 2801 observed using a filter centered at 587.5 nm (±2.5 nm FWHW), at time 10.7 ms. shows the current and voltage that is applied to the device to rotate the gases.

Example 28

Figure 29:
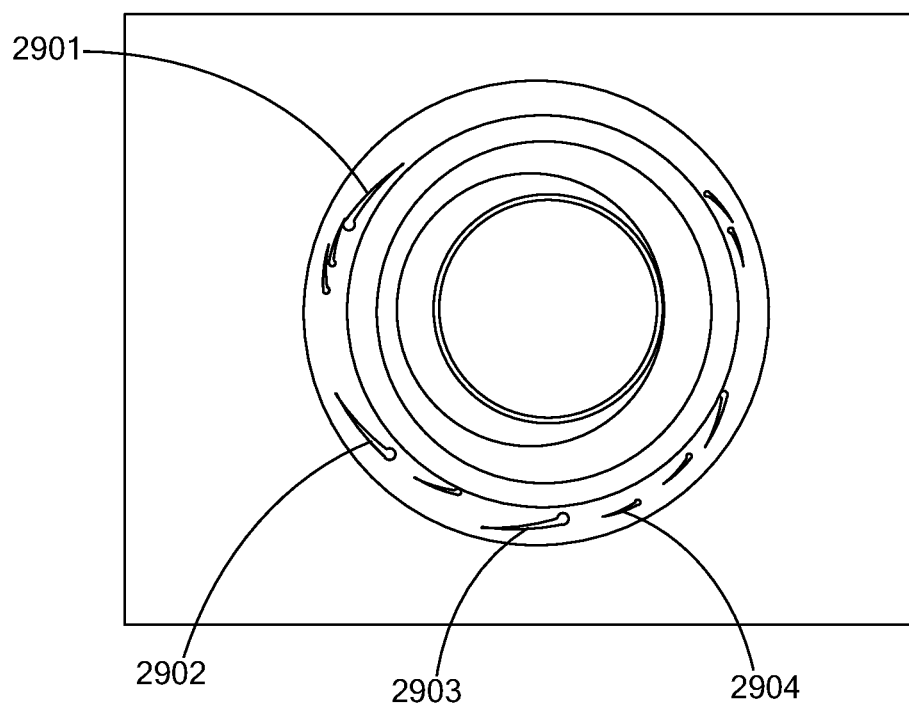
FIG. 29 is a schematic representations of a photograph of He and fusion products, in accordance with the present inventions.

A device of the general type shown in FIG. 3 was used to conduct fusion interactions. FIG. 29 is a graphic representation of He I neutrals emission observed using a filter centered at 587.5 nm (±2.5 nm FWHW), at time 10.7 ms. The fusion products and weakly ionized gases 2901 have been calculated at $2.52 \times 10^6$ m/s, fusion products and weakly ionized gases 2902 have been calculated at $1.63 \times 10^6$ m/s, fusion products and weakly ionized gases 2903 have been calculated at $1.15 \times 10^6$ m/s, and fusion products and weakly ionized gases 2904 have been calculated at $9.95 \times 10^5$ m/s.

Example 29

Figure 30:
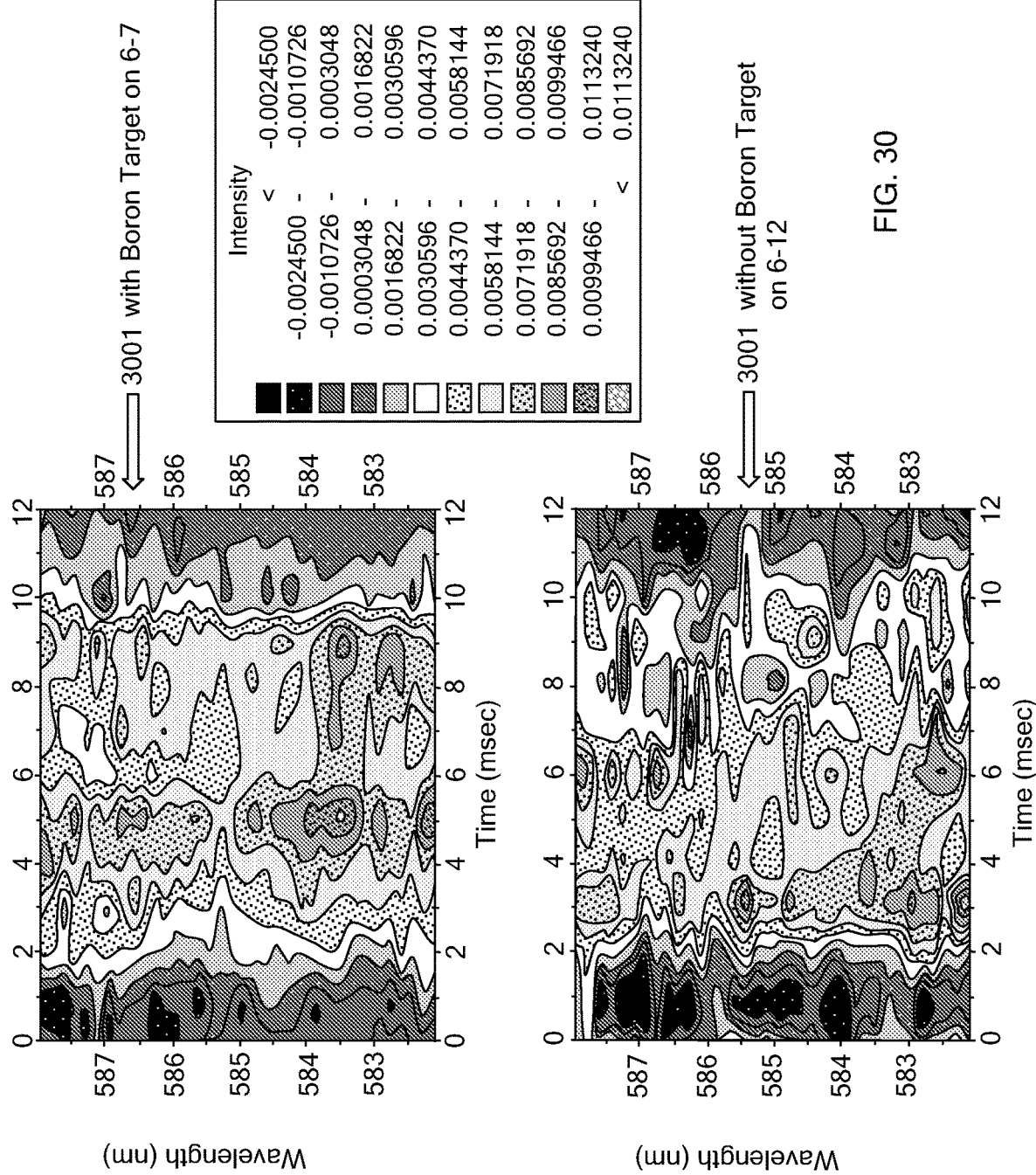
FIGS. 30 and 31 are representations of emission spectrum, in accordance with the present inventions.
Figure 31:
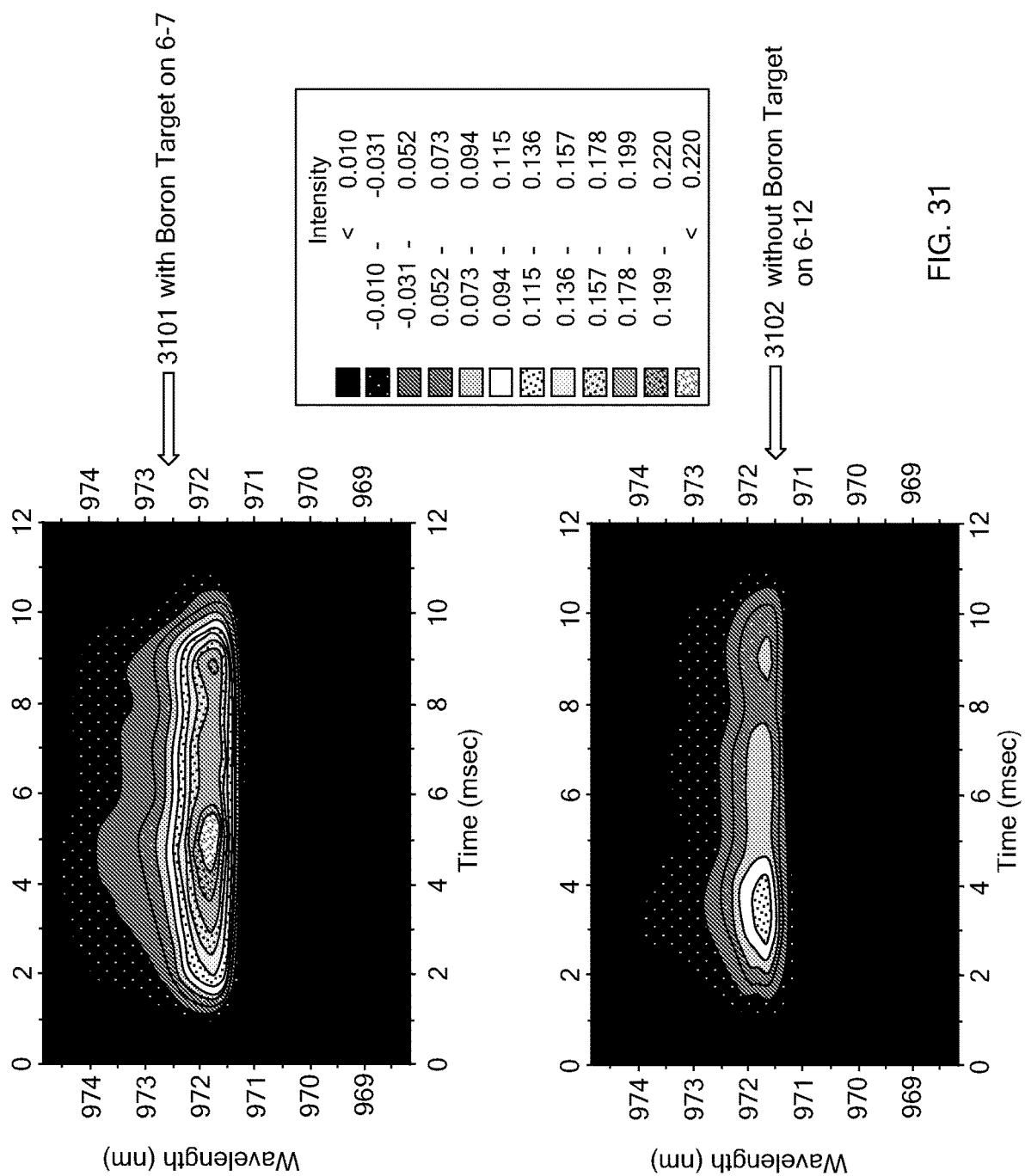

FIGS. 30 and 31 show the intensity of He emissions with and without boron targets.

The efficacy and utility of energy storage and generation devices are often discussed in terms of specific energy and specific power. It is highly desirable to have a simultaneous high specific energy and high specific power. It may also be desirable to have a predetermined specific energy and specific power.

Specific energy is typically measured in J/kg, or J/L (volumetric) while specific power is typically measured in W/kg or W/L. These values indicate the total energy production, and the energy production rate, for a system of a given size.

Typical values seen for specific energy vary from $10^{-8}$ J/kg for supercapacitors to $10^8$ J/kg ($10^6$ J/L) for compressed hydrogen. Typical values of specific power vary from 1 W/kg to $10^4$ W/kg. However, prior to the present invention, specific energies and powers (or the combination therein) above certain levels have been untenable. Further, while, for example, a rocket engine may have a relatively high specific power, it cannot be scaled to smaller or larger sizes with ease. Thus, it is here envisioned that a controlled fusion device is capable of producing specific powers and specific energies according to the following table.

| Example | Specific Energy (J/kg) | Specific Energy (J/L) | Specific Power (W/kg) | Specific Power (W/L) |
| --- | --- | --- | --- | --- |
| A | $10^6$ | $10^3$ | $10^2$ | $10^2$ |
| B | $10^{14}$ | $10^{15}$ | $10^8$ | $10^6$ |
| C | $10^8$ | $10^9$ | $10^5$ | $10^3$ |
| D | $10^{10}$ | $10^7$ | $10^6$ | $10^4$ |

Example 30

In this embodiment the spinning of the weakly ionized plasma in the device can be obtained by wave particle trapping. In general, a circular electromagnetic wave is induced in the device, near to, and preferably, directly adjacent the inner wall. The ionized particles couple to this circular wave, and move around the device, brining the neutral particles with them. In this manner the high speed spinning of the weakly ionized plasma in the device can be accomplished without the need for a magnetic filed. Thus, using want is theorized to be the underlying principles of nonlinear-wave-particle trapping and ion-neutral coupling in a three-component plasma system consisting of positive ions, negative ions, and neutral molecules (neutrals) the requisite conditions can be obtained for a fusion interaction of the particles. The resulting collective phenomena are much richer and more diverse than the sum of their parts. Typically unstable ions are kept stable, oppositely charged particles are kept separate in wave potential troughs, and very high overall density is attained without limitations by space charges. Collisions between neutrals and ions allow the control of a high-density medium by electromagnetic fields. These phenomena apply to both gasses and liquids.

Waves are manifestations of the collective motion of particles and possess energy and momentum. As particles, wave packets can be excited and pointed in a preferred direction. The use of waves with negative and positive ions has not been thoroughly investigated, especially in the regime where ions and neutral molecules coexist in various concentrations.

A traveling electric wave with precisely aligned phase velocity can accelerate positive ions, negative ions, and neutrals to high speeds. Over 1.5 seconds, or $9 \times 10^6$ periods, using a 100V 6 MHz electric wave, the neutrals accelerate to more than 9000 meters per second. It is important to note that, while the velocity of the negative and positive ions each appear to have high negative values in areas, these areas correspond to the lowest densities of these ions. Similarly, the areas with the highest positive velocities of negative ions, positive ions, and neutrals correlate to the areas with the highest particle densities. As such, the net momentum of negative ions, positive ions, and neutrals are each in the forward direction. These simulations demonstrate that, based upon accepted theory, neutrals can be accelerated by an electric wave when coupled with ions, negative and positive ions are kept separate when coupled with neutrals, and that potential wells and troughs can be used to accelerate alternating groups of negative and positive ions.

The examples above are meant to be a sample of the possibility space. Additionally, it should be understood that the boundary at which the specific energy or specific power is calculated may vary according to the type of system.

The various embodiments of energy utilization assemblies and direct energy conversion assemblies may be used individually or collectively on or in association with various controlled fusion devices. Thus, for example, to increase the overall energy conversion efficiency of the device, and to protect components of the device from thermal damage, direct energy conversion assemblies may have energy utilization assemblies associated with them. Similarly, energy utilization assemblies may have, preferably on their surfaces, direct energy conversion assemblies. In this manner, and preferably, all usable surfaces and areas where heat transfer or capture of high-energy particles in the controlled fusion device may be utilized.

The various embodiments of devices, methods and systems set forth in this specification may be used for various operations, other energy production, including the formation of materials. Additionally, these embodiments, for example, may be used with systems and operations that may be developed in the future; and with existing systems and operations that may be modified, in-part, based on the teachings of this specification. Further, the various embodiments set forth in this specification may be used with each other, in whole or in part, and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed is:

1. A direct energy conversion assembly device for inducing and controlling nuclear fusion reactions comprising:
   a controlled pressure cylindrical chamber operatively coupled to a rotation device;
   a concentric superconducting magnet surrounding the chamber and oriented such that an axis of symmetry of the chamber is parallel to the magnetic field produced by the magnet;
   a concentric outer electrode located within the chamber;
   a concentric inner electrode located within the outer electrode at the radial center of the chamber, at least partially covered with insulation;
   the chamber being configured to introduce a first working material into the chamber through a working gas inlet line located within the inner electrode, wherein the first working material comprises a first fusion reactant;
   the chamber being further configured to position a second working material within the chamber, wherein the second working material comprises a second fusion reactant and is mounted on an inner surface of the outer electrode facing an exposed portion of the inner electrode;
   a continuous wave discharge circuit operatively coupled to the chamber, which delivers a voltage between the inner electrode and outer electrode and pre-ionizes at least the first working material to create an ionized plasma;
   a pulse discharge circuit that delivers a current pulse through the plasma between the inner and outer electrodes for approximately 10 to 15 milliseconds and induces rotation of the plasma and a surrounding neutral gas in conjunction with the Lorentz force caused by the superconducting magnet;
   wherein the rotation of the plasma and neutral gas within the chamber may reach up to about 100,000 RPS, which compresses the plasma against the second working material mounted on the inner wall of the outer electrode by the centrifugal effect and is thereby configured to provide conditions for a fusion reaction of the first working material and the second working material during the rotation of the plasma; and
   a direct energy conversion assembly configured to extract energy from charged particles produced in the fusion reactions and convert the energy to electrical current;
   wherein the direct energy conversion assembly comprises an array of semiconductor PN junctions positioned adjacent to the chamber such that charged particles produced in the fusion reactions impinge upon the PN junctions, creating electron-hole pairs, and thereby inducing an electrical current; or
   wherein the direct energy conversion assembly comprises a third working material disposed between a first electrode and a second electrode, said first electrode having a relatively low work function with respect to said second electrode and said second electrode having a relatively high work function with respect to said first electrode, wherein the third working material is located adjacent to the chamber such that charged particles impinge upon the third working material, creating electron-hole pairs, and thereby induce an electrical current from the first and second electrodes.

2. The direct energy conversion assembly device of claim 1, wherein the first electrode having a relatively low work function is made from magnesium.

3. The direct energy conversion assembly device of claim 1, wherein the second electrode having a relatively high work function is made from gold.

4. The direct energy conversion assembly device of claim 1, wherein the chamber is further configured to support a standing electromagnetic wave, and wherein the rotation device comprises:
   a radio-frequency feed configured to apply an electromagnetic wave to the chamber such that a rotating standing wave is developed within the chamber, wherein:
   the rotating standing wave is adapted to cause the ionized plasma in the chamber to rotate.

5. The direct energy conversion assembly device of claim 1, wherein the rotation device comprises:
   a photon source operatively coupled to the chamber, wherein the photon source is configured to irradiate at least the first working material to create a photon pressure sufficient to cause the first working material to rotate within the chamber.

6. The direct energy conversion assembly device of claim 1, wherein the continuous wave discharge circuit comprises:
   a radio frequency feed operatively associated with the first working material and configured to introduce an electromagnetic signal into the chamber, wherein:
   the frequency of the electromagnetic signal is selected to correspond to a synchrotron frequency of the first working material in the presence of said magnetic field such that resonant energy transfer from the electromagnetic field to the first working material causes at least a portion of the first working material to ionize.

7. The direct energy conversion assembly device of claim 1, wherein the second working material is lanthanum hexaboride and whereby the second working material is disassociated into lanthanum and boron.

8. The direct energy conversion assembly device of claim 1, wherein the third working material comprises material selected from the group consisting of noble gas, gel, and liquid.

9. The direct energy conversion assembly device of claim 8, wherein the liquid working material can be circulated through a plumbing system.

* * * * *